United States Patent [19]

Hertzfeld et al.

[11] Patent Number: 5,611,031
[45] Date of Patent: Mar. 11, 1997

[54] GRAPHICAL USER INTERFACE FOR MODIFYING OBJECT CHARACTERISTICS USING COUPON OBJECTS

[75] Inventors: Andrew J. Hertzfeld, Palo Alto; William D. Atkinson, Portola Valley; Susan D. Kare, San Francisco, all of Calif.

[73] Assignee: General Magic, Inc., Sunnyvale, Calif.

[21] Appl. No.: 236,728

[22] Filed: Apr. 29, 1994

[51] Int. Cl.$^6$ .................................................. G06T 11/00
[52] U.S. Cl. ........................ 395/133; 395/326; 395/348
[58] Field of Search .................................. 395/133, 157, 395/155, 156, 158–161

[56] References Cited

U.S. PATENT DOCUMENTS 5,287,447  2/1994  Miller et al. ............................. 395/157
5,357,603  10/1994  Parker ..................................... 395/156
5,371,844  12/1994  Andrew et al. ...................... 395/157 X

OTHER PUBLICATIONS

OS/2 2.0, Using the Operating System, International Business Machines, Customizing Your System, ©1992 IBM Corp,; pp. 49–51.

*Primary Examiner*—Almis R. Jankus
*Attorney, Agent, or Firm*—Skjerven, Morrill, MacPherson, Franklin & Friel; Ken J. Koestner

[57] ABSTRACT

A graphical user interface for changing characteristics, properties, or attributes of graphical objects in which particular values of particular characteristics are represented themselves as graphical objects called coupons. A user changes a characteristic of a graphical object by selecting a coupon representing a desired value of the characteristic and indicating that the coupon is to be applied to the graphical object. A coupon is selected and applied using a drag and drop technique. Particular values of particular characteristics of a first graphical object can be transferred to a second graphical object by use of a tinker window graphical user interface. A tinker window contains one or more coupons representing the state of the first object in terms of characteristics of the first object. The user selects a coupon from the tinker window and applies the coupon to the second object to transfer to the second object a characteristic of the first object. In some instances, the particular characteristic represented by the coupon is a series of computer instructions associated with a graphical object.

35 Claims, 35 Drawing Sheets

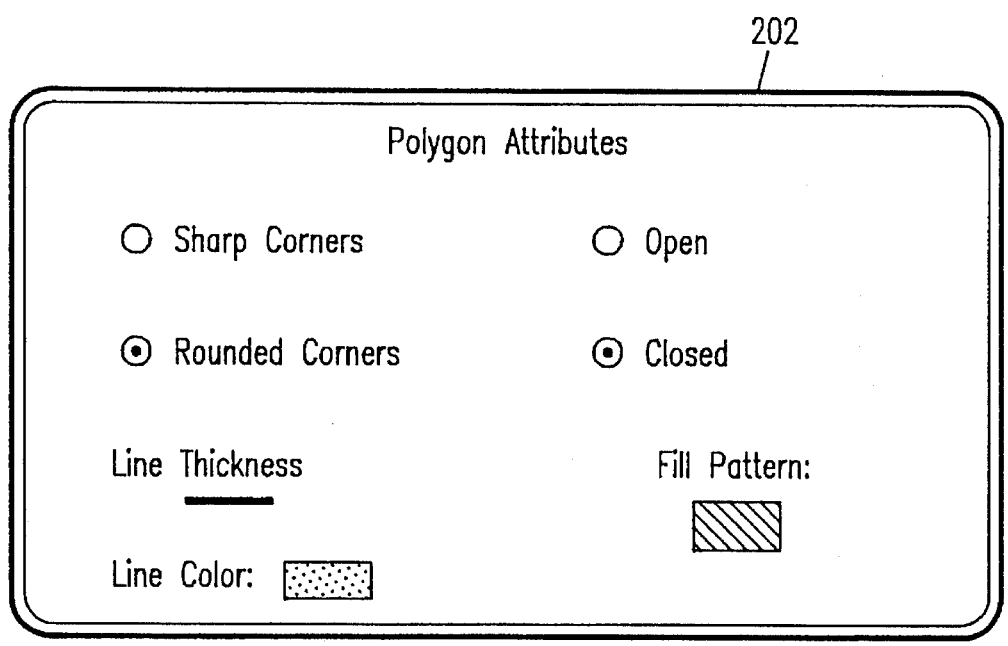
PRIOR ART
FIG. 1
PRIOR ART
FIG. 2

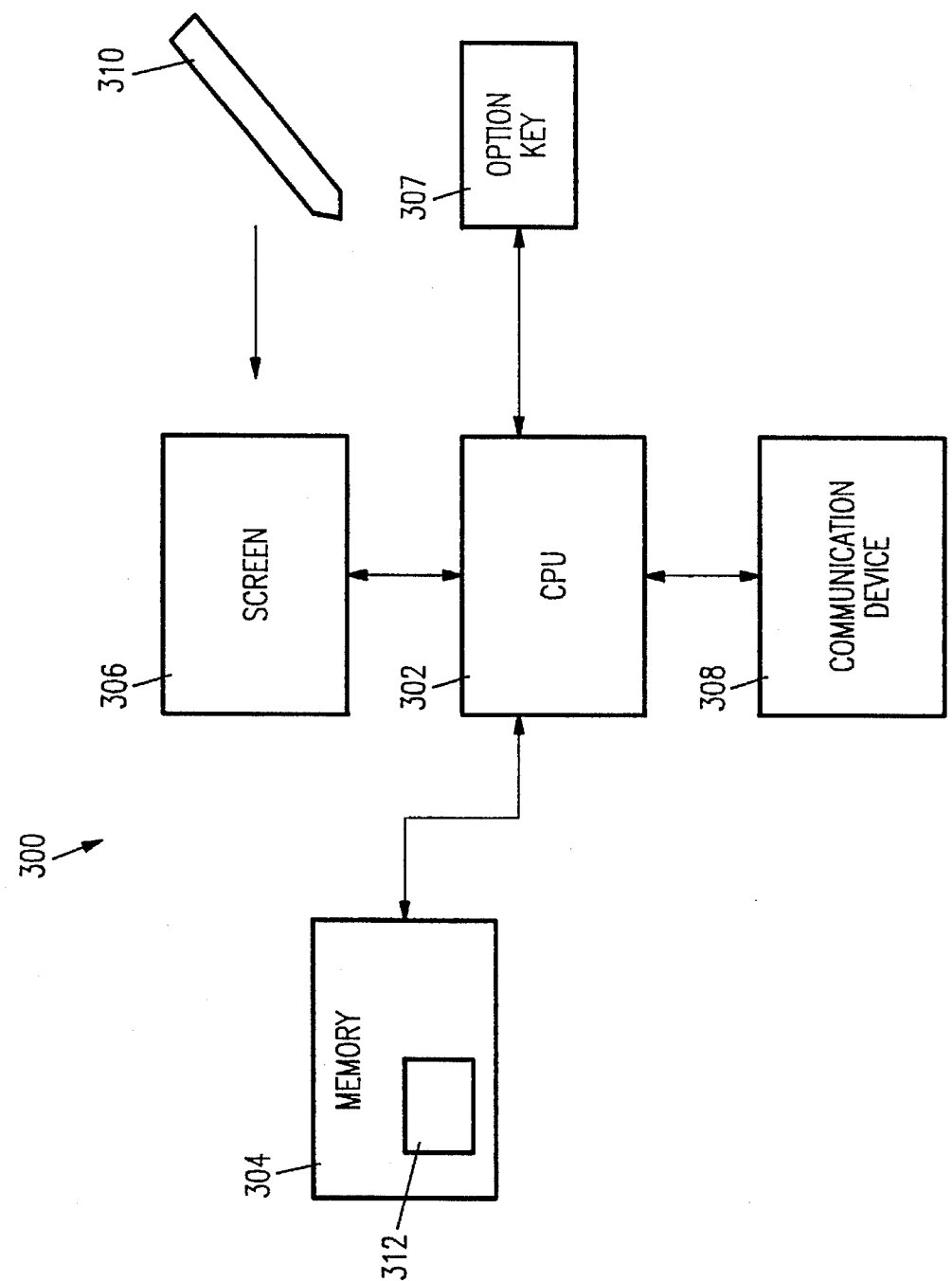
FIG. 3

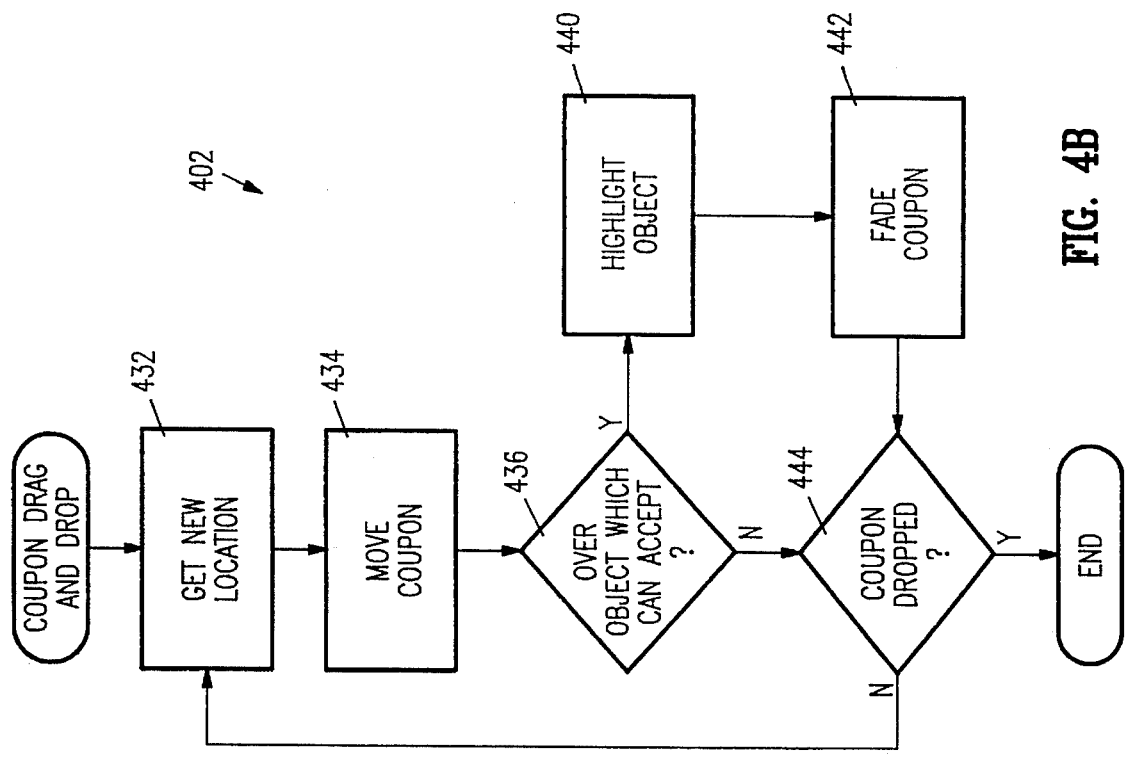
FIG. 4B
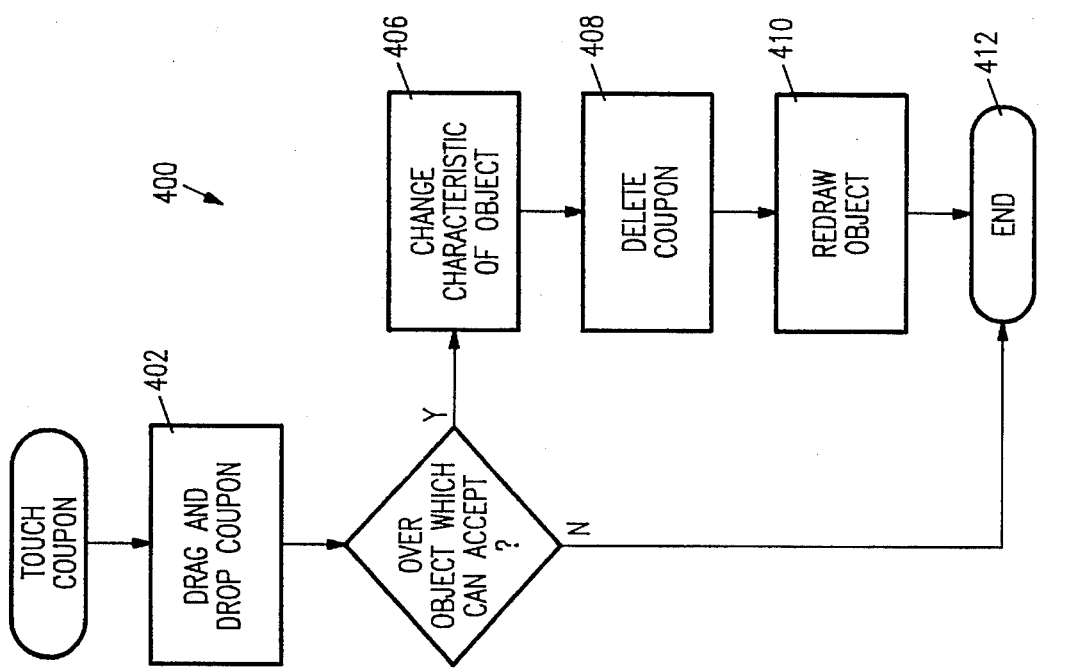
FIG. 4A

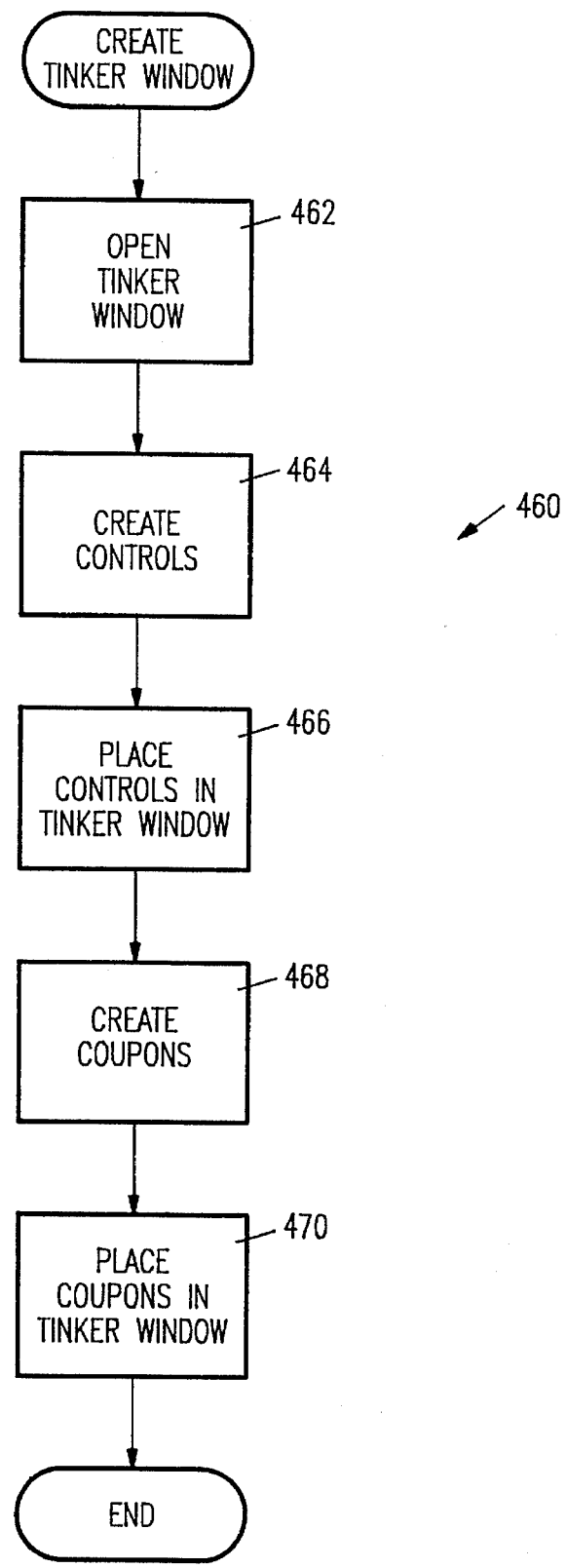
FIG. 4C

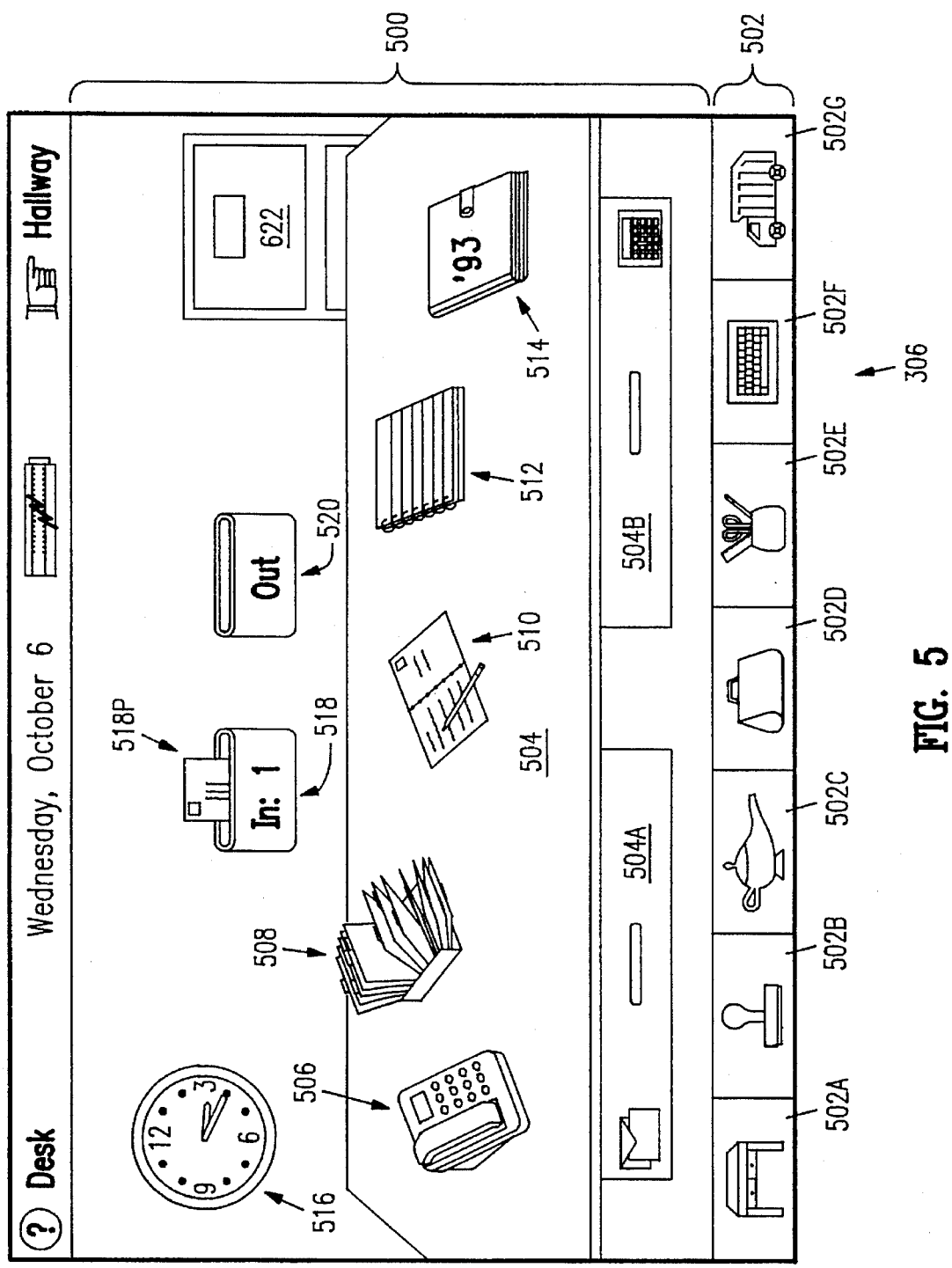
FIG. 5

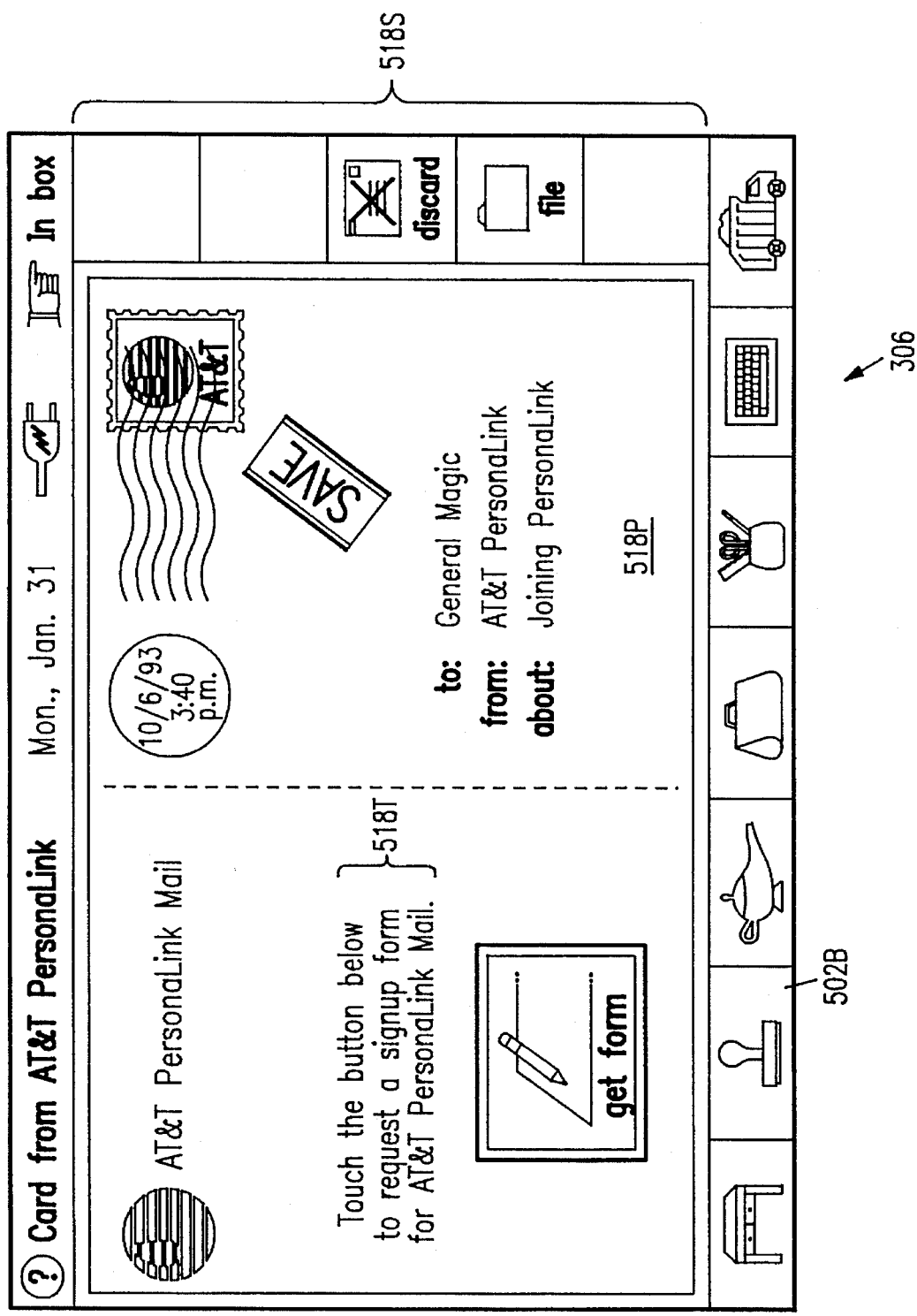
FIG. 6A

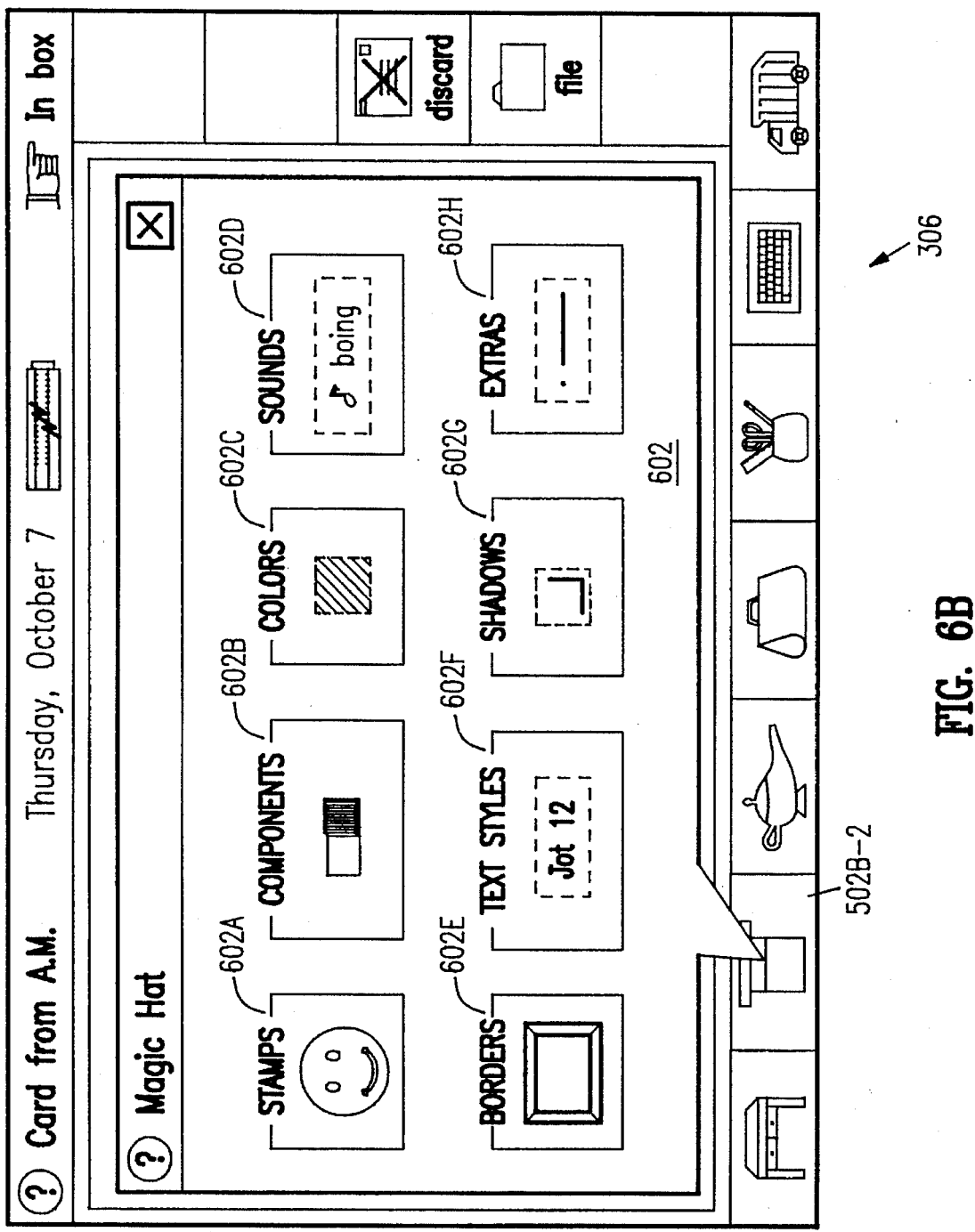
FIG. 6B

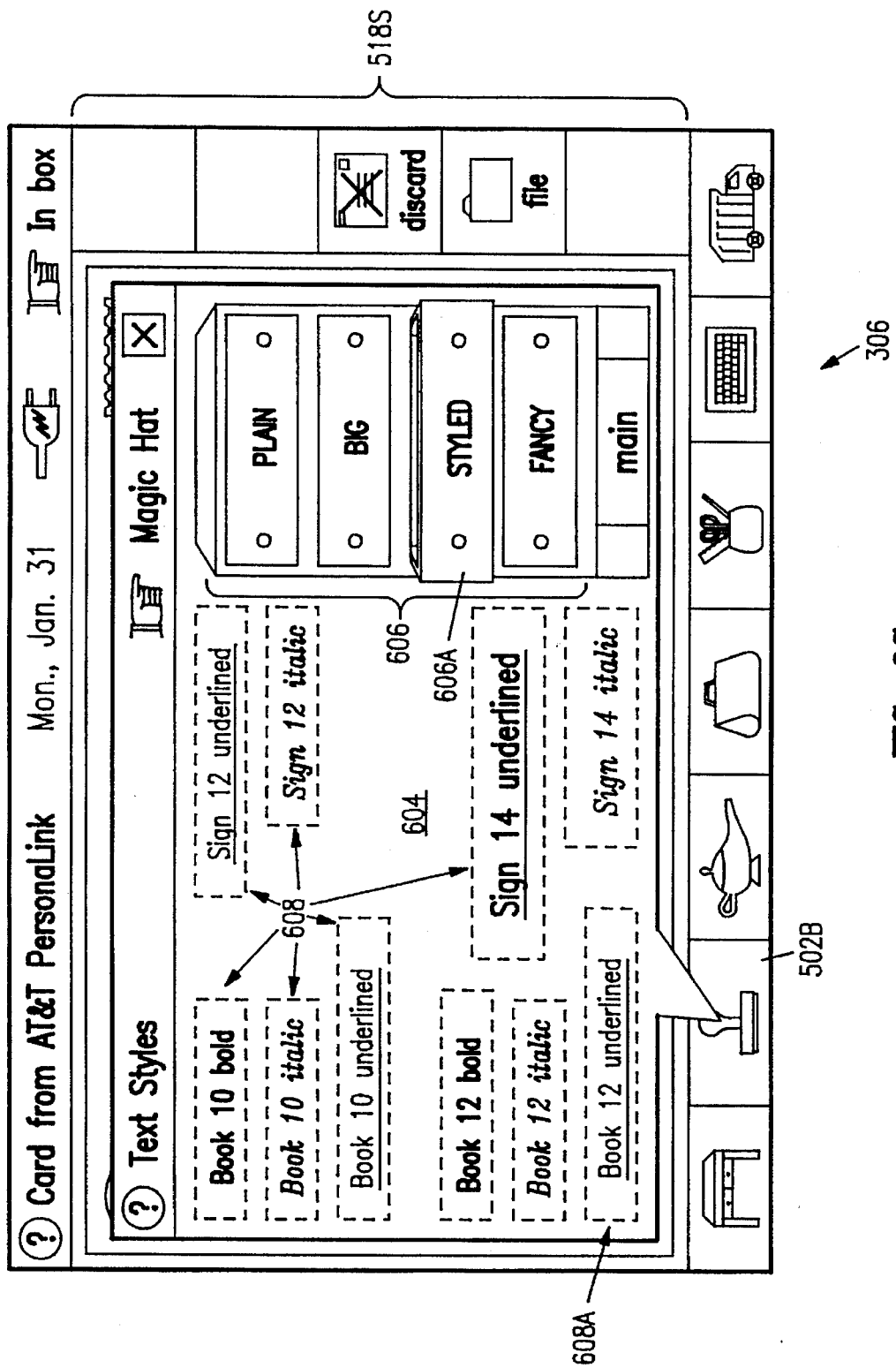
FIG. 6C

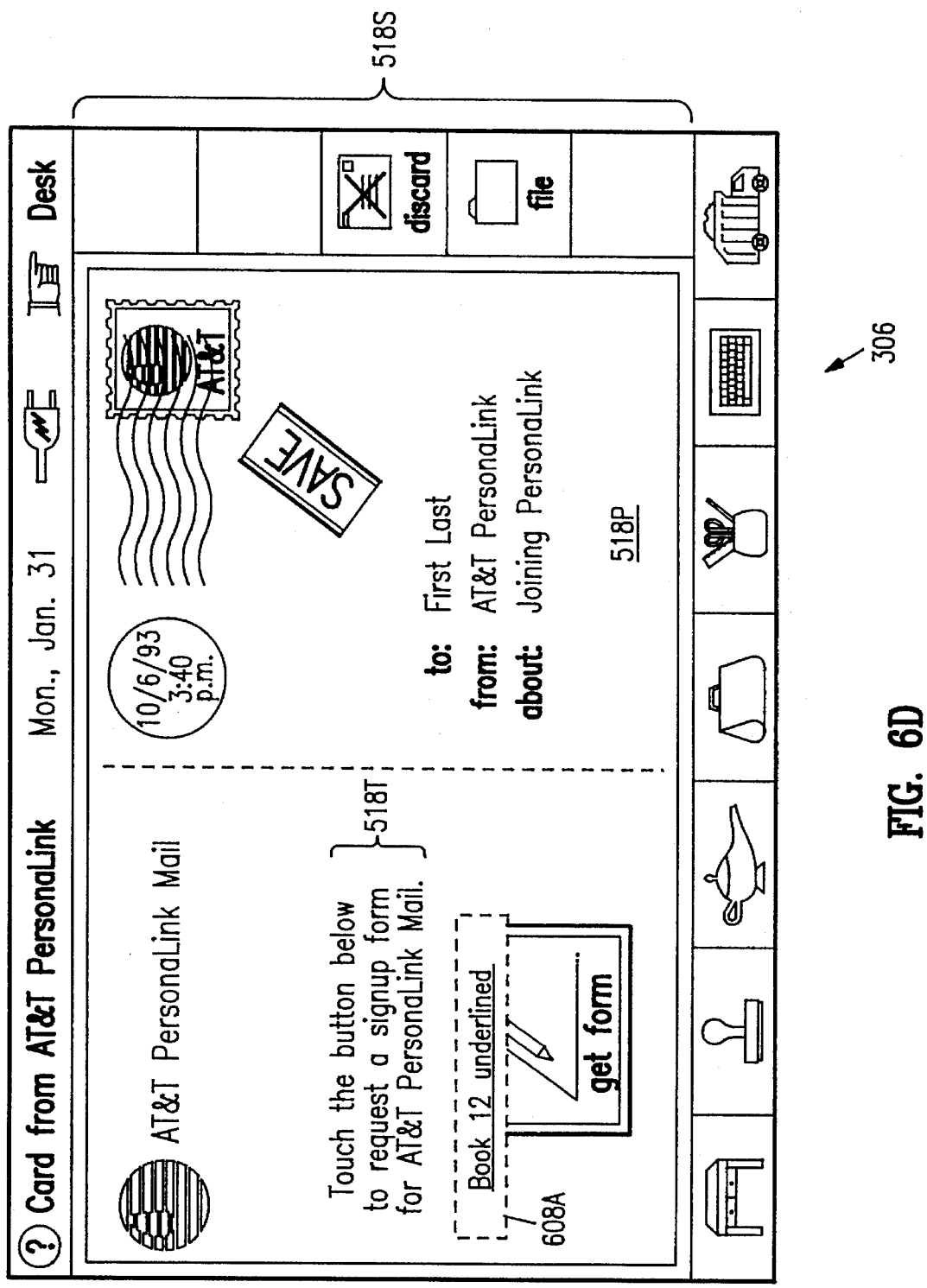
FIG. 6D

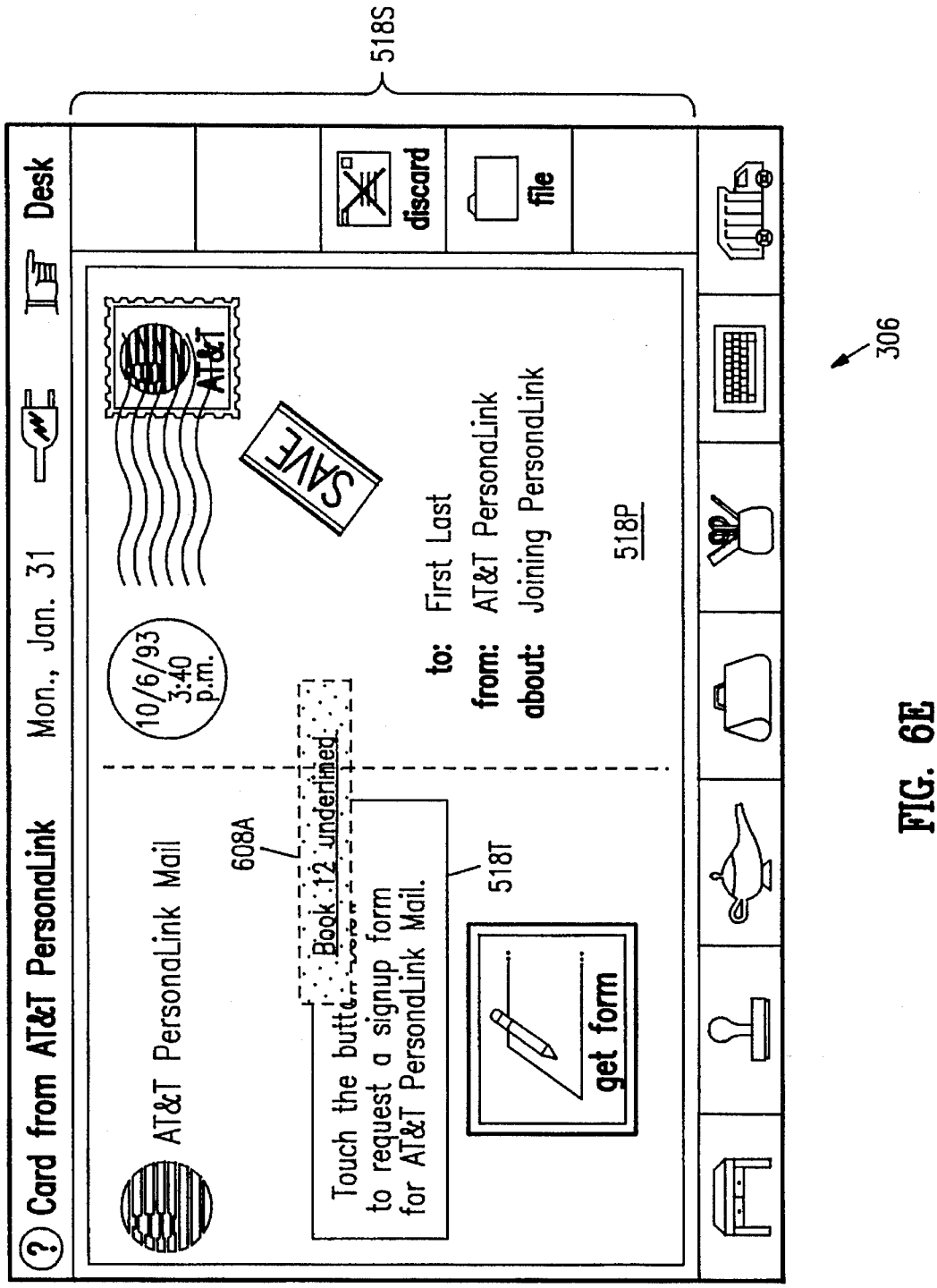
FIG. 6E

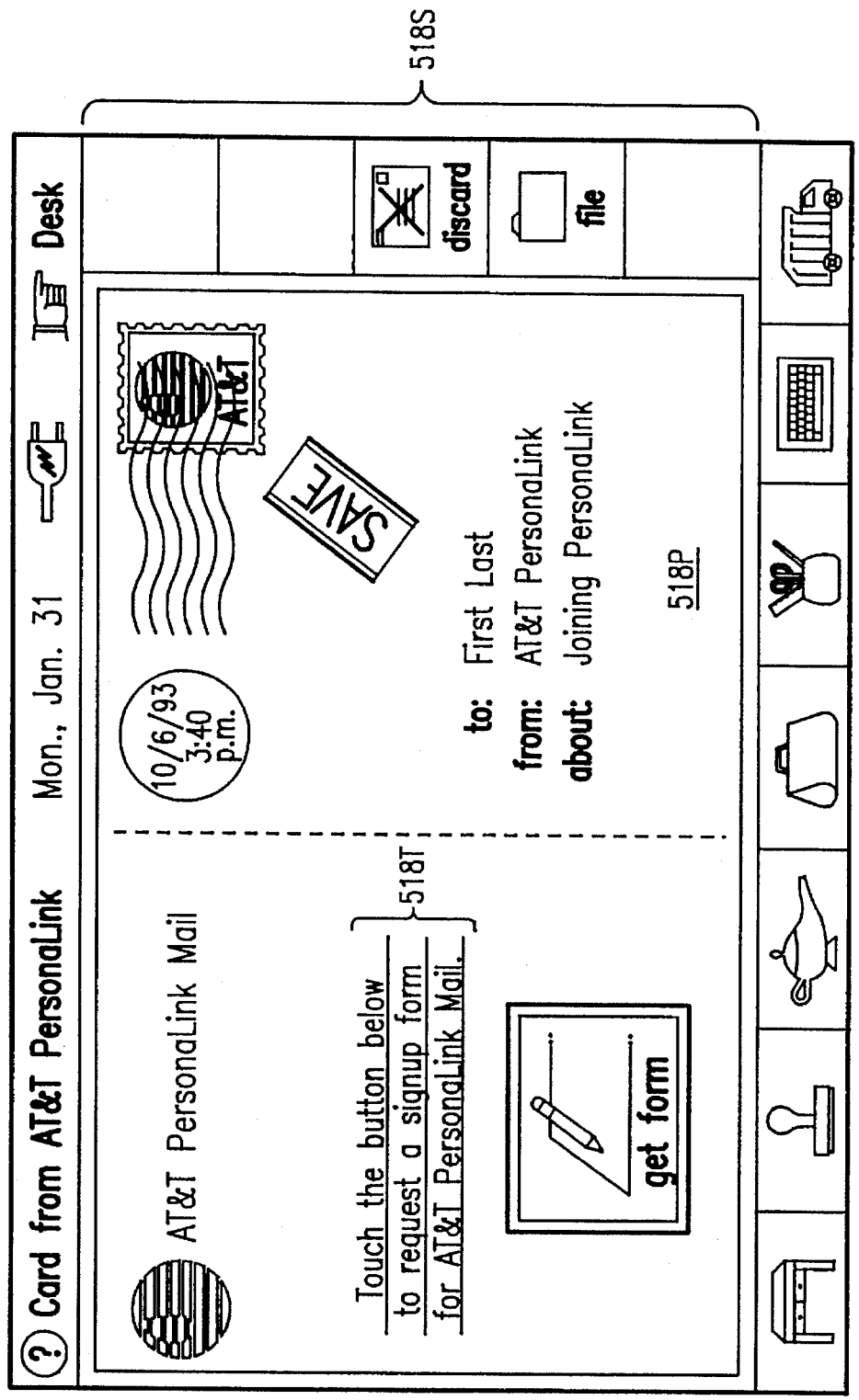
FIG. 6F

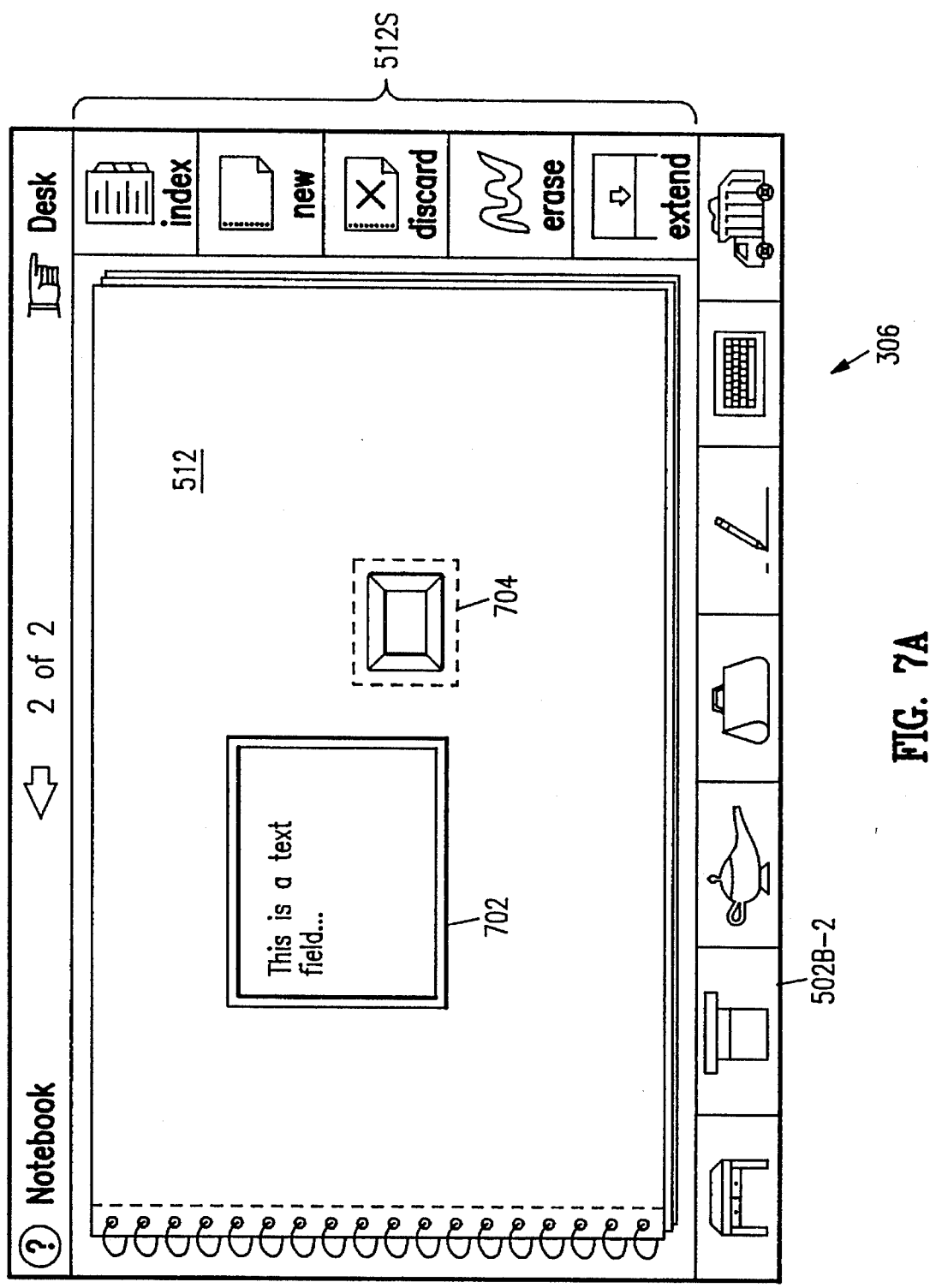
FIG. 7A

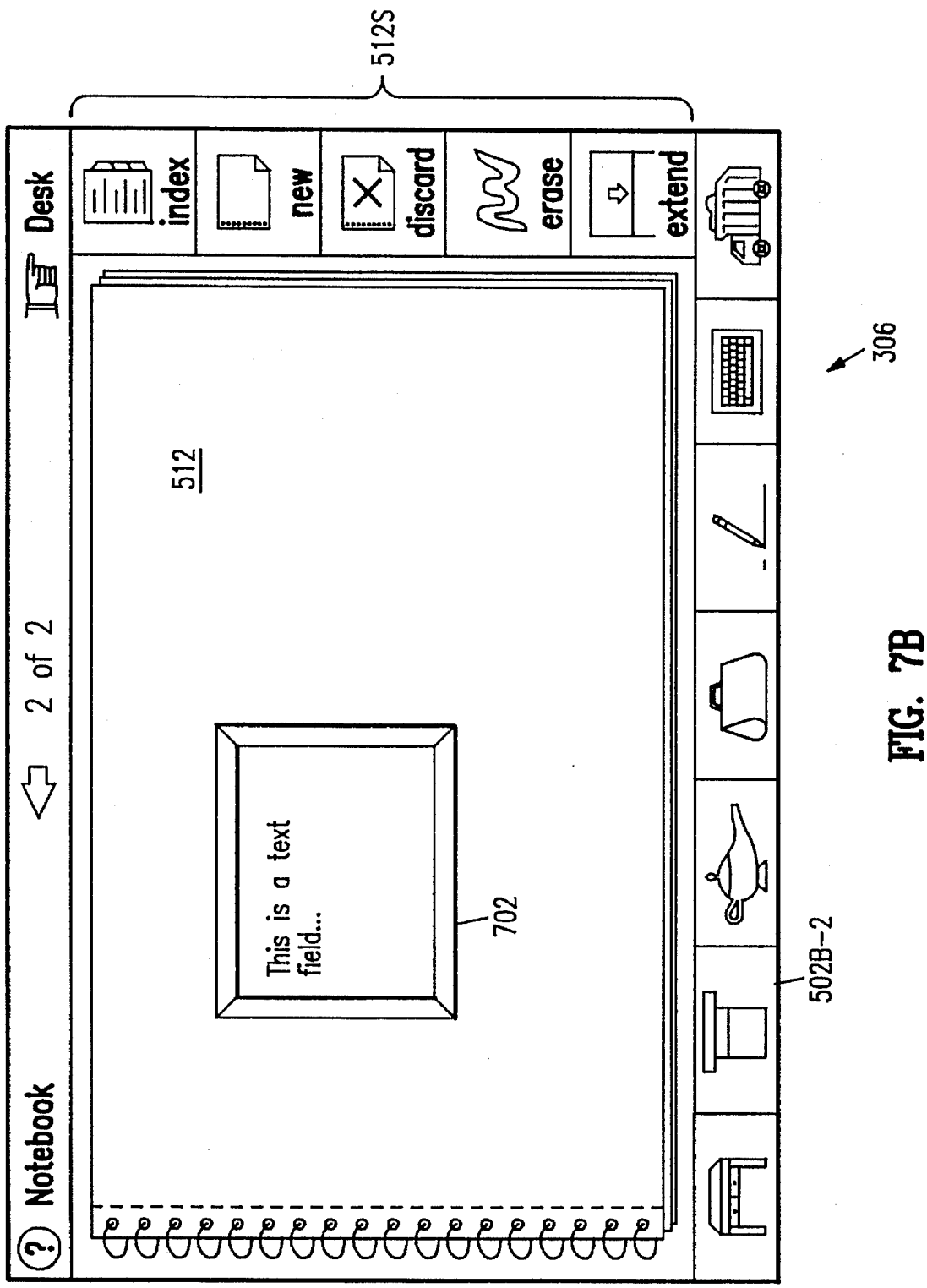
FIG. 7B

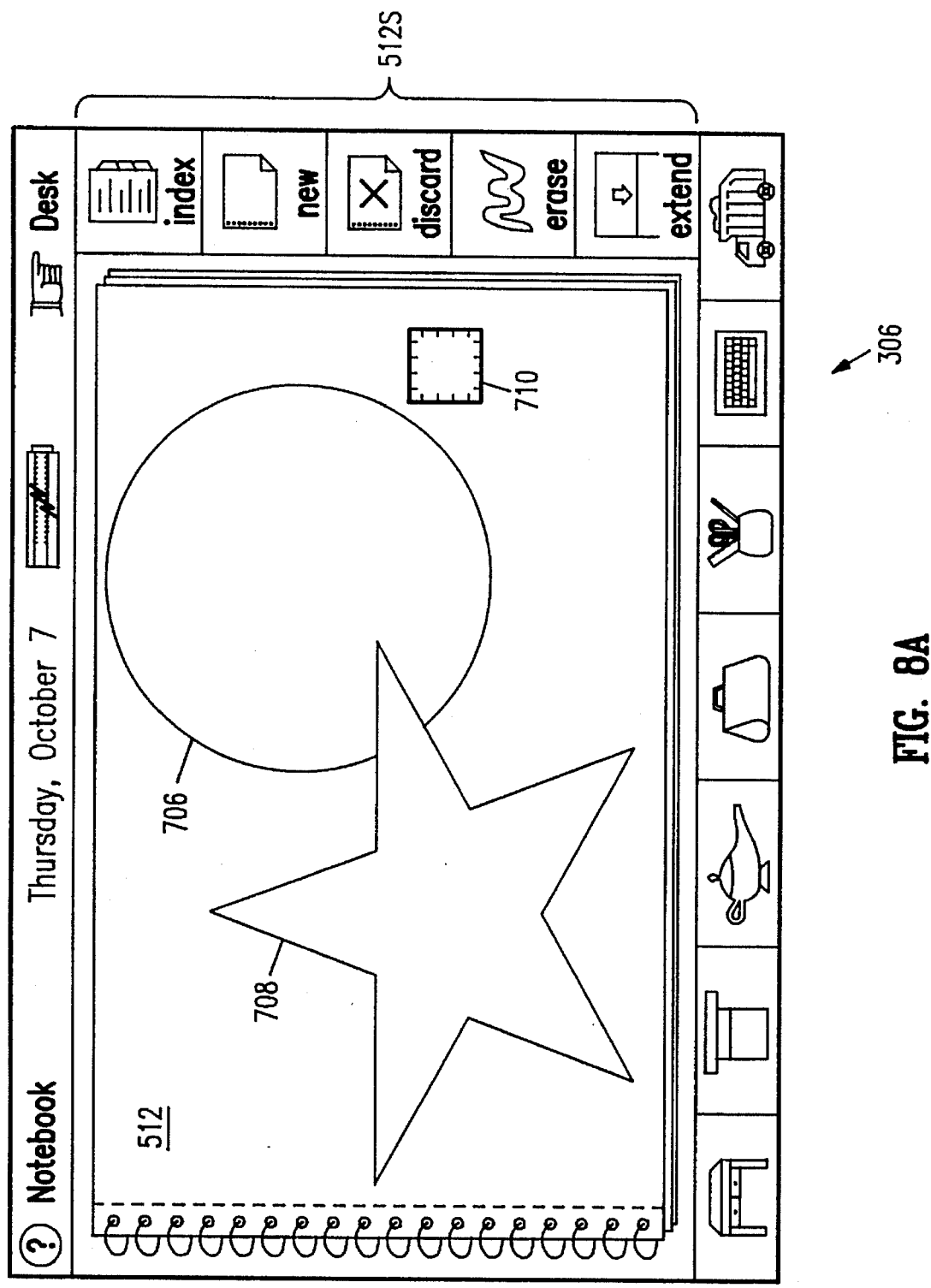
FIG. 8A

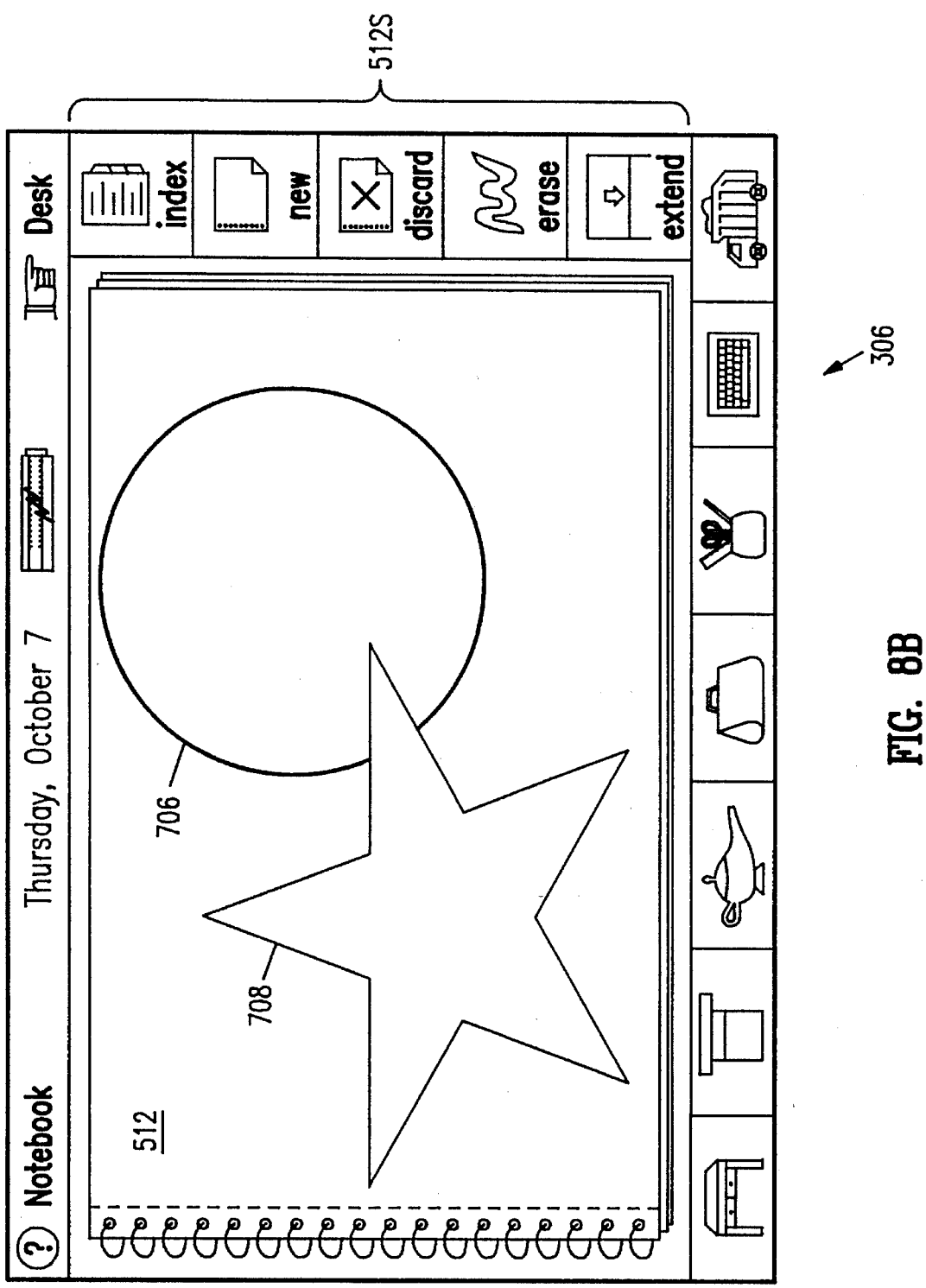
FIG. 8B

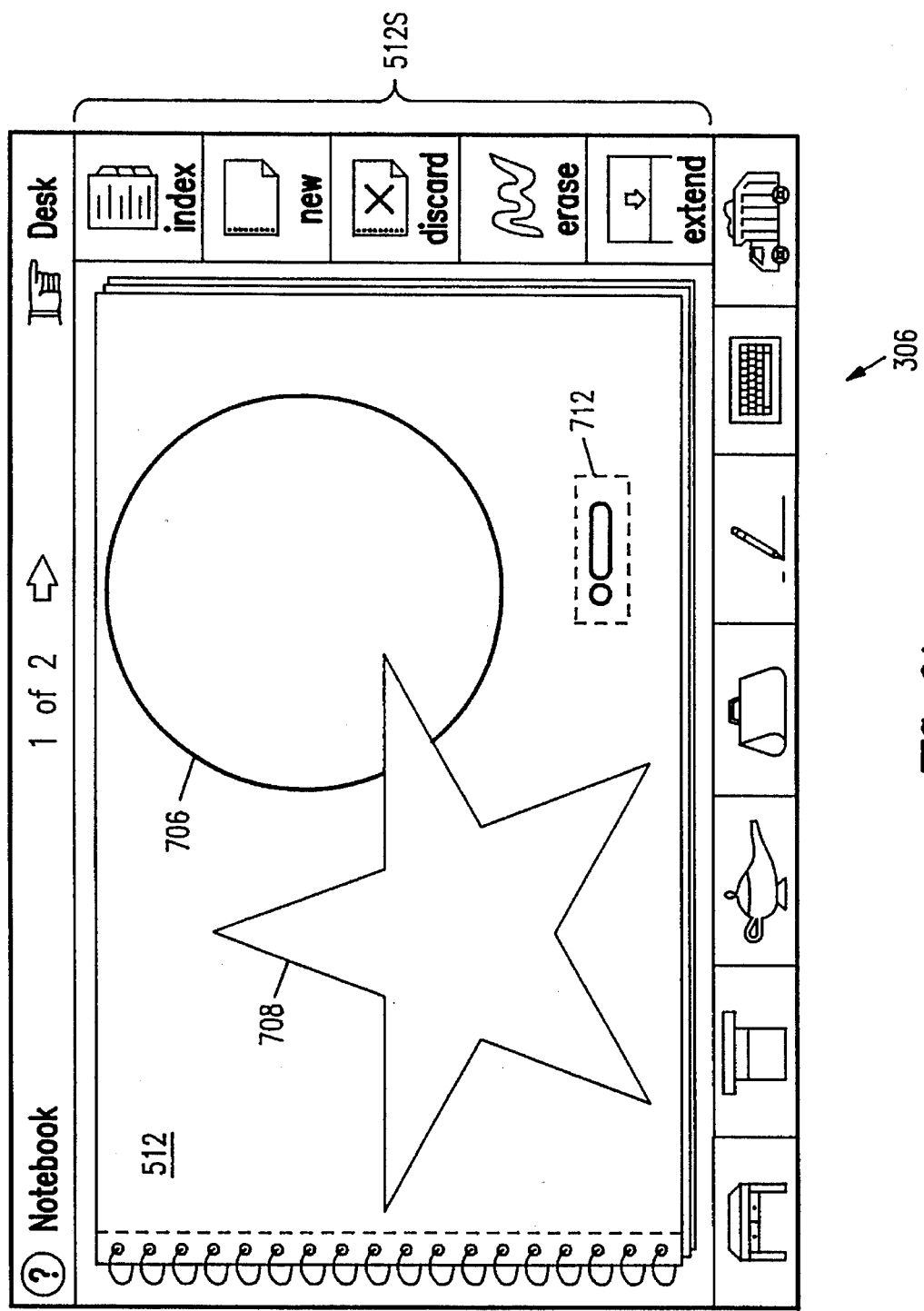
FIG. 9A

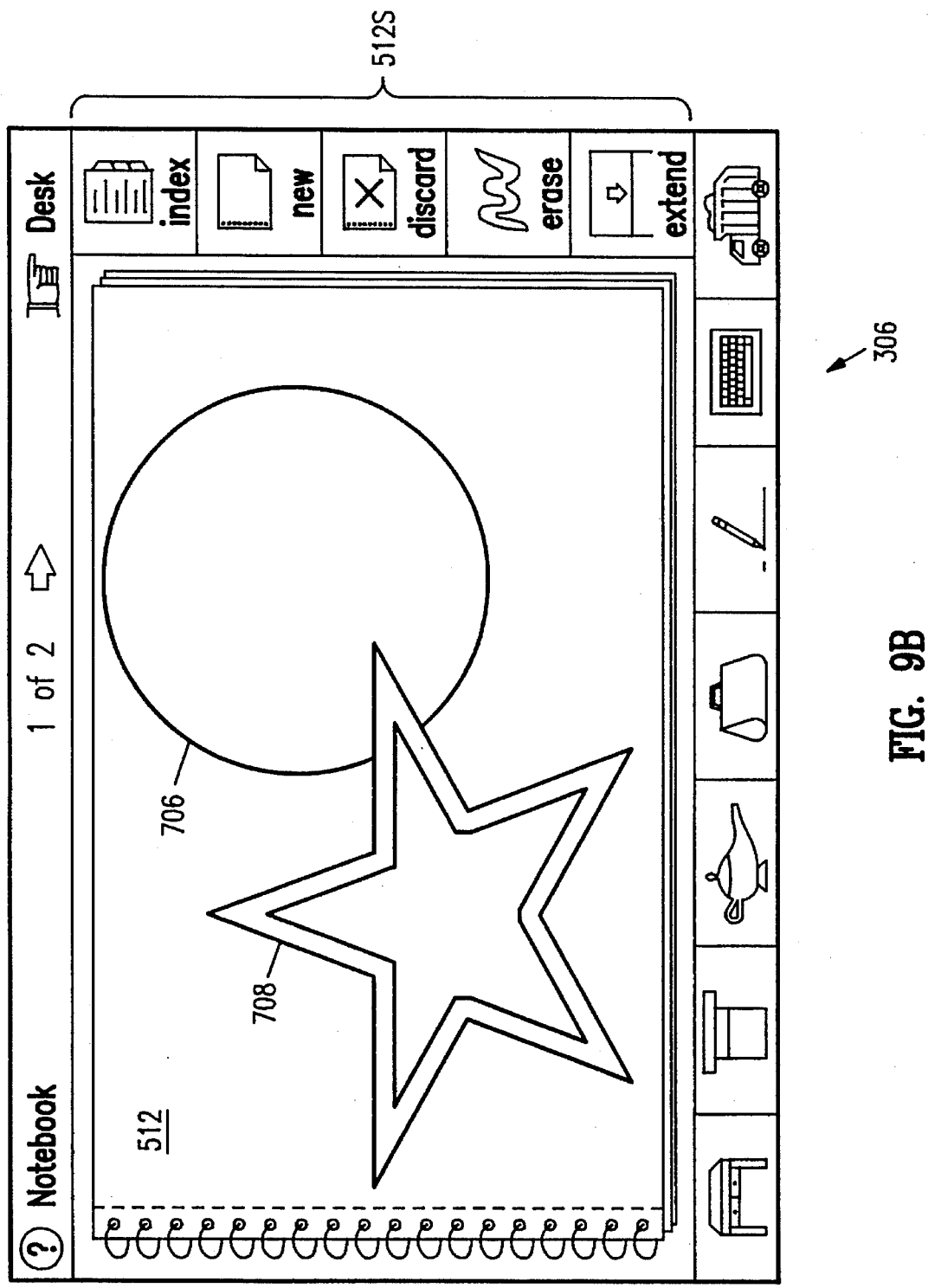
FIG. 9B

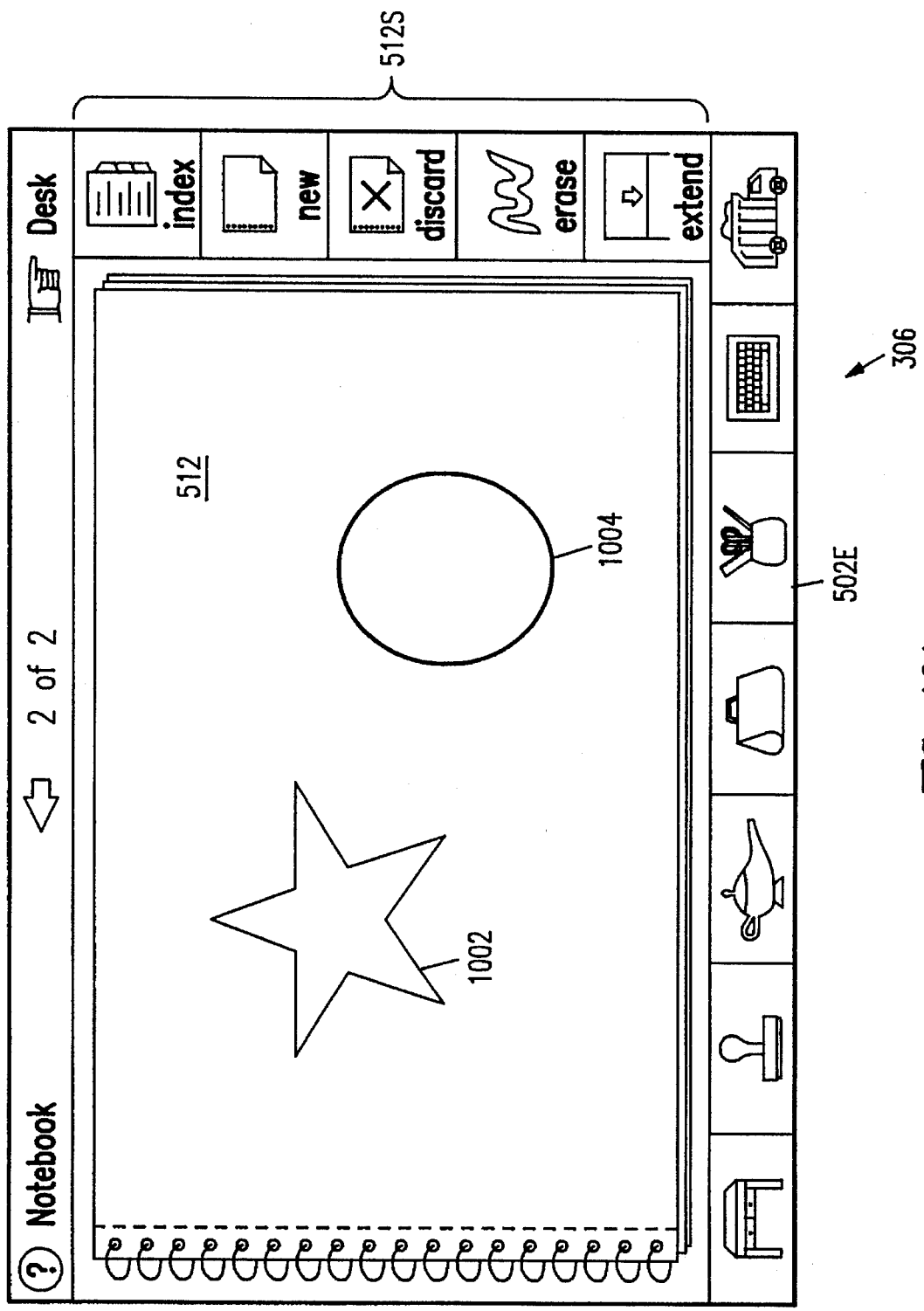
FIG. 10A

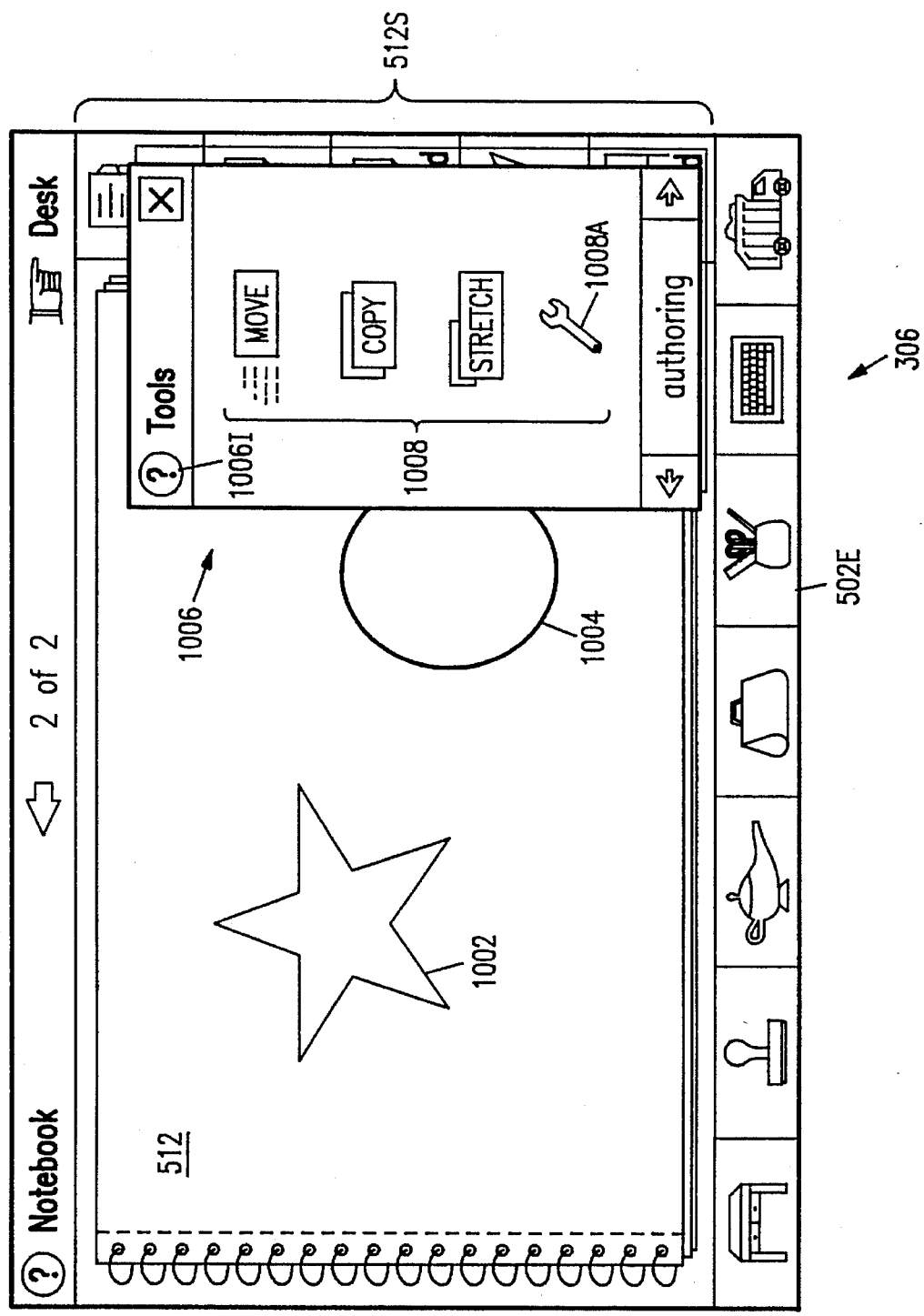
FIG. 10B

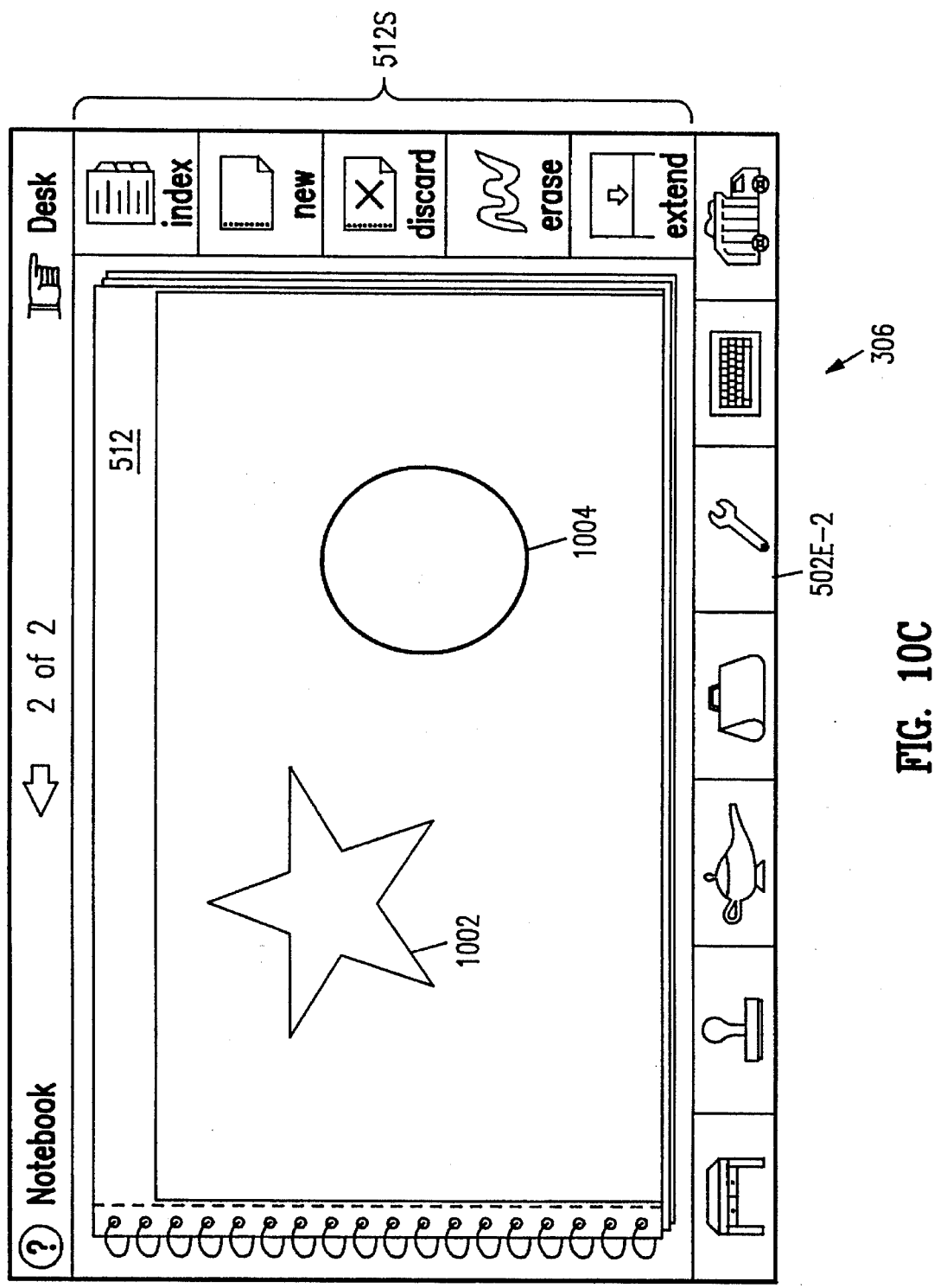
FIG. 10C

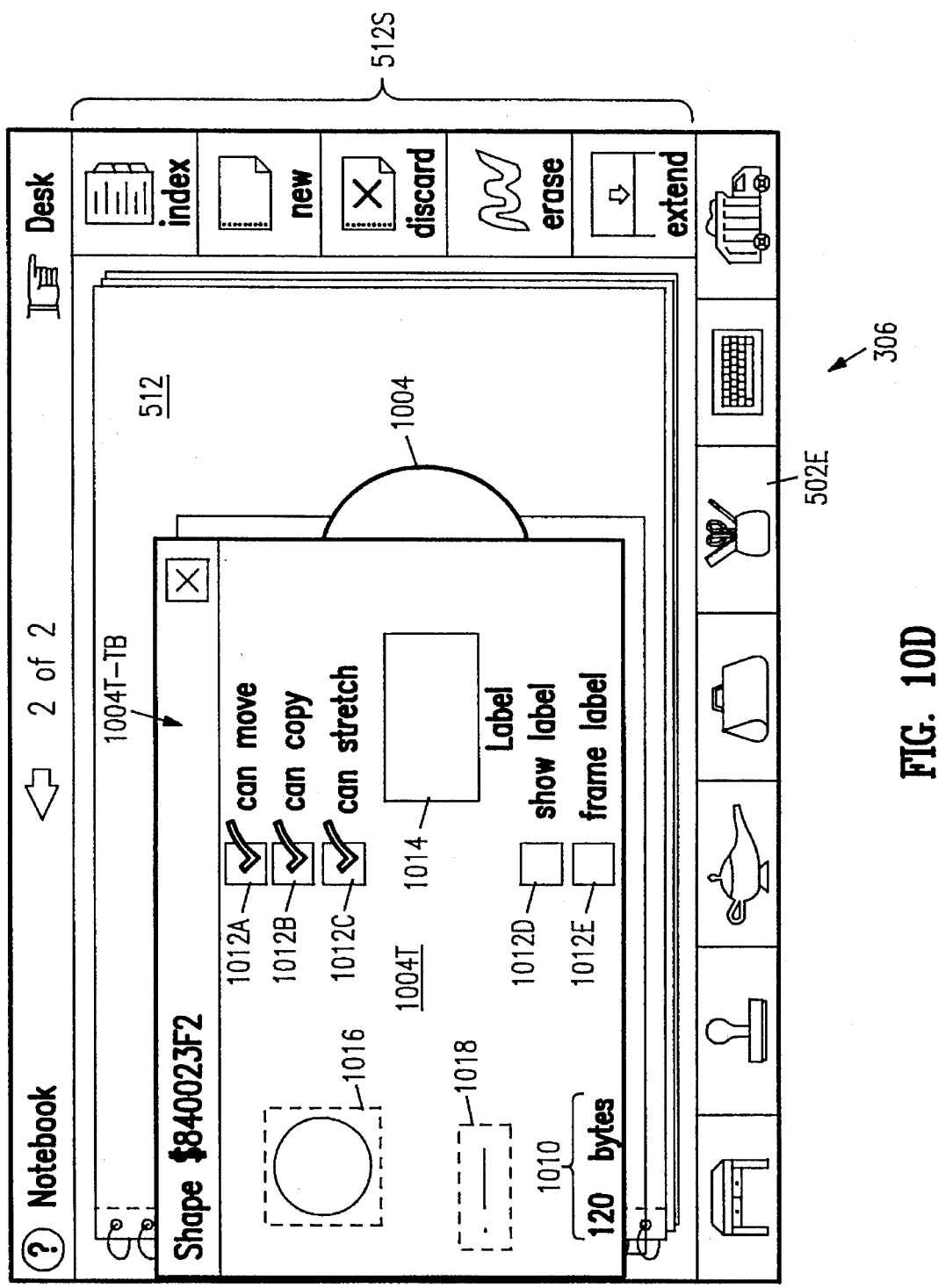
FIG. 10D

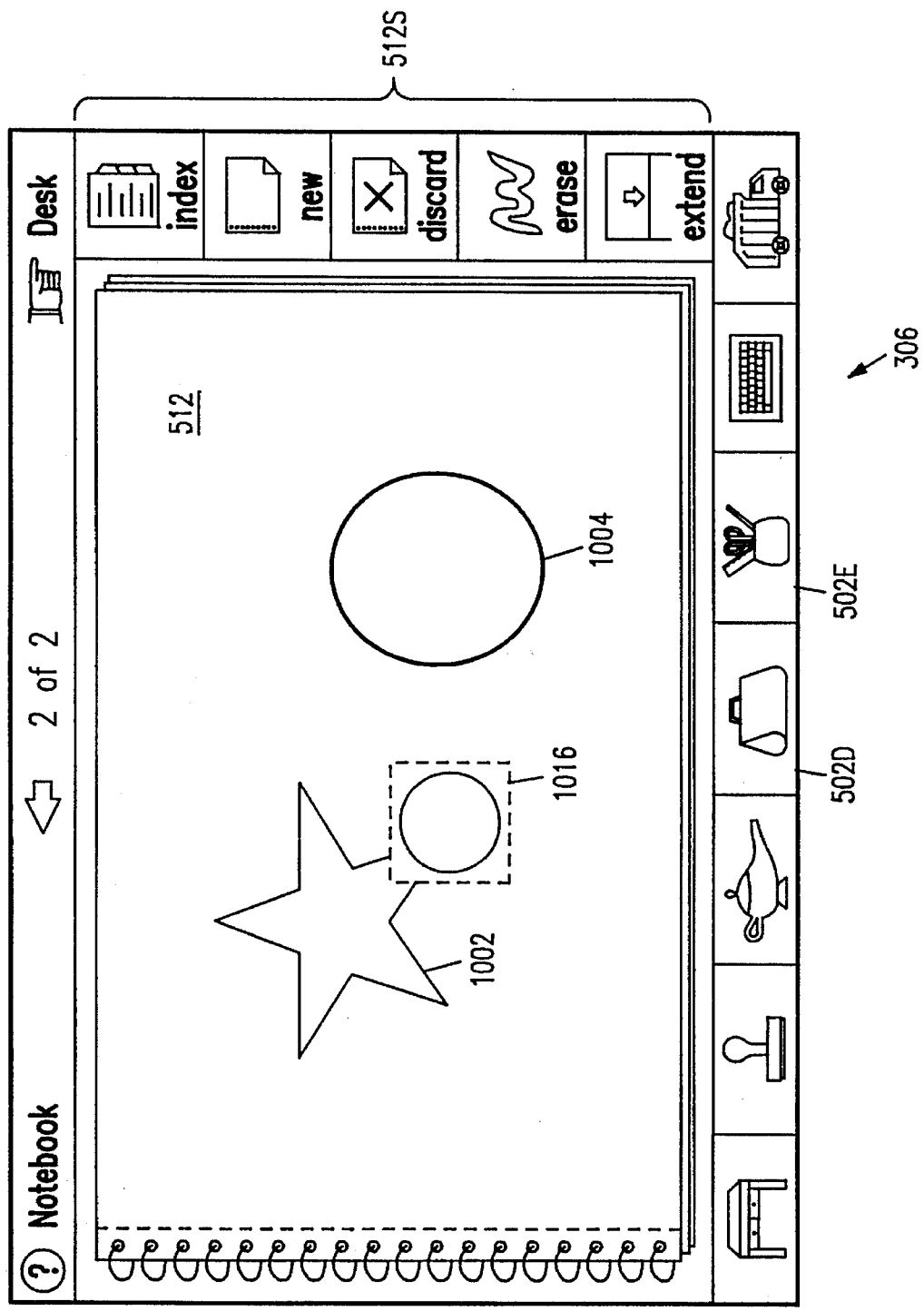
FIG. 10E

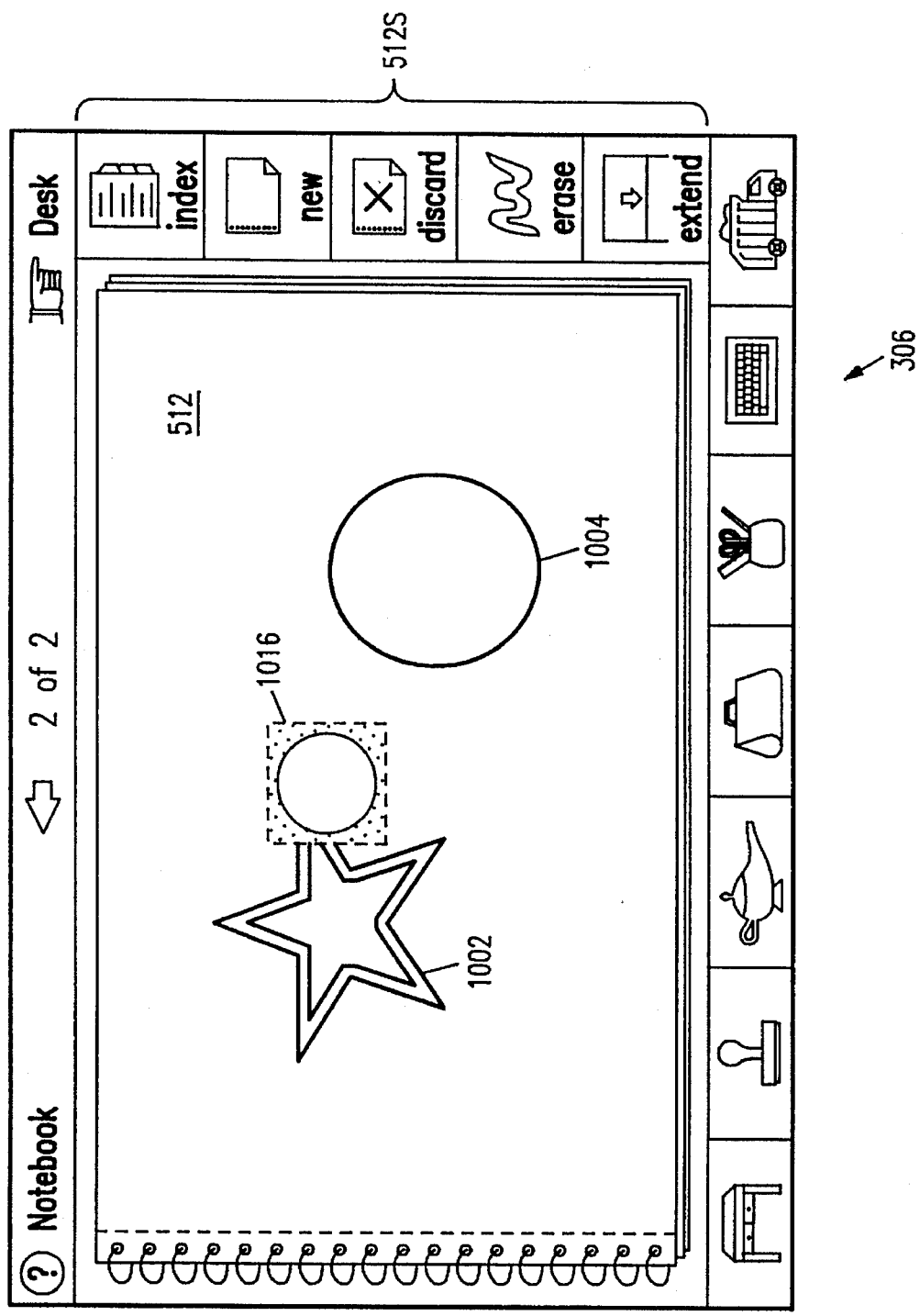
FIG. 10F

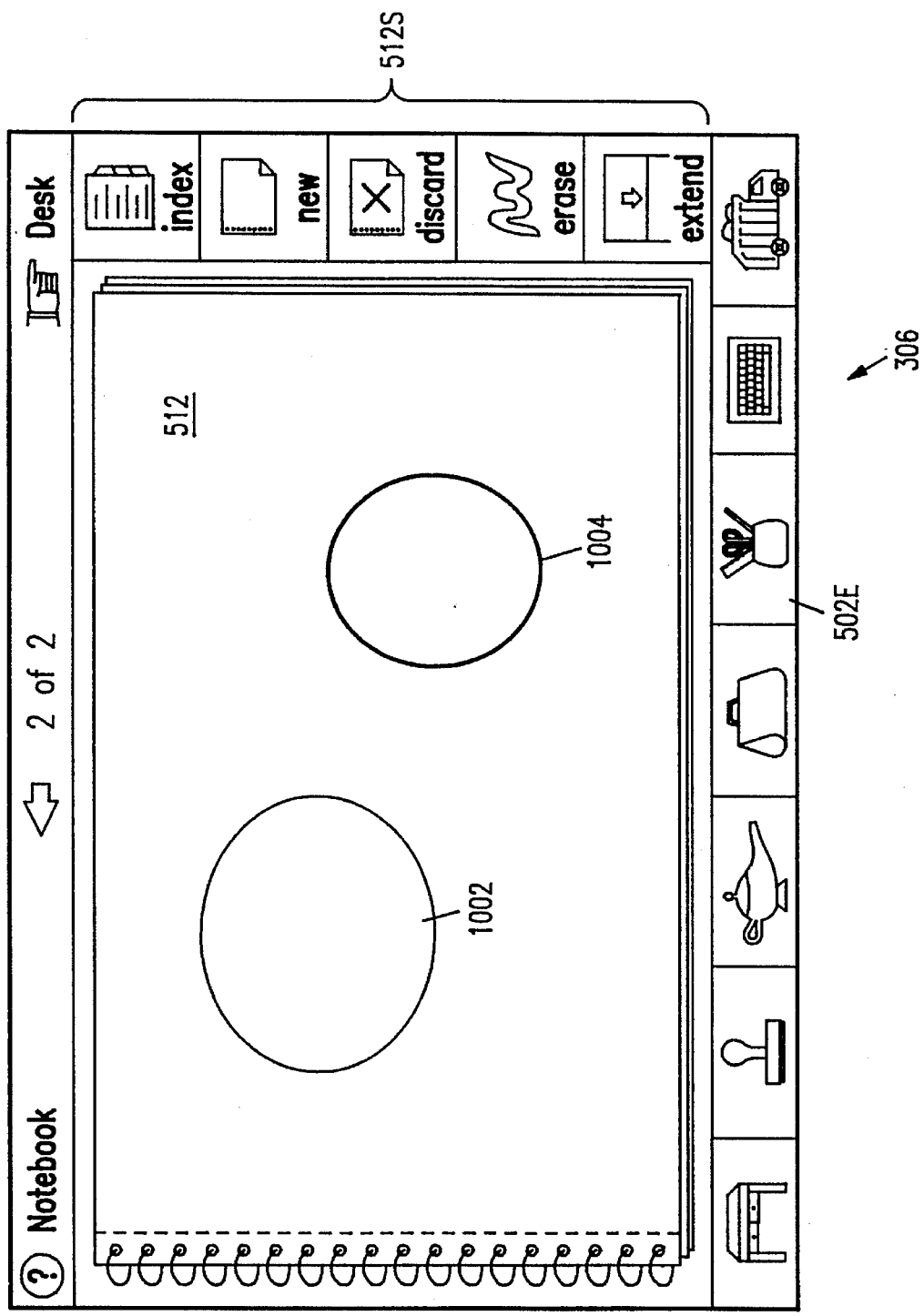
FIG. 10G

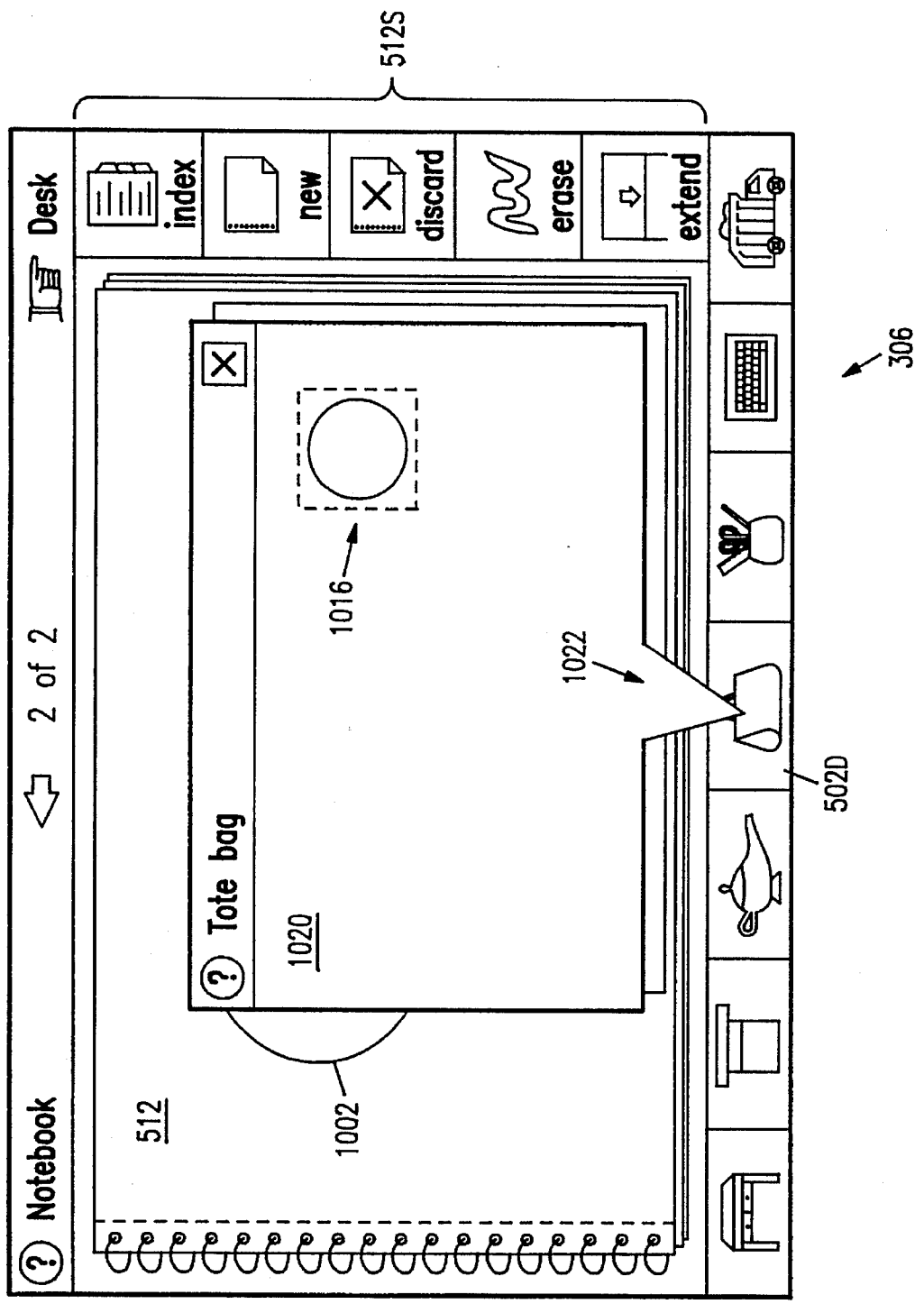
FIG. 10H

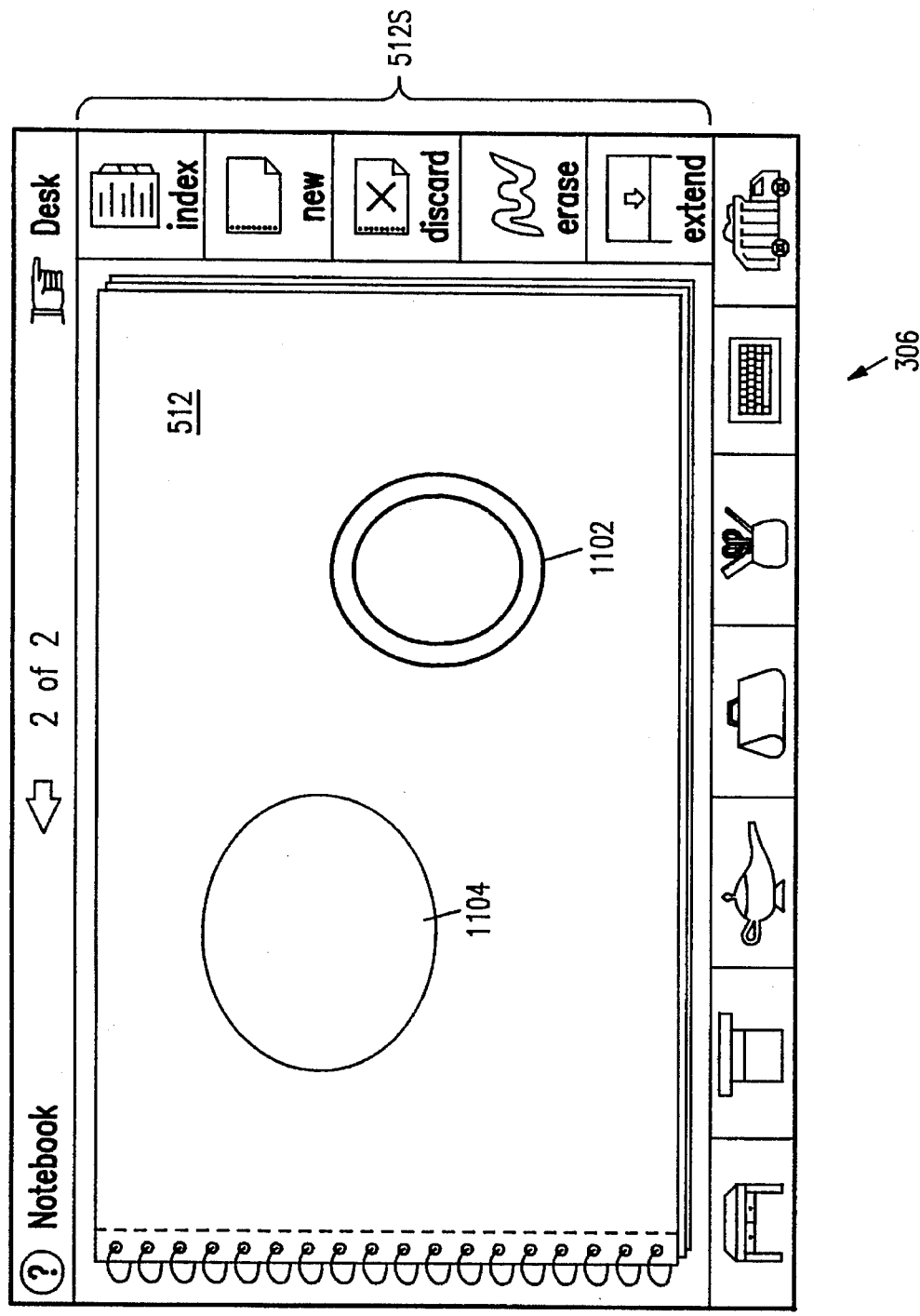
FIG. 11A

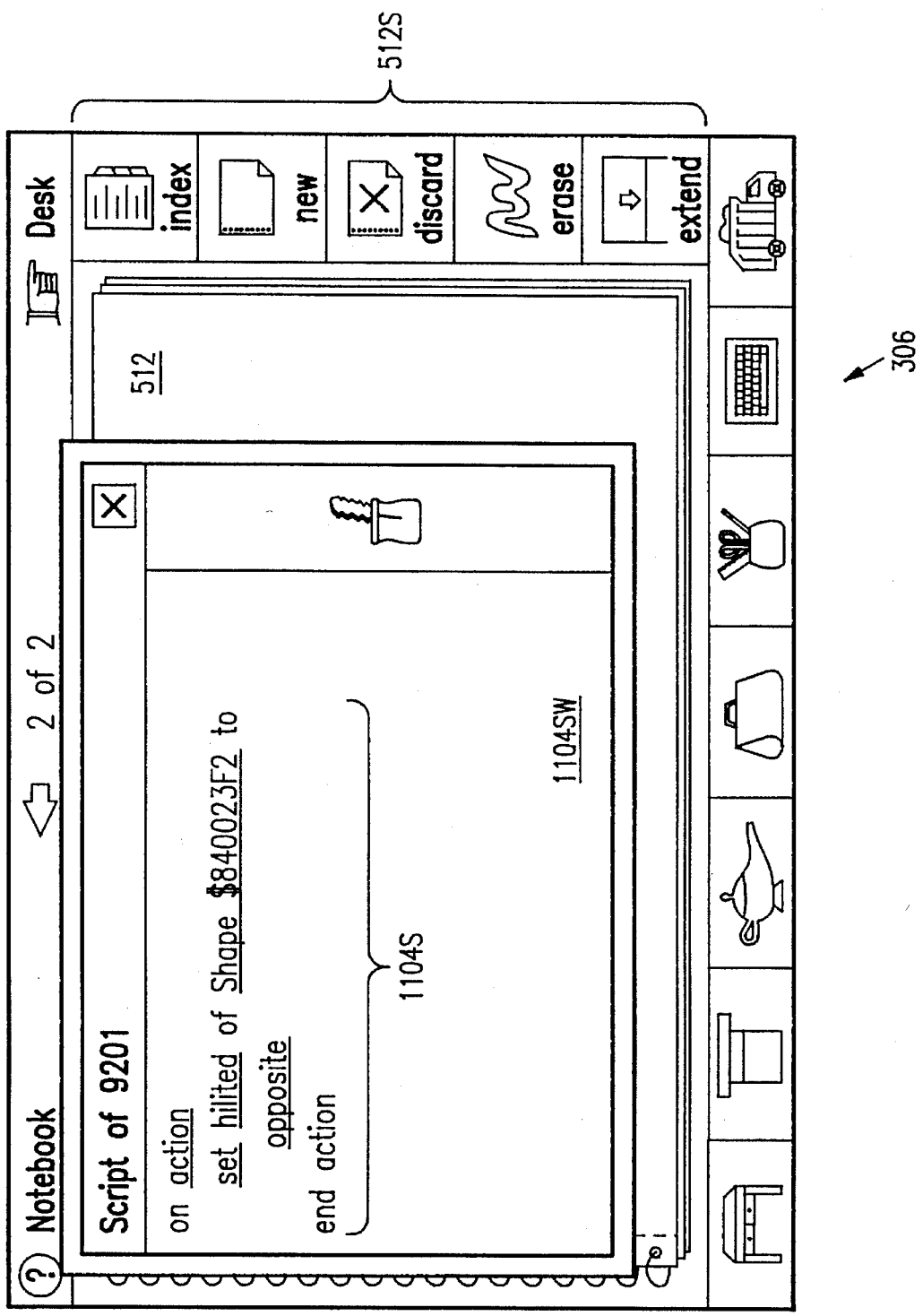
FIG. 11B

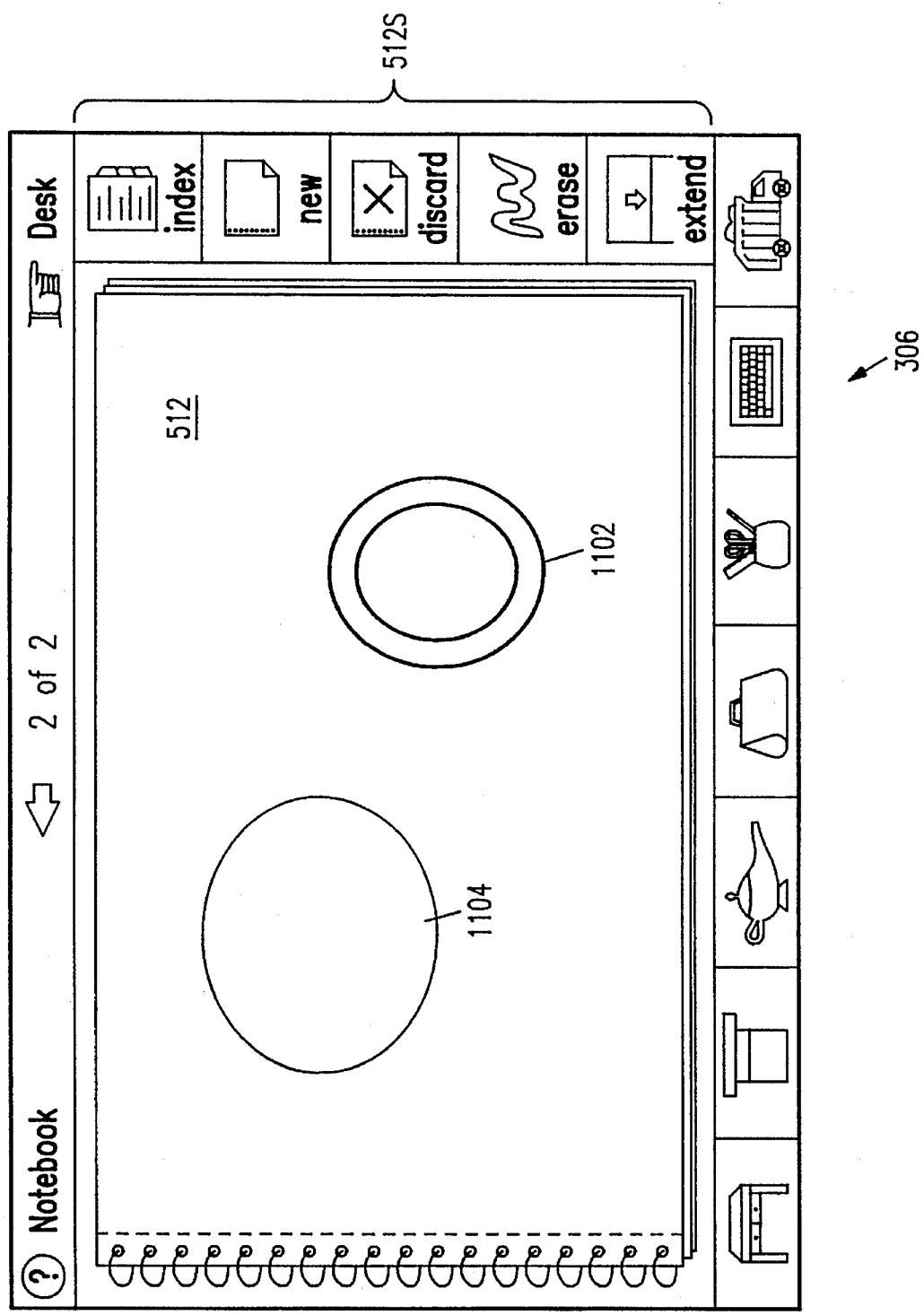
FIG. 11C

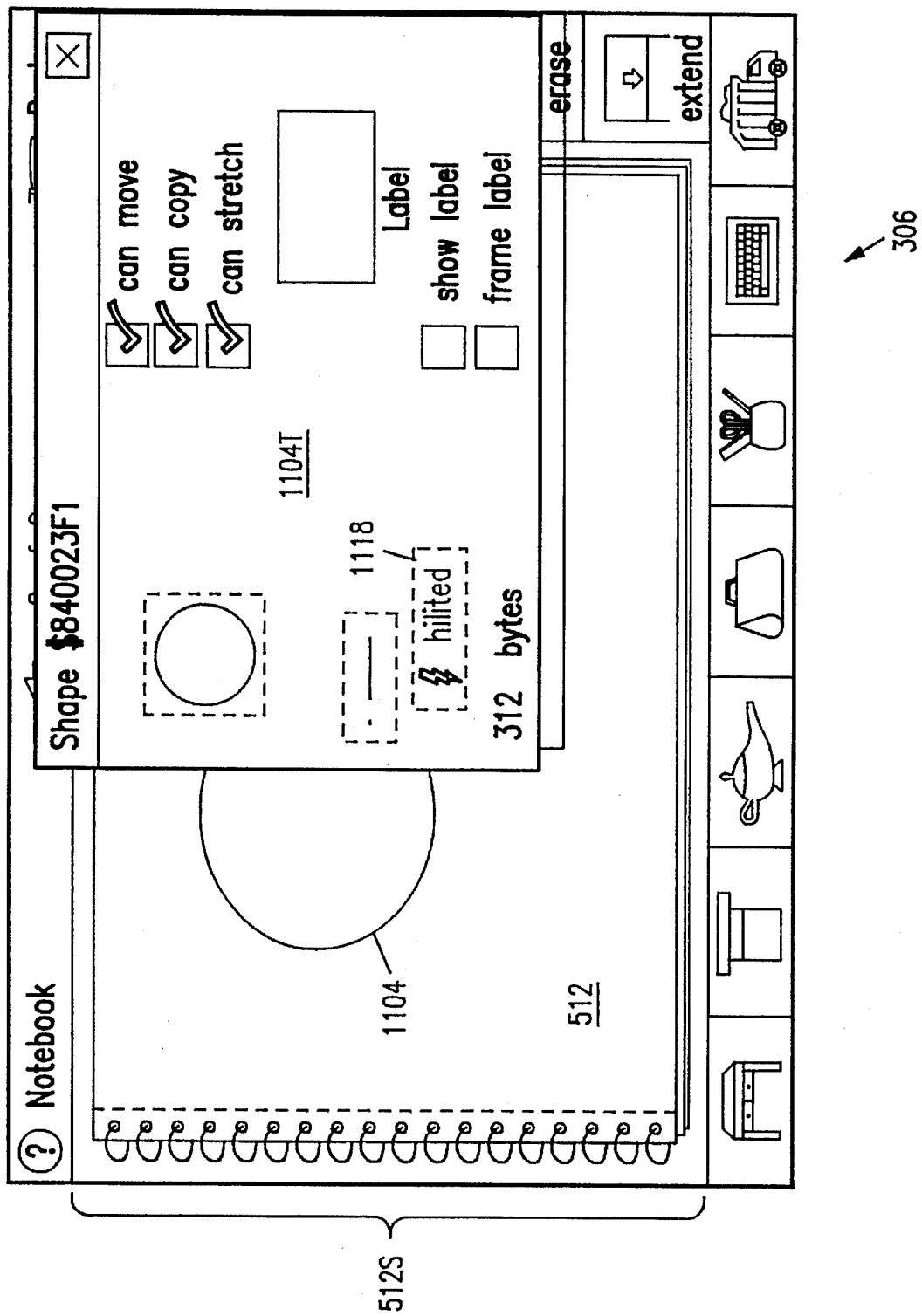
FIG. 11D

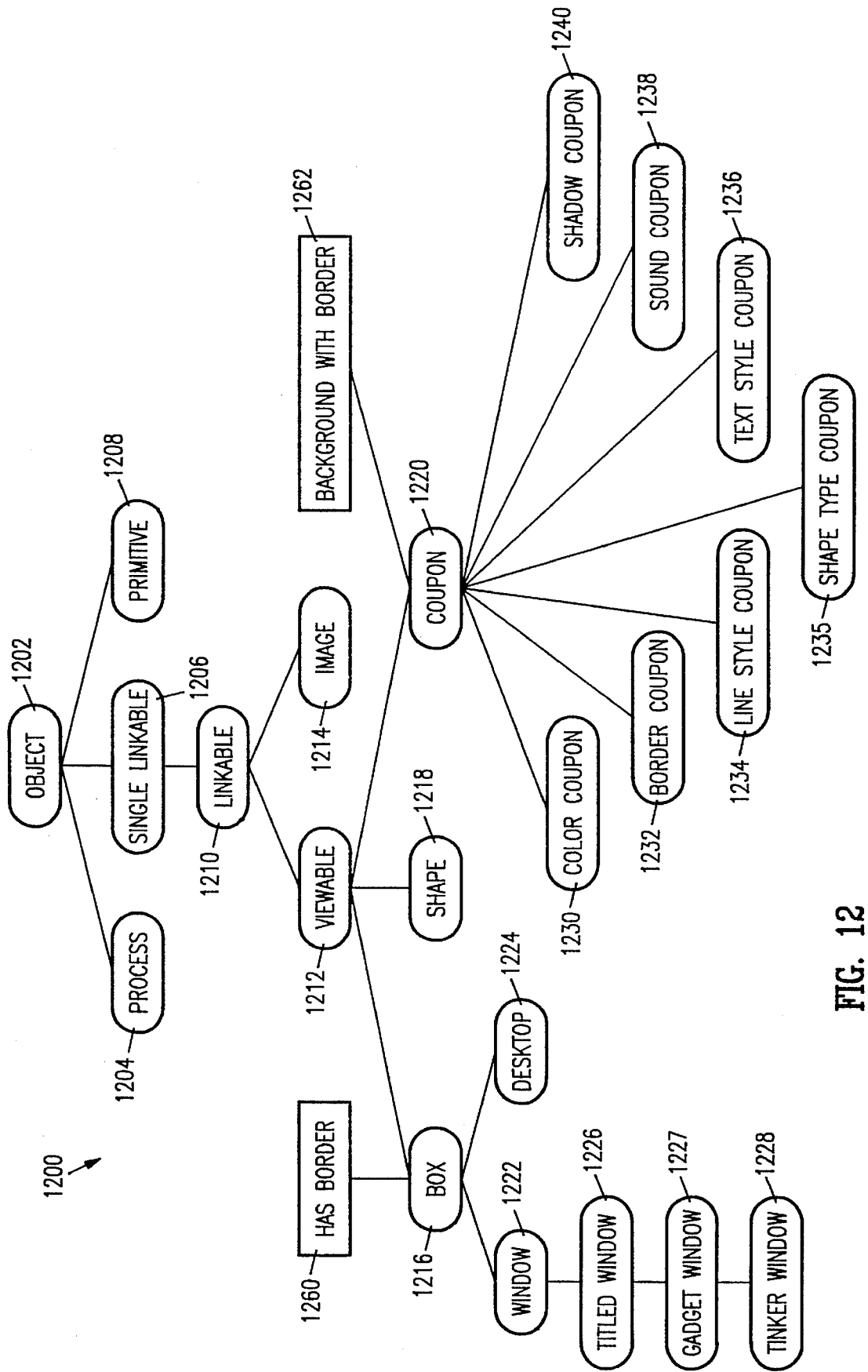
FIG. 12

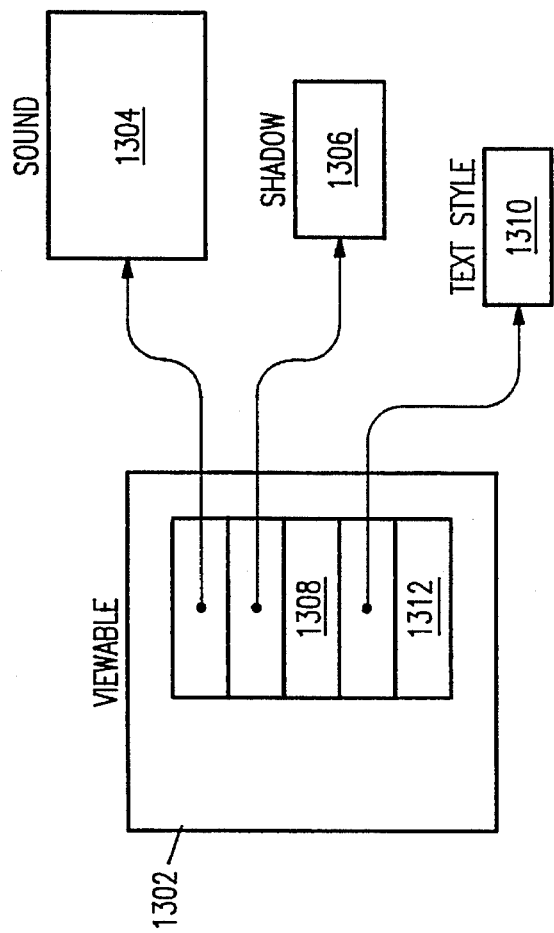
FIG. 13
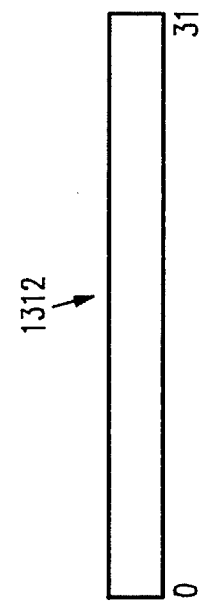
FIG. 15
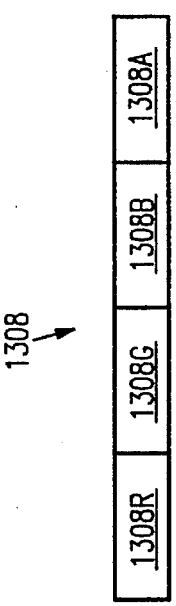
FIG. 14

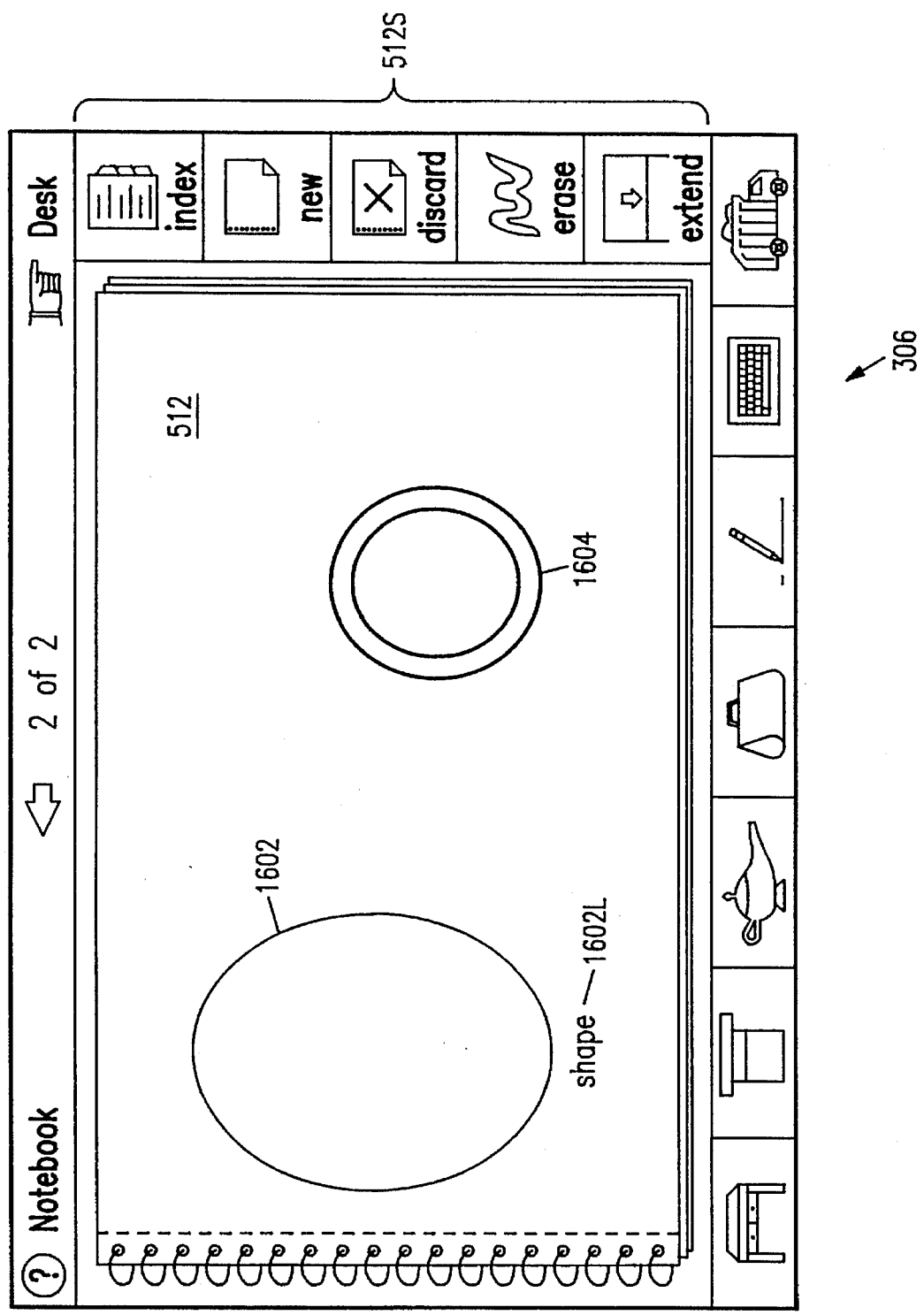
FIG. 16A

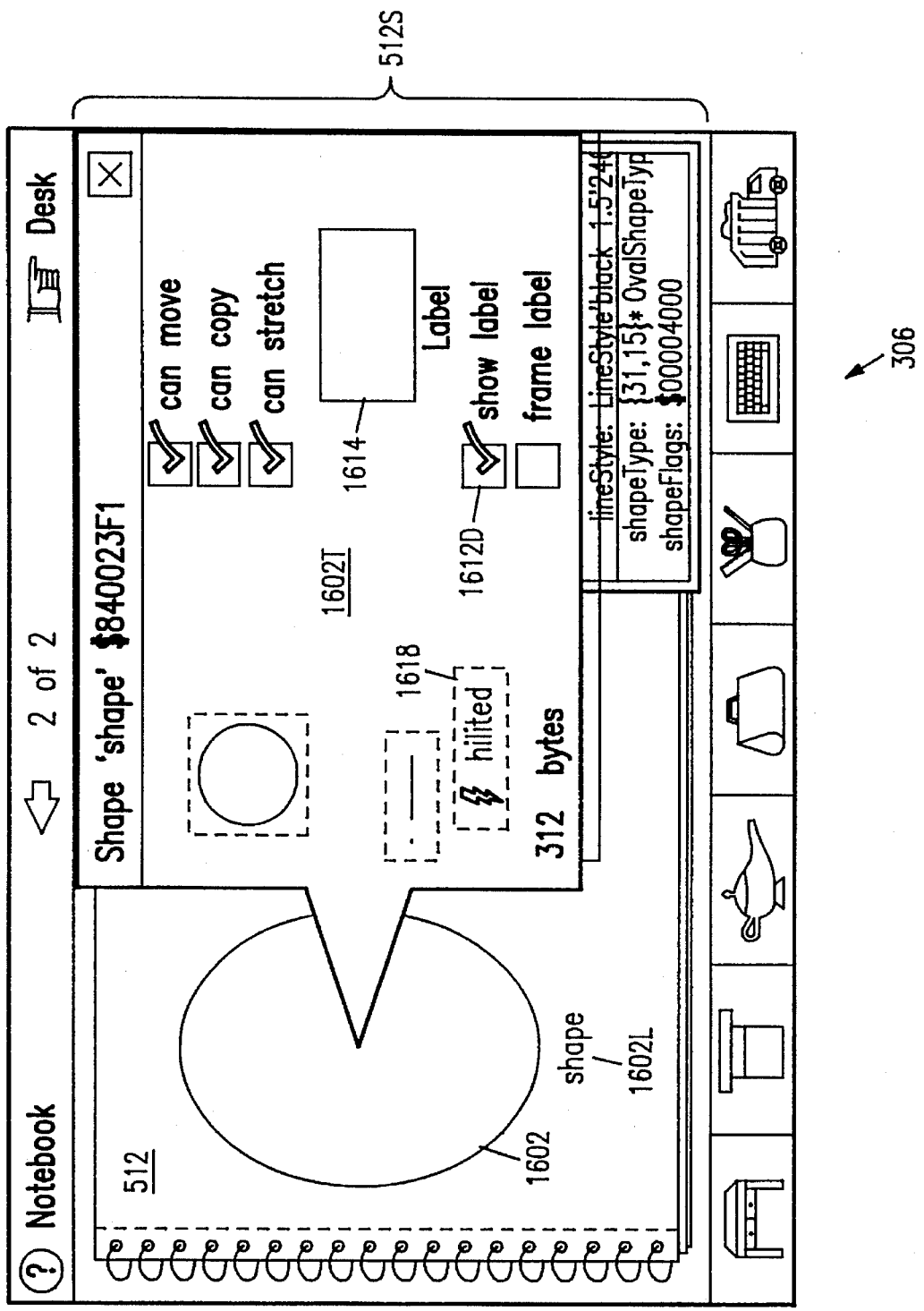
FIG. 16B

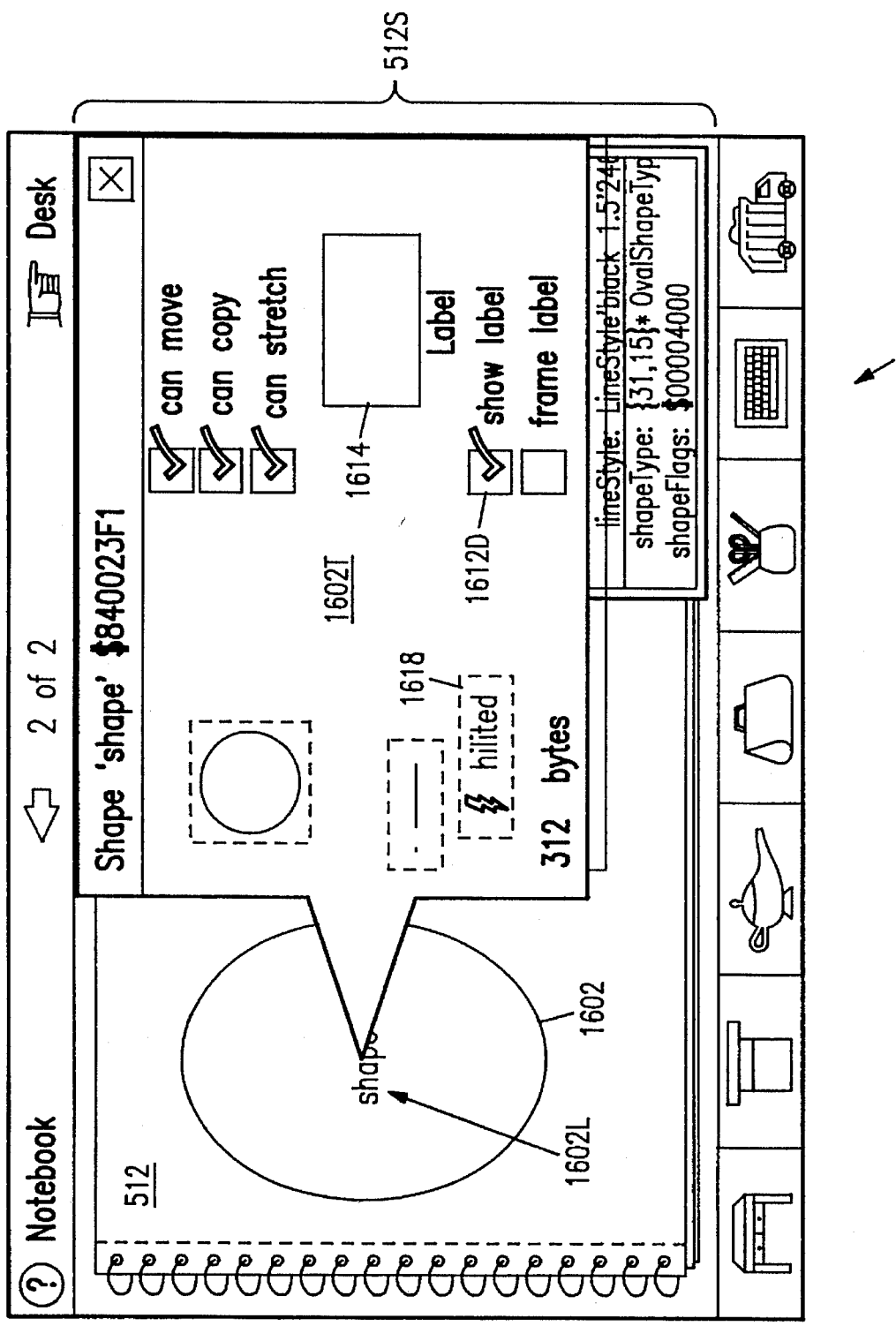
FIG. 16C

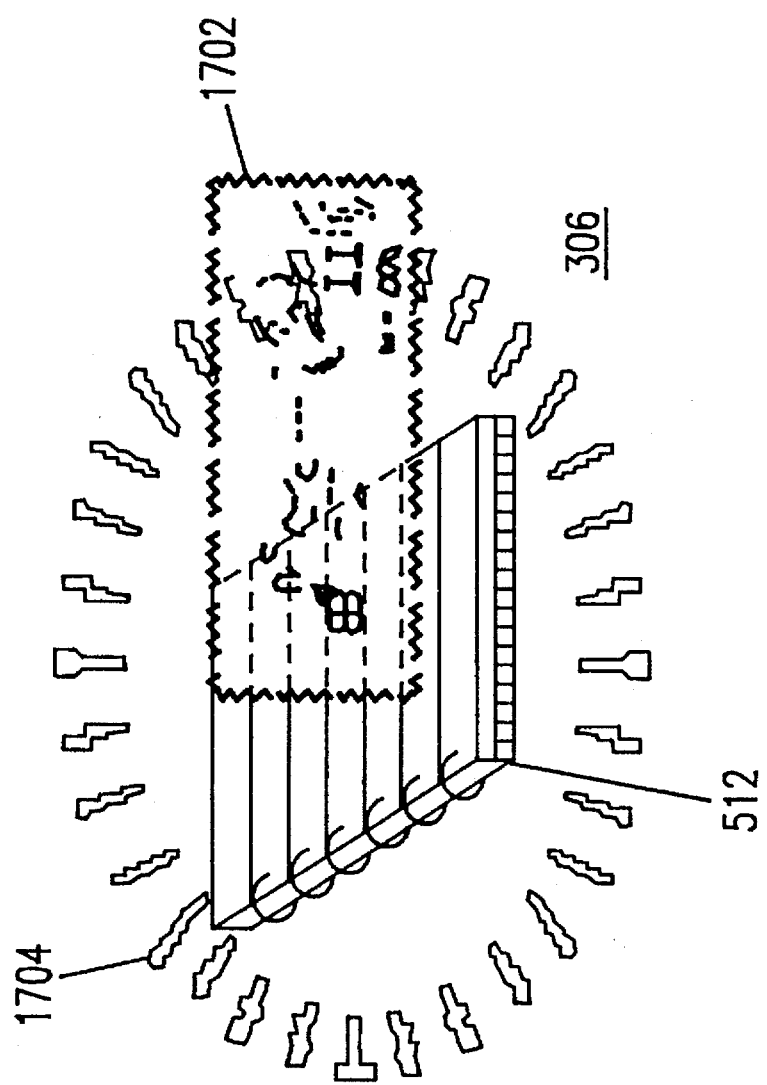
FIG. 17

GRAPHICAL USER INTERFACE FOR MODIFYING OBJECT CHARACTERISTICS USING COUPON OBJECTS

RELATED APPLICATIONS

This application is related to a co-pending application Ser. No. 08/235,603 filed Apr. 29, 1994 pending, by Kevin Lynch, Andrew J. Hertzfeld, and William D. Atkinson, entitled "Navigation System for a Graphical User Interface", (hereinafter called "the navigation application"). The navigation application is hereby incorporated herein in its entirety, including any appendices and references thereto, by reference.

FIELD OF THE INVENTION

The present invention relates to computer systems having objects which are displayed using graphical user interfaces and more particularly to systems for modifying characteristics of the objects of the computer systems.

BACKGROUND OF THE INVENTION

Many of the computers systems available today have a general structure which includes a central processing unit (CPU) which is coupled to a memory, a display device, a keyboard and a position locator via respective buses. A user manipulates the keyboard or the position locator to generate signals representing commands which are sent to the CPU across the respective bus. The position locator generates signals which indicate a position on a display screen of the display device; often the position corresponds to the location of a cursor which is displayed on the display screen. However, with touch sensitive display devices, the position may correspond to the location of the display device that is touched. Commonly used position locators include mouse devices, trackball devices, thumbwheels, tablets, scanline sensitive stili, touch or proximity sensitive display screens, joysticks, and radio-frequency digitizing devices. The term position locator is intended to include any device which indicates a position on a display screen. The CPU sends signals to the display device to cause the display device to display information, either in the form of text or in the form of graphical representations. The CPU retrieves instructions from the memory and executes the instructions to perform tasks. A group of instructions is collectively called a computer program. During execution by the CPU, the instructions are collectively called a computer process.

Information is displayed on the display screen as symbols, each symbol including icons, text, or both. Examples of symbols which are displayed on the display screen include a menu bar, icons, text and a time display. Each of these symbols represent various pieces of information or functionality. Each symbol has a number of visual characteristics. For example, an icon has a color and a shape and text has a font, a font size and a color. Similarly, a time display has a font, a size, a color, and a time display format, e.g., a 24-hour or a 12-hour clock.

There are two commonly used methods altering visual characteristics of a given symbol which is displayed on a display screen. With both of these methods, the given symbol must first be identified by the user. An example of a way in which a user identifies a symbol displayed on the display screen is by positioning a cursor over the symbol by appropriate manipulation of the position locator and actuating the position locator. For example, a mouse device is typically actuated by pressing a button on the mouse device.

In the first method for altering the visual characteristics of a symbol, the cursor is used to access a pull-down menu from the menu bar to provide a variety of characteristic options. The cursor is then positioned over a given characteristic option and the given characteristic option is highlighted. The user then actuates the position locator to cause the CPU to execute instructions which change the characteristic of the selected symbol to the characteristic indicated by the highlighted characteristic option. For example, referring to FIG. 1, the font characteristic of a selected text symbol may be altered by selecting font pull-down menu 102 from a menu bar, selecting a particular font characteristic, e.g., a Times font, from the pull-down menu as indicated by cursor 104 and actuating the position locator to select the particular font characteristic.

In the second method for altering a visual characteristic, a characteristic window in which information describing various characteristics is accessed and displayed. This characteristic window includes displays of various characteristic control devices such as buttons or types of selectors. By appropriate manipulation of the characteristic control devices, a user can alter the characteristics of a selected symbol. For example, referring to FIG. 2, the polygon characteristics of a selected symbol may be altered by accessing polygon attribute window 202, selecting a particular polygon characteristic (e.g., a open versus a closed polygon) from the window as indicated by a cursor and actuating the position locator to select the particular polygon characteristic.

An enhancement to this second method is exemplified by certain characteristic manipulation features which are present in the OS/2® operating system available from IBM Corporation of Armonk, N.Y. In the OS/2 operating system, a user can alter a characteristic of a graphical feature by a method known as dragging and dropping. The term "graphical feature", as used herein, is a graphical item or representation on a display device. Examples of graphical features include title bars of windows, a menu bar, icons, window backgrounds and the screen background. In such computer systems, a characteristic, such as a color, of a graphical feature is selected from a display of several possible values of the characteristic. The selected value is dragged and dropped onto the graphical feature to set the characteristic to that value. For example, in the OS/2® operating system, a color is selected by a user from a palette which is displayed on the display screen. The user then drags and drops the selected color onto the background, thus setting the color of the background to the selected color.

SUMMARY OF THE INVENTION

According to one aspect of the present invention, characteristics of objects are manipulated by the use of graphical coupons. Each coupon represents a particular value of a particular characteristic. When a coupon is dragged over and dropped onto a graphical representation of the object which possesses the particular characteristic, the value of the characteristic of the graphical object is set to the value represented by the coupon.

According to another aspect of the present invention, coupons, which represent the particular values of a number of the characteristics of a particular graphical object, are created. Each of the coupons can be used as described above to change a characteristic of a second object to the value of the same characteristic of the first-mentioned object.

Coupons are stored as data objects. A user can therefore store a coupon for later use or can transfer the coupon to a second user who can then replicate a particular characteristic in the working environment of the second user. A coupon is transferred to a second user using a second computer system by any known data transfer method. Characteristics of an object can include, for example, sounds, images, color, and functionality. The ability of a user to easily and intuitively transfer the characteristics of one object to other objects represents a substantial improvement in the art of graphical user interfaces in which users are able to conveniently and intuitively customize their computing environment.

Object-oriented frameworks are extensible in that functionality can be added to an existing framework by defining subclasses of existing classes and defining new fields and methods or superseding inherited methods. As coupons are created and used in an object-oriented and extensible framework, new classes of coupons with new functionality can be created.

BRIEF DESCRIPTION OF THE DRAWINGS

FIG. 1 is an illustration of a pull-down menu characteristic alteration system of the prior art.

FIG. 2 is an illustration of a dialogue box characteristic alteration system of the prior art.

FIG. 3 is a block diagram of a hand held personal computer which includes a characteristic alteration system in accordance with the present invention.

FIGS. 4A–4C are logic flow diagrams which illustrate the use of coupons and tinker windows in accordance with the present invention.

FIG. 5 is a plan view of a desktop room presentation of a graphical user interface in accordance with the present invention.

FIGS. 6A–6F are plan views of a postcard representation illustrating the use of coupons in accordance with the present invention.

FIGS. 7A, 7B, 8A, 8B, 9A, and 9B are plan views of a notebook representation illustrating the use of coupons in accordance with the present invention.

FIGS. 10A–10C are plan views of a notebook representation illustrating the initiation of tinker mode by a user in accordance with the present invention.

FIGS. 10D–10G are plan views of a notebook representation illustrating the use of tinker window in accordance with the present invention.

FIG. 10H is a plan view of a notebook representation showing an open tote bag and contents of the tote bag.

FIGS. 11A–11D are plan views of a notebook representation illustrating script coupons in accordance with the present invention.

FIG. 12 is a class diagram of the class hierarchy of coupons and tinker windows.

FIG. 13 is a block diagram representing the structure of a viewable object.

FIG. 14 is a diagram of a representation of a color.

FIG. 15 is a diagram of a view flag field of the viewable object of FIG. 13.

FIGS. 16A–16C are plan views of a notebook representation showing a control within a tinker window for changing label positions.

FIG. 17 is a plan view of a representation of a notebook in a highlighted state in accordance with the present invention.

DETAILED DESCRIPTION

The following sets forth a detailed description of the best contemplated mode for carrying out the invention. The description is intended to be illustrative of the invention and should not be taken to be limiting.

Referring to FIG. 3, personal computer system 300, which functions as a handheld personal communicator, includes central processing unit (CPU) 302 which is coupled to memory 304, display device 306, option key 307, communication device 308 and option card slot 309. Memory 304 includes random access memory. Memory 304 also includes non-volatile memory such as read only memory or magnetic discs.

Display device 306 is, for example, a liquid crystal display (LCD) having 480 columns by 320 rows of pixels, each pixel being capable of displaying one of four levels of grey. Display device 306 is a touch sensitive display device which provides signals to CPU 300 when display device 306 is touched by a touching device such as stylus 310 or by the finger of a user. The signals include signals indicating the coordinate location of display device 306 where the touch occurred. Accordingly, in addition to functioning as a display device, touch sensitive display device 306 functions as a position locator.

While touch sensitive display device 306 is described herein as the position locator used with the present invention, any known position locator can be used with the present invention. Other position locators which can be used with the present invention include mouse devices, trackball devices, thumbwheels, tablets, scanline sensitive stili, joysticks and radio-frequency digitizing devices. The term position locator refers to any device which can be used to indicate a position on the display screen.

Often the position indicated by a position locator corresponds to the location of a cursor which is displayed on the display screen. However, with touch sensitive devices, the position corresponds to the location that is touched. Most position locators are operable in an actuated state and in a deactuated state. For example, mouse devices often include a mouse button, the pressing of which places the mouse device in an actuated state and the releasing of which places the mouse device in a deactuated state. Touch sensitive display device 306 is in an actuated state while touched and in a deactuated state while not touched.

Actuating a position locator, i.e., placing the position locator in an actuated state, while the position locator indicates the position at which an object is displayed in display device 306 is herein called touching the object. The touching of an object, which can be effected with any known position locating device, should not be confused with the physical touching of touch sensitive display device 306 which actuates touch sensitive display device 306 and indicates a point on display device 306. For example, an object can be touched using a mouse device as a position locator by manipulating the mouse to indicate a position within display device 306 occupied by the object and actuating the mouse device.

The terms drag and drop are used herein as they are generally understood in the art. An object is dragged across display device 306 by (i) using the position locator to indicate a position at which the object is displayed; (ii) actuating the position locator; (iii) changing the position indicated by the position locator to a second position while maintaining the position locator in an actuated state; and (iv) deactuating the position locator to thereby drop the object at the second position. With respect to dragging and dropping objects across display device 306 while using touch sensitive display device 306 as a position locator, an object is dragged and dropped by (i) touching display device 306 with, for example, stylus 310 at a position at which the object is displayed; (ii) moving stylus 310 to a second position on display device 306 while keeping stylus 310 in physical contact with display device 306; and (iii) removing stylus 310 from physical contact with display device 306 to thereby "drop" the object at the second position. A user can use, in the place of stylus 310, any similar physical object, e.g., a finger of the user, to drag a graphical object across touch sensitive display device 306.

Option key 307 provides signals to CPU 302 indicating when option key 307 is activated. Generally, option key 307 is activated in combination with activation of a location on display device 306.

Memory 304 stores Magic Cap™ system software 312 which controls the operation of system 300. System software 312 includes groups of instructions which are organized as objects. During operation of system 300, CPU 302 retrieves the objects from memory 304 and executes the objects 304 to perform tasks. Computer system software 312 includes objects which provide a graphical user interface to display device 306. The graphical user interface includes a navigation system which allows a user to navigate within computer system software 312 using metaphors of physical objects. The graphical user interface allows a user to access and control system 300 via visual presentations that are provided by display device 306.

Referring to FIGS. 4A–4C, some principal aspects of the present invention are described. Logic flow diagram 400 (FIG. 4A) illustrates the general behavior of a coupon. When a coupon is touched, the coupon is dragged and dropped in step 402. Step 402 is represented by logic flow diagram 402 (FIG. 4B) and is described in greater detail below. When the coupon is dropped, system software 312 determines whether the coupon is positioned over an object which can accept the coupon in step 404.

If the coupon is not positioned over such an object, processing transfers to terminal step 412 in which processing according to logic flow diagram 400 terminates. The coupon remains displayed in display device 306, and the coupon can again be dragged and dropped by a repeated performance of the steps of logic flow diagram 400. Conversely, if the coupon is positioned over an object which can accept the coupon, processing transfers to step 406 in which the characteristic, which corresponds to the coupon, of the object is set to the value represented by the coupon. Once the characteristic of the object is set, the coupon is deleted in step 408 and the object is redrawn to reflect the new state of the object in step 410.

Referring to FIG. 4B, step 402 is shown in greater detail as logic flow diagram 402. As a coupon is dragged across display device 306, the coupon is repeatedly erased and redrawn on display device 306. In step 432, a new location at which the coupon is to be redrawn is determined in response to touching of display device 306 as described below in greater detail. The coupon is then erased from display device 306 and redrawn at the new location in step 434. System software 312 then determines whether the coupon is over an object which can accept the coupon in step 436.

If the coupon is over an object which can accept the coupon, system software 312 redraws the object in a highlighted state to indicate to the user that the object can accept the coupon in step 440 and redraws the coupon in a faded state in step 442. Highlighting the object and fading the coupon provides intuitive feedback to the user that dropping the coupon at its present location results in the use and deletion of the coupon.

If system software 312 determines in step 436 that the coupon is not over an object which can accept the coupon, processing transfers to step 444. Alternately, from step 442, processing transfers to step 444. In step 444, system software 312 determines whether the coupon is dropped. If the coupon is not dropped then the dragging process is still active and processing transfers to step 432 so that a new location for the coupon can be determined. Conversely, if the coupon is dropped, then the dragging and dropping process of step 402 of FIG. 4A is complete and processing transfers to step 404.

Referring to FIG. 4C, logic flow diagram 460 illustrates the creation of a tinker window. More specifically, in step 462, system software 312 opens a new tinker window for a selected object. System software 312 creates a number of controls which reflect the state of the object and which enable the manipulation of the state of the object in step 464. In step 466, the controls are placed in the tinker window.

In step 468, system software 312 creates one or more coupons which represent respective particular values of respective characteristics of the object. The behavior of each of the coupons is described above with respect to FIGS. 4A and 4B. System software 312 places the coupons in the tinker window in step 470.

A user transfers characteristic values from the object to a second object by dragging and dropping onto the second object one of the coupons, which represents a particular value of a particular characteristic of the first-mentioned object, from the tinker window. As the coupons are themselves objects, a user can store a coupon for later use or can transfer the coupon to a second user of a second computer system who can then replicate a particular characteristic in the working environment of the second user. A coupon is transferred to the second user using a second computer system by any known data transfer method. Characteristics of an object can include, for example, sounds, images, color, and functionality. The use of coupons within tinker windows advantageously allows a user to easily and intuitively transfer the characteristics of one object to other objects.

Referring to FIG. 5, system software 312 implements a novel graphical user interface which is disclosed in the above-referenced navigation application. FIG. 5 shows a display produced by system software 312 on display device 306. In a preferred embodiment, system software 312 implements an object oriented language in which objects displayed in display device 306 are also objects stored in memory 304. Button strip 502 of display device 306 contains several command buttons, e.g., desk button 502A, stamper button 502B, magic lamp button 502C, tote bag button 502D, tool holder button 502E, keyboard button 502F, and trash button 502G. In desk room scene 500, system software 312 displays a desk 504. Desk 504 is a graphical object and includes stationery drawer 504A and overflow drawer 504B. Several other graphical objects are placed in desk room scene 500 by system software 312. On top of desk 504 are telephone 506, address cards 508, postcard 510, notebook 512, and calendar 514. On the wall behind desk 504 are clock 516, in box 518, out box 520, and file cabinet 522. In box 518 contains postcard 518P.

The user selects an object or a command by touching the object or the button corresponding to the command, respectively. For example, when the user touches in box 518 (FIG.

5) in display device 306, postcard 518P is redrawn by system software 312 to fill a substantial portion of display device 306 as shown (FIG. 6A) to form a postcard scene 518S. Postcard 518P contains text 518T. When a first graphical object contains a second graphical object, the second graphical object is a subview of the first graphical object and the first graphical object is a superview of the second graphical object. Text 518T is therefore a subview of postcard 518P. Text 518T has several characteristics such as a color characteristic, a text style characteristic and a text characteristic. The text characteristic of text 518T defines the letters and symbols which collectively form text 518T. The coupon function of system software 312 provides the user with a convenient way to change some of the characteristics of objects such as text 518T.

More specifically, referring to FIGS. 6A–6F, when the user touches a magic hat button 502B-2 (FIG. 6B), system software 312 displays a Magic Hat coupon window 602 on display device 306. Magic Hat coupon window 602 is also accessible through use of stamper button 502B (FIG. 6A) as described below. Coupon window 602 contains coupon selector controls 602A–602H. Controls 602A–602H allow a user to select a particular characteristic to modify. When one of the selector controls 602A–602H is touched, a coupon window is displayed which provides a user with a variety of coupons representing different values to which the particular characteristic may be modified.

For example, if the user wishes to change the text style of text 518T, then the user touches coupon selector 602F labelled TEXT STYLES. When control 602F is touched, system software 312 (FIG. 3) replaces Magic Hat window 602 with a Text Styles coupon window 604 (FIG. 6C) in display device 306. Text Styles coupon window 604 contains drawers 606, including drawer 606A which is labelled STYLED. When the user touches drawer 606A, drawer 606A is opened, i.e., is drawn as open on display device 306 by system software 312. Additionally, the contents of drawer 606A, i.e., coupons 608, are displayed in Text Styles window 604. Each of drawers 606 contains a number of text style coupons and operates as described with respect to drawer 606A.

In an illustrative example in which the user wishes to change the style of text 518T to Book font, 12 point and underlined, the user touches coupon 608A which represents a text style which is Book font, 12 point and underlined. When the user touches coupon 608A, coupon 608A is selected and Text Styles window 604 is closed as shown in FIG. 6D. The user then drags coupon 608A over text 518T.

As coupon 608A is being dragged, system software 312 determines whether coupon 608A is positioned over any objects which can accept coupon 608A. Since text 518T has a text style characteristic, text 518T can accept coupon 608A. When coupon 608A is dragged over text 518T, text 518T is highlighted as shown in FIG. 6E and coupon 608A is shown in a faded state. The faded state of coupon 608A indicates to the user that dropping coupon 608A at its present location would result in the use and deletion of coupon 608A. To set the text style characteristic of text 518T to the particular text style represented by coupon 608A, the user drops coupon 608A while text 518T is highlighted and coupon 608A is shown in a faded state. When the user drops coupon 608A, system software 312 sets the text style of text 518T to the style represented by coupon 608A and deletes coupon 608A as shown in FIG. 6F.

Thus, system software 312 provides a convenient and intuitive way for users to alter the characteristics of objects displayed on display device 306. Other examples of characteristics of objects changed by use of coupons are shown in FIGS. 7A, 7B, 8A, 8B, 9A, and 9B.

As described above, magic hat button 502B-2 is used to select coupon 608A. Stamper button 502B (FIG. 5) is changed to magic hat button 502B-2 (FIG. 6A) by the user to alter the commands immediately available to the user in a process described in the navigation application and that discussion is incorporated herein by reference. Alternatively, the user can access Magic Hat window 602 by touching stamper button 502B to display a stamper window (not shown) and by touching the title bar (not shown) of the stamper window while pressing option key 307 (FIG. 3). Performance of these steps by a user causes Magic Hat window 602 (FIG. 6B) to be displayed on display device 306.

In FIG. 7A, notebook 512 (FIG. 5) is selected by touching notebook 512. System software 312 redraws notebook 512 to substantially fill display device 306 as shown (FIG. 7A) to form a notebook scene 512S. Notebook 512 contains bordered text 702. Coupon 704 is selected in a manner that is directly analogous to the selection of coupon 608A (FIG. 6D) as described above, using, e.g., control 602E (FIG. 6B). The user drags coupon 704 over bordered text 702 and drops coupon 704 on bordered text 702 to change the border of bordered text 702 to that represented by coupon 704 as shown (FIG. 7B).

Similarly, in a second example, the color of filled circle 706 (FIG. 8A) in notebook 512 is set to the color represented by coupon 710 by dragging and dropping coupon 710 over circle 706 (FIG. 8B). A third example is shown in FIGS. 9A and 9B. The line style of star 708 (FIG. 9A) in notebook 512 is set to the line style represented by coupon 712 by dragging and dropping coupon 712 over star 708 (FIG. 9B).

According to another novel aspect of system software 312 (FIG. 3), the user issues a command which places system software 312 in "tinker mode". FIGS. 10A–10H illustrate the use of tinker windows and the operation of system software 312 in tinker mode. Notebook scene 512S (FIG. 10A) includes viewable objects 1002 and 1004. System software 312 is placed in tinker mode by use of a tools utility. The tools utility of system software 312 is invoked by touching tool holder button 502E.

When tool holder button 502E is touched, a tools window 1006 (FIG. 10B) is displayed on display device 306. Tools window 1006 contains a number of icons 1008, including tinker icon 1008A. By touching tinker icon 1008A, the user places system software 312 in tinker mode. Tool window 1006 is closed, i.e., removed from display device 306, and tool holder button 502E is replaced by tinker button 502E-2 (FIG. 10C). System software 312 is now in tinker mode.

In tinker mode, the touching of an object causes the creation and display on display device 306 of a tinker window corresponding to that object. For example, touching viewable object 1004 while system software 312 is in tinker mode causes system software 312 to create and display in display device 306 tinker window 1004T (FIG. 10D). The creation of a tinker window by system software 312 is described in greater detail below. Once tinker window 1004T is created and displayed in display device 306, system software 312 is no longer in tinker mode and tinker button 502E-2 (FIG. 10C) is replaced with tool holder button 502E (FIG. 10D) to so indicate.

Tinker window 1004T contains a number of controls and coupons which represent a portion of the state of viewable object 1004. The controls contained within tinker window 1004T include a meter 1010, switches 1012A–1012E, and control 1014. Tinker window 1004T also contains coupons 1016 and 1018. Meter 1010 indicates the number of bytes of memory 304 (FIG. 3) used by viewable object 1004. Switches 1012A, 1012B, 1012C, 1012D, and 1012E indicate whether viewable object 1004 can be moved, can be copied, can be stretched, has a visible label, and has a border around its label, respectively. Switches enable the user to alter each of these characteristics of viewable object 1004. For example, by touching switch 1012D, the user toggles a flag in the state of viewable object 1004 which indicates whether the label of viewable object 1004 is displayed on display device 306 when viewable object 1004 is displayed.

As described above, tinker window 1004T also includes coupons 1016 and 1018. Coupons 1016 and 1018 represent the shape and line style, respectively, of viewable object 1004. Typically, a coupon is a viewable representation of a non-viewable object. For example, coupon 1016 represents a copy of the shape, i.e., the member of a class Shape, which defines a portion of the state of viewable object 1004. Coupon 1016 can be used to change the shape of another viewable object, e.g., viewable object 1002 (FIG. 10C), to the shape of viewable object 1004 by dragging and dropping coupon 1016 onto viewable object 1002.

Specifically, touching coupon 1016 causes tinker window 1004T to be closed and removed from display device 306 as shown (FIG. 10E). When coupon 1016 is dragged over viewable object 1002, which can accept coupon 1016, viewable object 1002 is highlighted (FIG. 10F) and coupon 1016 is displayed in a faded state. Dropping coupon 1016 over viewable object 1002 changes the shape of viewable object 1002 to the shape represented by coupon 1016, namely, elliptical (FIG. 10G). It should be noted that while the shape of viewable object 1004 is elliptical, the vertical and horizontal scales of viewable object 1004 are characteristics which are independent from the shape of viewable object 1004 and are therefore not represented by coupon 1016. Accordingly, the vertical and horizontal scales of viewable object 1004 are not transferred to viewable object 1002 by the dragging and dropping of coupon 1016 onto viewable object 1002.

Alternatively, coupon 1016 can be saved for later use by being placed in the tote bag of tote bag button 502D, i.e., by dragging and dropping coupon 1016 onto tote bag button 502D. The tote bag of tote bag button 502D is opened, in the form of tote bag window 1020, by touching tote bag button 502D as shown (FIG. 10H). Coupon 1016 can later be dragged from tote bag window 1020 and dropped onto a viewable object (not shown) to change the shape of that viewable object to the shape of viewable object 1004 (FIG. 10G).

Since coupons 1016 and 1018 (FIG. 10D) are objects separate from viewable object 1004 whose state the coupons represent, coupons 1016 and 1018 can be collected and shared with other users to facilitate easy and versatile customization of the viewable objects shown on display device 306. As system software 312 (FIG. 3) provides a simple and intuitive way for a user to transfer elements of the state of a graphical object to the state of another graphical object, system software 312 represents a non-obvious improvement over the prior art.

As described briefly above, coupons sometimes represent a functionality of an object. For example, script coupons, i.e., members of class ScriptCoupon, represent a script which is performed by a scripted object. A scripted object is an object for which a script is defined. A script is a series of computer instructions. Touching a scripted object causes the script to be executed in the context of the object's state as defined by the fields of the object.

A scripted object of a given class, namely, class Viewable or a subclass thereof, is formed by first creating a new class which is a direct subclass of the given class. In other words, no class is both a subclass of the given class and a superclass of the new class. The new class defines a new field "script" which is the script of a member of the new class. Method Touch is overridden to execute the script of the responding scripted object when touched.

Notebook 512 in notebook scene 512S contains viewable objects 1102 and 1104. Viewable object 1104 is scripted, i.e., has a field "script" which is a script 1104S (FIG. 11B) that is executed when viewable object 1104 is touched. Script 1104S is a simple and illustrative example of a script. Execution of script 1104 toggles the highlighting of viewable object 1102 (FIG. 11A). In other words, if viewable object 1102 is not highlighted, execution of script 1104S (FIG. 11B) highlights viewable object 1102 (as shown in FIG. 11C), and if viewable object 1102 is highlighted, execution of script 1104S (FIG. 11B) changes the state of viewable object 1102 (FIG. 11A) such that viewable object 1102 is not highlighted. Other, more complex scripts can be used to provide more complex functionality. For example, more complex scripts can be developed to check the spelling of words typed into a postcard or letter or to search a number of postcards and letters for a specific word or phrase.

Tinker mode is used as described above to generate and display in display device 306 tinker window 1104T (FIG. 11D) which corresponds to viewable object 1104. Tinker window 1104T contains script coupon 1118 which represents script 1104S (FIG. 11B). A user can drag and drop script coupon 1118 as described more completely above to transfer the functionality associated with script coupon 1118 to other objects, perhaps on other computer systems. As scripts can be complex and provide such complex functionality as spell-checking and text searching, representing such functionality as coupons, which can be transferred intuitively and easily by a user, provides a mechanism for novice users to intuitively and easily customize their computing environment.

Data Structures of a Preferred Embodiment

Computer system software 312 is, and more specifically the coupon interface and tinker window utility portions of computer system software 312 are, implemented using an object oriented framework. An object oriented framework uses object oriented concepts such as class hierarchies, object states and object behavior. These concepts, which are briefly discussed below, are well known in the art. Additionally, an object oriented framework may be implemented using object oriented programming languages, such as the C++ programming language, which are well-known in the art, or, as is the case with the preferred embodiment, may be imposed upon programming languages, such as the C programming language, which are otherwise not object oriented.

The building block of an object oriented framework is an object. An object is defined by a state and a behavior. The state of an object is set forth by fields of the object. The behavior of an object is set forth by methods of the object. Each object is an instance of exactly one class. An object that is an instance of a given class is also a member of that class and every superclass of that class. Each class defines zero or more fields and zero or more methods. The fields and methods of an object are the fields and methods defined by the classes of which the object is a member. Those classes therefore collectively provide a template for the object.

Fields are data structures which contain information defining a portion of the state of an object. Objects which are instances of the same class have the same fields. However, the particular information contained within the fields of the objects can vary from object to object. Each field can contain information that is direct, such as an integer value, or indirect, such as a reference to another object.

A method is a collection of computer instructions which can be executed in CPU 302 by system software 312. The instructions of a method are executed, i.e., the method is performed, when software 312 requests that the object, for which the method is defined, perform the method. A method can be performed by any object that is a member of the class that defines the method. The particular object performing the method is the responder, which is sometimes called the responding object. When performing the method, the responder consumes one or more arguments, i.e., objects accepted as input data, and produces zero or one result, i.e., an object returned as output data. The methods defined for a particular object define the behavior of that object.

Methods are divided into two categories, attributes and operations. An attribute is a method whose performance requests information regarding the state of an object or sets a portion of the state of an object to a desired value. An operation is a method that is not an attribute. In other words, an operation is a method whose performance does not request information regarding the state of an object or set a portion of the state of an object to a desired value.

Herein, an object is described as performing a method, consuming arguments and producing zero or one result. However, an object, in and of itself, includes fields which define a state and methods which define a behavior. The performance of a method by an object is in actuality the selection of and execution by system software 312 (FIG. 3) of the particular instructions which define the method. Execution of the instructions of an object by system software 312 is herein alternatively called executing the object. Objects are described as performing methods since the particular definition of the method is provided by the classes of which the object is a member and the method is performed in the context of the object's state.

Classes of an object oriented framework are organized in a class hierarchy. In a class hierarchy, a class inherits the fields and methods which are defined by the superclasses of that class. Stated another way, the fields and methods defined by a class are inherited by any subclasses of the class. If a first class is a subclass of a second class, the second class is a superclass of the first class. An instance of a class includes the fields defined by and can perform the methods defined by the superclasses of that class. Accordingly, when a method of an object is called, the method that is accessed may be defined in the class of which the object is an instance or in any one of the superclasses of that class. When a method of an object is called, system software 312 selects the method to run by examining the classes of which the object is a member.

A subclass may override (i.e., supersede) a method definition which is inherited from a superclass to enhance or change the behavior members of the subclass. However, in the preferred embodiment, a subclass is not permitted to supersede the signature of the method. The signature of a method includes the method's identifier, the number and type of arguments, whether a result is returned, and, if so, the type of the result. The subclass supersedes an inherited method definition by redefining the computer instructions which are carried out in performance of the method.

Classes which are capable of having instances are concrete classes. Classes which cannot have instances are abstract classes. Abstract classes can define fields and methods which are inherited by subclasses of the abstract classes. The subclasses of an abstract class can be other abstract classes; however, for an abstract class to have members, the abstract class must have at least one concrete subclass.

All classes defined in the disclosed preferred embodiment, except for mix-in classes which are described below, are subclasses of a class, Object. Additionally, class Object is not a subclass of itself, i.e., of class Object. Thus, each class that is described herein and which is not a mix-in class and not class Object inherits the methods and fields of class Object.

In the preferred embodiment, limited multiple inheritance is implemented using mix-in classes. Mix-in classes, sometimes referred to as mix-ins, are classes which are not subclasses of class Object but which can provide fields or methods for class Object or subclasses of class Object. A non-mix-in class, alternatively called a flavor or a flavor class, can be the immediate subclass of at most one flavor, but can be the immediate subclass of zero or more mix-in classes. A mix-in class can be the immediate subclass of no class or of another mix-in class. Unless otherwise stated, a class is a flavor. No cycles in the class hierarchy are permitted; i.e., no class is permitted to be both a subclass and a superclass of another class.

The principal class of objects in the preferred embodiment of the present invention is the class of viewable objects. Viewable objects are members of class Viewable, which is described below in greater detail, and are capable of being displayed on display device 306 (FIG. 3). All of the objects shown in display device 306 (FIG. 5) are viewable objects.

A portion of the class hierarchy pertaining to tinker windows and coupons is illustrated by class diagram 1200 (FIG. 12). Subclasses of class Object 1202 include class Process 1204, class SingleLinkable 1206, and class Primitive 1208. Class Linkable 1210 is a subclass of class SingleLinkable 1206 and is a superclass of class Viewable 1212 and class Image 1214. Class Viewable 1212 includes among its subclasses class Box 1216, class Shape 1218, and class Coupon 1220. Class Box 1216 also inherits from mix-in class HasBorder 1260. Class Window 1222 and class Desktop 1224 are subclasses of class Box 1216. Class TitledWindow 1226 is a subclass of class Window 1222 and a superclass of class TinkerWindow 1228. Tinker window 1004T (FIG. 10D) is a member of class TinkerWindow 1228 and therefore includes the fields and methods defined by the following classes: class TinkerWindow 1228, class TitledWindow 1226, class Window 1222, class Box 1216, mix-in class HasBorder 1260, class Viewable 1212, class Linkable 1210, class SingleLinkable 1206, and class Object 1202.

Class Coupon 1220 is an immediate subclass of class Viewable 1212. In other words, class Coupon 1220 is a subclass of class Viewable 1212 and there is no subclass of class Viewable 1212 which is also a superclass of class Coupon 1220. Class Coupon 1220 also inherits from mix-in class BackgroundWithBorder 1262. Class Coupon 1220 is abstract. Therefore, none of the coupons shown in the Figures are instances of class Coupon 1220. Instead, each coupon is an instance of a subclass of class Coupon 1220 and is therefore a member of class Coupon 1220.

Included in the subclasses of class Coupon 1220 are class ColorCoupon 1230, class BorderCoupon 1232, class LineStyleCoupon 1234, class ShapeCoupon 1235, class TextStyleCoupon 1236, class SoundCoupon 1238, and class ShadowCoupon 1240. Coupon 608A (FIG. 6D), coupon 704 (FIG. 7A), coupon 710 (FIG. 8A) and coupon 712 (FIG. 9A) are instances of class TextStyleCoupon 1236 (FIG. 12), class BorderCoupon 1232, class ColorCoupon 1230, and class LineStyleCoupon 1234, respectively. Similarly, coupons 1016 and 1018 (FIG. 10D) are instances of class ShapeCoupon 1235 (FIG. 12) and class LineStyleCoupon 1234, respectively. Every coupon is a member of class Coupon 1220 and therefore includes the fields and methods defined by each of the following classes: class Coupon 1220, mix-in class BackgroundWithBorder 1262, class Viewable 1212, class Linkable 1210, class SingleLinkable 1206, and class Object 1202.

The "Viewable" Class

All objects which can be displayed on display device 306 (FIG. 5), e.g., objects 504–522, are members of class Viewable 1212 (FIG. 12) and are therefore "viewable" objects. All objects which are not members of class Viewable 1212, e.g., objects defining information structures or providing information processing functionality, cannot be displayed on display device 306 (FIG. 5) and are therefore not "viewable." However, such non-viewable objects can be represented by other, viewable objects which can be displayed on display device 306.

Class Viewable 1212 (FIG. 12) defines many fields and methods, some of which are described below. All of the fields and methods of class Viewable 1212 are described in the navigation application which, as described above, is incorporated herein in its entirety by reference. Each viewable object has a sound, a shadow, a color, a label style and a number of view flags which are represented by fields "sound", "shadow", "color", "labelStyle", and "viewFlags", respectively. For example, fields "sound", "shadow", and "labelStyle" of viewable object 1302 (FIG. 13) are a sound 1304, a shadow 1306, and a text style 1310, respectively. Fields "color" and "viewFlags" of viewable object 1302 are longwords 1308 and 1312, respectively. Sound 1304, shadow 1306, and text style 1310 are members of the following respective classes: Sound, Shadow, and TextStyle. These classes are described below in greater detail.

Field "color" of a viewable object is queried by performance of method PartColor by the viewable object. Method PartColor accepts as arguments a part identifier and returns a longword representing the color of the identified part of the responding viewable object. The various parts of a viewable object include the label, shadow, border, title, content, lines, image and text of the viewable object. If no part is specified, i.e., if the supplied part identifier argument is a nil, the value of field "color" of the responding viewable object is returned. A nil is a value which generally represents no particular object.

Field "color" of a viewable object is set by performance of the method SetPartColor, which accepts as an argument a part identifier and a longword representing a color. Performance of method SetPartColor by a viewable object sets the color field of the identified part of the responding viewable object to the color. A part identifier which identifies the object itself is defined, and if that part identifier is specified, field "color" of the responding viewable object is set to the supplied color.

As described above, longword 1308 is field "color" of viewable object 1302. Longword 1308 (FIG. 14) includes four bytes 1308R, 1308G, 1308B, and 1308A which represent the red, green, blue and alpha components, respectively, of the color represented by longword 1308. The alpha component of a color is used in the preferred embodiment of the present invention the way the alpha component is used in the art of computer graphics. Specifically, the alpha component of a color represents the fractional coverage of the color, which can be used, for example, in representing a partially translucent object.

As viewable object 706 (FIG. 8A) is a member of class Viewable 1212, viewable object 706 has a field "color". Since coupon 710 represents a particular color, dragging and dropping coupon 710 onto viewable object 706 sets the color of viewable object 706 to the color represented by coupon 710. The color of viewable object 706 is set by requesting performance of method SetPartColor by viewable object 706 while supplying a nil as the part identifier argument. Viewable object 706, by performance of method SetPartColor, sets field "color" of viewable object 706 to the color represented by coupon 710 as shown (FIG. 8B).

As described above, sound 1304 (FIG. 13) is a sound object, i.e., a member of class Sound. Class Sound defines fields and methods for storing and representing in class objects audible sounds. A sound includes a field "data" which is an encoded digital sampling of an audible sound. A sound also includes fields "duration", "formatType", and "sampleRate". Field "duration" of a sound is a number specifying the duration of the sound in milliseconds. Fields "formatType" and "sampleRate" of a sound specify which standard digitizing format and which sampling rate, respectively, were used in originally digitally encoding the audible sound. Sound is generally digitally encoded according to a known and standard format with a known and standard sampling rate. Such formats and rates are well-known to those of skill in the art of digital encoding of analog signals.

Class Sound defines a number of methods. Method PlaySound issues instructions to circuitry (not shown) within computer 300 (FIG. 3) causing the circuitry to convert the digitally encoded audible sound to an analog signal and to send the signal to a loudspeaker (not shown) included in computer 300. In this way, the loudspeaker plays the sound audibly and the sound is heard by the user. The conversion of the digitally encoded sound to an analog signal and the playing of the analog signal through a loudspeaker are accomplished using commonly known techniques. In one embodiment, the digitally encoded sound is converted to an analog signal using a known 16-bit linear digital-to-analog conversion.

Class Sound further defines a method Stop which causes termination of method PlaySound, thereby terminating playing of the sound through the loudspeaker. Furthermore, a method PlayNote is defined by class Sound. Performance of method PlayNote by a sound plays the sound through the loudspeaker as described above with the exception that, in converting the digitally encoded sound to an analog signal, a well-known mathematical algorithm is applied to the digital sound to shift the pitch of the sound to a specified pitch. Method PlayNote accepts as input an object specifying a particular pitch. In one embodiment, the pitch is shifted using a known pitch-shifting method which includes linear interpolation of the digital sound with four (4) times oversampling. The techniques used to manipulate digitally encoded sound in methods PlaySound and PlayNote are generally known in the art of digital sound engineering.

Field "sound" of a viewable object is queried and set by performance of methods Sound and SetSound, respectively.

Method Sound accepts no arguments and returns the value of field "sound" of the responding viewable object. For example, performance of method Sound by viewable object 1302 (FIG. 13) returns sound 1304. Method SetSound accepts as an argument a sound and sets field "sound" of the responding viewable object to the accepted sound, returning no result. The sound of a viewable object is played by performance of method PlaySound. A viewable object's sound is typically played, for example, when the viewable object is displayed on display device 306 and touched by the user. Dragging and dropping a sound coupon, i.e., a member of class SoundCoupon 1238, onto a viewable object causes the viewable object to perform method SetSound to thereby set field "sound" of the viewable object to the sound represented by the sound coupon.

As described above, shadow 1306 (FIG. 13) of viewable object 1302 is a member of class Shadow. A shadow, i.e., a member of class Shadow, is an object which represents a graphically simulated shadow, as would be cast by incident light, of a separate, viewable object. Class Shadow defines a number of fields and methods which collectively define a shadow.

Class Shadow inherits from class Style a field "color" which defines the color of the shadow. In addition, class Shadow defines a field "shadowOffset" which defines the length of the simulated shadow cast by the object. No methods are defined by class Shadow. Instead, since every viewable object has a field "shadow", method Draw as defined by class Viewable includes the drawing of the shadow on display device 306 (FIG. 3). A shadow is drawn by drawing a silhouette of the viewable object in the color of the shadow at a position that is offset from the position of the viewable object below and to the right by a distance equal to the length stored in field "shadowOffset" of the shadow. The viewable object is then drawn over the silhouette at the viewable object's position. The exposed portion of the silhouette simulates a shadow cast by the viewable object.

Field "shadow" of a viewable object is queried and set by performance of methods Shadow and SetShadow, respectively. Method Shadow accepts no arguments and returns the value of field "shadow" of the responding viewable object. For example, performance of method Shadow by viewable object 1302 (FIG. 13) returns shadow 1306. Method SetShadow accepts as an argument a shadow and sets field "shadow" of the responding viewable object to the accepted shadow, returning no result. Dragging and dropping a shadow coupon, i.e., a member of class ShadowCoupon 1240, onto a viewable object causes the viewable object to perform method SetShadow to set field "shadow" of the viewable object to the shadow represented by the shadow coupon.

As described above, text style 1310 (FIG. 13) is a member of class TextStyle. A text style, i.e., a member of class TextStyle, is an object which constitutes a typographical description of a particular body of text. The fields of a text style include ascent, descent, alignment, leading, spread, requested font and actual font.

Field "ascent" of a text style specifies the ascent of the text style. Field "descent" of a text style specifies the descent of the text style. The terms ascent and descent are used as they are commonly understood in the art of typography. The ascent of a text style is the offset from a baseline of a horizontal line corresponding to the maximum height of any character in a character set. The descent of a text style is the offset from a baseline of a horizontal line corresponding to the maximum distance below the baseline of any character in a character set.

Field "alignment" of a text style specifies whether the text is aligned along a left margin, a right margin, both margins, or along the center between the margins. Field "leading" of a text style specifies the space between lines of text, and field "spread" of a text style specifies the space between individual characters. Field "requested font" of a text style specifies the font which is to be used, if available, to draw text according to the text style. Field "actual font" of a text style specifies the font available within system software 312 (FIG. 3) which will actually be used to draw text according to the text style. Class TextStyle defines two methods, MakeBold and MakeItalic, which return bold and italic, respectively, versions of the responding text style. Class TextStyle inherits from class Style which, as described above, defines a field "color".

Field "labelStyle" of a viewable object is set by performance of the method SetTextStyle, which is defined by class Viewable 1212 (FIG. 12). For example, performance of method SetTextStyle by viewable object 1302 (FIG. 13) sets the value of field "labelStyle" of viewable object 1302 to text style 1310. Method SetTextStyle accepts as arguments a text style and a part identification. If the identified part is the label of the viewable object, field "labelStyle" of the responding viewable object is set to the supplied text style. Otherwise, if the label is not the identified part, performance of method SetTextStyle has no effect. Dragging and dropping a text style coupon, i.e., a member of class TextStyleCoupon 1236, onto a viewable object sets field "labelStyle" of the viewable object to the text style represented by the text style coupon by causing the viewable object to perform method SetTextStyle consuming a part identifier which identifies the label of the viewable object.

Field "viewFlags" of a viewable object includes a number of view flags which define several properties of the viewable object. For example, field "viewFlags" of viewable object 1302 (FIG. 13) is longword 1312. Longword 1312 (FIG. 15) is an unsigned integer which includes 32 bits. Several of the bits of longword 1312 are view flags which each represent the value of a respective property. The properties defined by view flags of a viewable object include whether the viewable object can be moved, copied, stretched or deleted; whether the viewable object can contain other viewable objects (i.e., can have subviews); whether the viewable object is drawn from its center; whether the label of the viewable object is shown; and whether a border is drawn around the label. If an object is drawn from its center, the object is repeatedly redrawn during stretching of the object such that the center of the object remains at a fixed position within display device 306. If an object is not drawn from its center, the object is repeatedly redrawn during stretching of the object such that the upper left corner of the object remains at a fixed position within display device 306. The moving, copying, stretching, and deleting of a viewable object are described in greater detail in the navigation application and that discussion is incorporated herein in its entirety by reference. Similarly, the containment within one viewable object of other viewable objects, the drawing of a viewable object from its center, and the labelling of a viewable object are discussed in greater detail in the navigation application and that discussion is incorporated herein in its entirety by reference.

The following methods are defined by class Viewable 1212 (FIG. 12) for querying and setting the various view flags of a viewable object. Each querying method accepts no argument and returns as a result a boolean, i.e., a member of class Boolean, which indicates the value of the queried view flag. Class Boolean is a subclass of class Primitive 1208. A boolean is an object which has one of two possible values, namely, "true" and "false". Each setting method accepts a boolean as an argument and sets the view flag in question according to the supplied boolean, returning no result. Since each view flag is represented by a bit, e.g., a bit of longword 1312 (FIG. 15), each view flag has one of two possible values, the first corresponding to a "true" value and the second corresponding to a "false" value.

The value of the can move view flag of a viewable object is queried and set by methods CanMove and SetCanMove, respectively. The value of the can move view flag determines whether the viewable object can be moved from the object's present position. In general, viewable objects can be moved. However, some classes, e.g., class Panel, set the can move view flag to "false" to indicate that members of the class can never be moved. Coupons, which are viewable objects, can be moved.

The value of the can copy view flag of a viewable object is queried and set by methods CanCopy and SetCanCopy, respectively. The value of the can copy view flag determines whether the viewable object can be copied. In general, viewable objects can be copied. However, some classes, e.g., class Card, set the can copy view flag to "false" to indicate that members of the class can never be copied.

The value of the can stretch view flag of a viewable object is queried and set by methods CanStretch and SetCanStretch, respectively. The value of the can stretch view flag determines whether the viewable object can be stretched. Tinker windows are viewable objects and can generally be stretched.

The value of the can delete view flag of a viewable object is queried and set by methods CanDelete and SetCanDelete, respectively. The value of the can delete view flag determines whether the viewable object can be deleted. Coupons can generally be deleted.

The value of the can contain view flag of a viewable object is queried and set by methods CanContain and SetCanContain, respectively. The value of the can contain view flag determines whether the viewable object can contain other viewable objects, i.e., whether the viewable object can have subviews. Subviews are described in greater detail in the navigation application and that discussion is incorporated herein by reference. Coupons generally cannot contain other viewable objects; therefore, the can contain view flag of a coupon is generally set to "false". In contrast, tinker windows can contain other viewable objects; therefore, the can contain view flag of a tinker window is set to "true".

The value of the centered view flag of a viewable object is queried and set by methods Centered and SetCentered, respectively. The value of the centered view flag determines whether the viewable object is drawn from its center.

The value of the show label view flag of a viewable object is queried and set by methods ShowLabel and SetShowLabel, respectively. The value of the show label view flag determines whether the label of the viewable object is shown. Upon the changing of the show label view flag, the label of the viewable object is redrawn.

The value of the border label view flag of a viewable object is queried and set by methods BorderLabel and SetBorderLabel, respectively. The value of the border label view flag determines whether the label of the viewable object is enclosed by a border when displayed on display device 306 (FIG. 5). Upon the changing of the border label view flag, the label of the viewable object is redrawn.

Thus, various properties of a viewable object are maintained as view flags stored in field "viewFlags" of the viewable object. Furthermore, those view flags are manipulated by performance of a number of methods defined by class Viewable 1212 (FIG. 12) as described above.

Tinker Windows

A number of methods are defined by class Viewable 1212 for the creation and use of tinker windows such as tinker window 1004T (FIG. 10D) which corresponds to viewable object 1004. A tinker window is a member of class TinkerWindow 1228 (FIG. 12) which is described in greater detail below. Once a new tinker window is created, the tinker window is filled with a number of controls which allow the user to manipulate certain attributes of the viewable object corresponding to the tinker window.

A method OpeningTinkerWindow is defined by class Viewable 1212 and performance of the method by a viewable object places a number of controls and coupons—i.e., members of classes Control and Coupon, respectively, which are described in greater detail below—into the tinker window. While some subclasses of class Viewable 1212, both predefined and user-defined, provide superseding definitions of method OpeningTinkerWindow; it is preferred that each subclass invoke performance of method OpeningTinkerWindow as defined by the subclass's superclasses. In that way, each of the controls defined by the superclasses of the subclass are placed in the tinker window. The controls placed in the tinker window by performance of method OpeningTinkerWindow as defined by class Viewable 1212 are now described.

A meter which shows the amount of memory 304 (FIG. 3) in bytes used by the viewable object corresponding to the tinker window is created and placed in the tinker window by making the meter a subview of the tinker window. A meter is a member of class Meter, which is described in more detail below. Briefly, a meter is a control, i.e., a member of class Control, which indicates a numeric value. Class Control is described in greater detail below. Thus, meter 1010 (FIG. 10D) of tinker window 1004T indicates a numeric value which represents the amount of memory 304 (FIG. 3) used by viewable object 1004 (FIG. 10C), to which tinker window 1004T corresponds.

A number of switches are placed in the tinker window and correspond to a number of view flags of the viewable object to which the tinker window corresponds. A switch, i.e., a member of class Switch, is a control which indicates one of two possible values and which allows a user to select either of the two possible values. Class Switch is described in greater detail below. An switch indicates and allows selection of one of two possible values, the first corresponding to a "true" value and indicating an "on" state and the second corresponding to a "false" value and indicating an "off" state. In one embodiment, an switch is represented as a check box associated with a text description of the characteristic represented by the switch. The check box is displayed as checked to indicate an "on" state and is displayed blank to indicate an "off" state. Touching the switch toggles the switch between the "on" state and the "off" state.

In performance of method OpeningTinkerWindow as defined by class Viewable 1212 (FIG. 12), switches 1012A, 1012B, 1012C, 1012D, and 1012E (FIG. 10D), corresponding to view flags can move, can copy, can stretch, show label and border label, respectively, are placed in tinker window 1004T. Thus, for example, switch 1012A corresponds the can move view flag of viewable object 1004 and indicates whether viewable object 1004 is moveable. In addition, by touching switch 1012A, the user can toggle the can move view flag of viewable object 1004, thereby alternately making viewable object 1004 moveable and not moveable with each touch. The can move view flag of viewable object 1004 is toggled by performance of method CanMove by viewable object 1004 to return a boolean result and performance of method SetCanMove by viewable object 1004, supplying the logical negation of the boolean result as the argument. Switches 1012B, 1012C, 1012D, and 1012E function analogously to switch 1012A.

In addition to meter 1010 and switches 1012A–E, performance of method OpeningTinkerWindow, as defined by class Viewable 1212 (FIG. 12), by viewable object 1004 (FIG. 10C) places control 1014 in tinker window 1004T. Control 1014 indicates a position, relative to viewable object 1004, at which the label of viewable object 1004 is displayed on display device 306. The use of a control such as control 1014 to select the position at which a label of a viewable object is displayed is described with respect to FIGS. 16A–C.

Notebook 512 (FIG. 16A) contains viewable objects 1602 and 1604. Viewable object 1602 includes label 1602L. Tinker mode is used to create tinker window 1602T (FIG. 16B) which corresponds to viewable object 1602. Switch 1612D of tinker window 1602T indicates that label 1602L of viewable object 1602 is shown, i.e., displayed in display device 306. Control 1614 indicates that label 1602L is displayed at a position which is below viewable object 1602 and centered between the left and right sides of viewable object 1602.

To change the position of label 1602L to the center of viewable object 1602, the user touches the center of control 1614. Control 1614 is redrawn as shown in FIG. 16C to indicate that label 1602L is displayed in the center of viewable object 1602 and viewable object 1602 is redrawn with label 1602L displayed in the center of viewable object 1602. By touching corresponding positions of control 1614, the user can cause label 1602L to be displayed at the top left, top center, top right, center, bottom left, bottom center, and bottom right of viewable object 1602.

The position of the label of a viewable object is set by performance of method SetLabelLoc. As defined by class Viewable 1212, method SetLabelLoc accepts as an argument an unsigned, short integer which identifies one of sixteen possible label locations and returns no result. The position of the label of the responding viewable object is set to the identified position.

Performance of method OpeningTinkerWindow, as defined by class Viewable 1212 (FIG. 12), by viewable object 1004 (FIG. 10C) also places coupons 1016 and 1018 (FIG. 10D) in tinker window 1004T. A coupon is a member of class Coupon 1220 (FIG. 12), which is described below in greater detail, and generally represents a particular value of a particular attribute.

Viewable object 1004 is a shape, i.e., a member of class Shape 1218 (FIG. 12) which is a subclass of class Viewable 1212. Class Shape 1218 also inherits from mix-in HasLineStyle (not shown). Each shape has an outer edge and field "lineStyle" inherited from mix-in HasLineStyle defines the width and color of the outer edge. Class Shape 1218 defines a field "shapeType" which refers to a shape type, i.e., a member of class ShapeType. Class ShapeType has a number of subclasses, each of which defines a type of shape. The types of shape defined by subclasses of class ShapeTYpe include elliptical, rectangular, octagonal, and star. A star shape type is a member of class NotchedShapeType, which is a subclass of ShapeType.

The type of shape of a member of class Shape 1218 is defined by a subclass of class ShapeType. Viewable object 1004 (FIG. 10A) therefore includes a field "shapeType" which is defined by class Shape 1218 and which defines the shape of viewable object 1004. Coupon 1016 (FIG. 10D) is a shape coupon, i.e., a member of class ShapeCoupon 1235 (FIG. 12), and represents the value of field "shapeType" of viewable object 1004 (FIG. 10A).

Coupon 1018 (FIG. 10B) is a line style coupon, i.e., a member of class LineStyleCoupon 1234 (FIG. 12), and represents the value of field "lineStyle" of viewable object 1004 (FIG. 10A). Field "lineStyle", as described above, is inherited from mix-in HasLineStyle by class Shape 1218 (FIG. 12) of which viewable object 1004 (FIG. 10A) is a member.

As described above, coupons 1016 (FIG. 10D) and 1018 can be used by the user to transfer the value of a particular characteristic of viewable object 1004 (FIG. 10A) to the same attribute of another viewable object, e.g., viewable object 1002.

As discussed briefly above, subclasses of class Viewable 1212 (FIG. 12) can add controls and coupons to tinker window 1004T (FIG. 10D). For example, coupons 1016 and 1018 are added to tinker window 1004T by method OpeningTinkerWindow as defined by class Shape.

If a subclass of class Viewable 1212 supersedes the definition of method OpeningTinkerWindow with a new definition to place further controls and/or coupons in tinker window 1004T, the new definition first invokes performance of method OpeningTinkerWindow as defined by the subclass's superclasses, including class Viewable 1212. Consider, for example, the creation of a tinker window for a window, causing performance of method OpeningTinkerWindow as defined by class Window 1222 (FIG. 12). Performance of method OpeningTinkerWindow as defined by class Window 1222 first invokes performance of method OpeningTinkerWindow as defined by class Box 1216 since class Box 1216 is a superclass of class Window 1222. Method OpeningTinkerWindow as defined by class Box 1216 similarly "escalates" the method, causing performance first of method OpeningTinkerWindow as defined by mix-in class HasBorder 1260 and then of method OpeningTinkerWindow as defined by flavor superclass Viewable 1212.

After method OpeningTinkerWindow as defined by class Box 1216 invokes performance of OpeningTinkerWindow as defined by class Viewable 1212, processing resumes performance of method OpeningTinkerWindow as defined by class Box 1216 and controls and coupons pertaining to boxes are added to the tinker window. Similarly, when performance of method OpeningTinkerWindow as defined by class Box 1216 completes, processing resumes performance of method OpeningTinkerWindow as defined by class Window 1222 and controls and coupons pertaining to windows are added to the tinker window. In this way, controls and coupons corresponding to fields and attributes defined by the classes of which a viewable object is a member are placed in the corresponding tinker window.

Controls or coupons are added to a tinker window by performance of method MakeTinkerControl, as defined by class Viewable 1212. Method MakeTinkerControl accepts three arguments: (i) a tinker window identifier, (ii) a control prototype, and (iii) and attribute identifier. No object is produced as a result by performance of method MakeTinkerControl. The tinker window identifier corresponds to the tinker window whose creation invokes performance of method OpeningTinkerWindow. The control prototype is either a control or a coupon. The attribute identifier specifies the attribute whose value is controlled by the control prototype. For example, attribute CanMove, represented by the can move view flag and queried and set by methods CanMove and SetCanMove, respectively, is controlled by switch 1012A (FIG. 10D). Switch 1012A is added to tinker window 1004T by performance of method MakeTinkerControl by viewable object 1004 supplying as arguments an identifier which identifies tinker window 1004T, an switch, and an identifier of attribute CanMove.

Class Viewable 1212 defines a method ClosingTinkerWindow which is performed when a tinker window is closed. Performance of method ClosingTinkerWindow updates the viewable object to which the closing tinker window corresponds according to the state of the controls and coupons in the closing tinker window. Additionally, performance of method ClosingTinkerWindow by viewable object 1004, to which to tinker window 1004T corresponds, can cause deletion of each of the controls and coupons contained within tinker window 1004T. Tinker window 1004T contains one or more references to each of the controls and coupons contained within tinker window 1004T. Closing tinker window 1004T causes those references to be discarded. If the last reference to an object is discarded, the object is deleted. Thus, if no reference to a coupon or control of tinker window 1004T exists other than those included in tinker window 1004T, closing tinker window 1004T discards the last reference to the coupon or control and the coupon or control is deleted.

The Structure of Tinker Windows

Tinker window 1004T (FIG. 10D) is a member of class TinkerWindow 1228 (FIG. 12). Some of the classes from which class TinkerWindow 1228 inherits are class TitledWindow 1226, class Window 1222, class Box 1216, mix-in class HasBorder 1260, and class Viewable 1212.

A tinker window is a viewable object and therefore inherits the fields and methods defined and inherited by class Viewable 1212 as described above. Class TinkerWindow inherits from class Viewable 1212 methods CanDragContents and SetCanDragContents which query and set, respectively, an attribute CanDragContents. Attribute CanDragContents of a viewable object is a boolean whose value indicates whether subviews of the viewable object can be dragged. Since coupons 1016 (FIG. 10) and 1018 are subviews of tinker window 1004T and can be dragged, attribute CanDragContents of tinker window 1004T is set to "true" to so indicate.

Class TinkerWindow also inherits from classes Box 1216 (FIG. 12), which in turn inherits from mix-in HasBorder 1260, and class Window 1222. Classes Box 1216 and Window 1222 are described in more detail in the navigation application and that description is incorporated herein in its entirety by reference.

A tinker window is a titled window, i.e., a member of class TitledWindow 1226 (FIG. 12). Class TitledWindow 1226 defines three fields which are inherited by class TinkerWindow 1228. Class TitledWindow 1226 defines fields "title color", "title height", and "dependents". Field "title color" specifies the color in which a horizontal rectangular part at the top of the title window is to be drawn. The part is generally known as a title bar and within the title bar a title of the window is displayed. For example, tinker window 1004T (FIG. 10D) includes a title bar 1004T-TB. Field "title color" of tinker window 1004T is the color of title bar 1004T-TB.

Field "title height" specifies the height of the title bar of a titled window. For example, field "title height" of tinker window 1004T specifies the height of title bar 1004T-TB. Field "dependents" of a titled window is a list of all objects which are conceptually associated with the title window. All of the objects which are items of the list that is field "dependents" of a titled window are closed when the titled window is closed. Field "dependents" of tinker window 1004T-TB is a list containing as items references to meter 1010, switches 1012A–E, control 1014, and coupons 1016 and 1018. When coupon 1016 is dragged out of tinker window 1004T, the reference to coupon 1016 is removed from the list of field "dependents" of tinker window 1004T.

Class TitledWindow 1226 (FIG. 12) redefines, and thus supersedes, method Draw as inherited from class Viewable 1212. Method Draw is redefined to draw the title bar using the color and height specified in fields "title color" and "title height", respectively. Method Draw as defined by class TitledWindow 1226 then draws the remainder of the window by escalating method Draw.

Class TitledWindow 1226 defines two methods, method DisplayInfo and method TitleBox. Method DisplayInfo allows a titled window to respond to actuation in a certain part of the title box of the titled window by displaying textual or graphical information about the operation of the titled window. For example, if a user touches icon 1006I (FIG. 10B), textual or graphical information is displayed to assist the user in use of computer 300 (FIG. 3). The particular information displayed is supplied by a developer of system software 312. Tinker window 1004T has no such icon; therefore, method DisplayInfo cannot be performed by tinker window 1004T. Method TitleBox returns a rectangle in the coordinate space of the display screen indicating the space occupied by the title bar of the responding titled window in the display screen. For example, performance of method TitleBox by tinker window 1004T (FIG. 10D) returns a rectangle in the coordinate space of display device 306 indicating the position of title bar 1004T-TB in display device 306.

Class TinkerWindow 1228 (FIG. 12) is a subclass of class GadgetWindow 1227 and therefore inherits the fields and methods defined for class GadgetWindow 1227. Class GadgetWindow 1227 defines a field "target". Field "target" of a gadget window refers to the viewable object, i.e., the target of the gadget window, the touching of which opens and closes the gadget window. The definition of field "target" is redefined by class TinkerWindow 1228 as described more completely below. Class GadgetWindow 1227 redefines method Draw as inherited by class TitledWindow 1226 to identify graphically the target of the gadget window. For example, tote bag window 1020 (FIG. 10H), which is a member of class GadgetWindow 1227 (FIG. 12), includes a balloon spout 1022 (FIG. 10H) which indicates graphically that tote bag button 502D is the target of tote bag window 1020.

Class TinkerWindow 1228 (FIG. 12) defines no fields or methods other than those inherited from superclasses as described above. However, class TinkerWindow 1228 supersedes a number of methods by redefining those methods. Specifically, class TinkerWindow 1228 redefines method SetTarget to ensure that field "target" of the responding tinker window properly refers to the object to be tinkered.

For example, field "target" of tinker window 1004T (FIG. 10D) refers to viewable object 1004 (FIG. 10C) as changes made within tinker window 1004T effect changes in the state of viewable object 1004.

In addition, method Notice, which is inherited from class Object 1202, is redefined such that changes in the responding tinker window effect corresponding changes in the target of the responding tinker window. Method Notice is described in the navigation application and that description is incorporated herein in its entirety by reference. Briefly, method Notice is periodically requested of all objects by system software 312 (FIG. 3) which have been changed or deleted. This enables an object to detect that the object has been changed and to take action accordingly. As defined by class Object 1202 (FIG. 12), method Notice has no effect. However, as superseded by class TinkerWindow 1228, method Notice causes changes in the responding tinker window to be reflected in the target of the responding tinker window. For example, viewable object 1602 (FIG. 16B) is the target of tinker window 1602T. Changing tinker window 1602T such that control 1614 indicates a label position in the center of the target as described above and represented in FIG. 16C is detected in performing method Notice and that change is effected in viewable object 1602 by invoking performance by viewable object 1602 of method SetLabelLoc as described above.

Thus, the fields and methods defined and inherited by class TinkerWindow 1228 (FIG. 12) define the state and behavior of tinker windows.

As described above, a tinker window contains a number of controls, i.e., members of class Control. For example, tinker window 1004T (FIG. 10D) contains meter 1010, switches 1012A–E, and control 1014, all of which are members of class Control. Class Control is a direct subclass of class Viewable 1212 (FIG. 12). In other words, class Control is a subclass of class Viewable 1212 and no class that is a subclass of class Viewable 1212 is also a superclass of class Control. Class Control also inherits from mix-ins HasBorder 1260, FormElement, and EditsTarget. Each of these mix-ins is described in greater detail in the navigation application and that description in incorporated herein in its entirety by reference.

Class Control defines a number of fields which define the state of a control. Field "image" of a control is the image that is displayed in display device 306 (FIG. 3) when the control is drawn. For example, the image of control 1014 (FIG. 10D) is a rectangle. Field "level" of a control is the setting, or value, represented by the control. For example, meter 1010 has a level of 120. A control also has fields which define both a minimum and a maximum possible level.

The touching of a control generally causes action to be taken by system software 312 (FIG. 3). Some controls have scripts, i.e., series of computer instructions, which are executed upon the touching of the control. In such controls, method Touch is defined such that performance of method Touch causes a script to be executed.

Other controls operate directly on an object, typically a property of an object, which is the target of the control. In such controls, method Touch is defined to act directly rather through execution of a script. For example, a field "targetAttribute" is defined for some controls. Field "targetAttribute" of a control specifies which attribute of the target of the control is controlled by the control. When a control operates directly on an object, i.e., has a target, no script is necessary.

As described above, touching control 1614 (FIG. 16B) causes the position of the label of control 1614 to be repositioned according to the touched position relative to control 1614. For example, touching the center of control 1614 causes the label of control 1614 to be positioned and redrawn in the center of control 1614 (FIG. 16C). In addition, the position of the label of viewable object 1602, which is the target of control 1614, is set to the center of viewable object 1602.

Meter 1010 (FIG. 10D), as described above, is used to display the amount of space in memory 304 (FIG. 3) is occupied by the target of tinker window 1004T, i.e., viewable object 1004. Meter 1010 is a member of class Meter. Class Meter is a direct subclass of class Control. Class Meter defines a method ValueBox which returns a rectangle within which the level of the meter is displayed.

In general, meters not only display a numeric value but also allow users to control the numeric value. Class Meter defines a field "upDownImages" which defines images that, when displayed, the user can touch to increase or decrease the level of a meter. Method ControlsActive, as defined by class Meter, returns a boolean which indicates whether the responding meter has active controls which allow a user to increase or decrease the level of the control. If a user increases or decreases the level of a meter, the target of the meter is adjusted accordingly. Class Meter further defines a method ControlsWrap which returns a boolean which indicates whether the level of the meter "wraps". The level of a meter wraps if increasing the level above the maximum possible level sets the level to the minimum level and decreasing the level below the minimum possible level sets the level to the maximum possible level. Meter 1010 (FIG. 10D) does not have active controls.

As described above, switches 1012A–E (FIG. 10D) are members of class Switch, which is a direct subclass of class Control. A switch is a control which has one of two levels, zero and one. A switch whose level is zero is in an "off" state, and a switch whose level is one is in an "on" state. Switches 1012A–C (FIG. 10D) are shown as on; switches 1012D and 1012E are shown as off. Performance of method IsOn by a switch returns a boolean which is true is the responding switch is on and is false otherwise. Touching a switch causes the switch to change level. For example, if a switch whose level is zero is touched, the level of the switch is changed to one. Changing the level of a switch changes the target of the switch accordingly. For example, changing the level of switch 1012A (FIG. 10D) effects a corresponding change in the can move view flag of viewable object 1004.

The Structure of Coupons

Class Coupon 1220 (FIG. 12) is a subclass of class Viewable 1212. Coupons, i.e., members of class Coupon 1220, are therefore viewable objects. Some of the fields and methods which define the structure and behavior, respectively, of coupons are now discussed.

As coupons can be moved, e.g., by being dragged as described above, the can move view flag of a coupon is "true" to so indicate. Some coupons, e.g., border coupon 704 (FIG. 7A), include an attribute Image. For example, border coupon 704 has an image that is a small border of a particular type. Attribute Image is an image object, i.e., a member of class Image, and is queried and set by methods Image and SetImage, respectively, which are inherited from class Viewable 1212. An image object is an object which defines a bitmapped image and includes fields describing the image's size, resolution, center, and the number of bits per pixel. Class Image is described in greater detail in the navigation application and that discussion is incorporated herein in its entirety by reference.

While a coupon is dragged, method DragTrack, which is inherited from class Viewable 1212 but whose definition is superseded by class Coupon 1220, is repeatedly performed. Method DragTrack, in the context of dragging a coupon, determines whether the coupon is dragged over a viewable object which can accept the coupon and causes the viewable object to be highlighted if such is the case. Fields and methods of various classes used during the dragging of a coupon, including fields and methods used to determine whether a coupon is dragged over an object and to highlight the object, are discussed more completely below.

Class Coupon 1220 defines three fields: field "couponObject", field "selector" and field "amount." Field "couponObject" of a coupon is the object the coupon represents. For example, a sound coupon represents a particular sound, i.e., a member of class Sound. When a sound coupon is dropped onto a viewable object, the sound represented by the sound coupon is made field "sound" of the viewable object. Similarly, shadow coupons represent shadows, i.e., members of class Shadow.

Thus, coupons of some subclasses of class Coupon 1220 represent objects of a corresponding class. Members of other subclasses of class Coupon 1220 use field "amount", as described below, to represent the particular value represented by the coupon in place of field "couponObject". Field "couponObject" is queried and set by performance of methods CouponObject and SetCouponObject, respectively. Performance of method CouponObject consumes no arguments and returns as a result the object that is field "couponObject" of the responding coupon. Performance of method SetCouponObject consumes an object, i.e., a member of class Object 1202 (FIG. 12), as an argument and sets field "couponObject" of the responding coupon to the consumed object.

Field "selector" of a coupon provides a level of detail regarding the use of the coupon beyond that provided by the class of which the coupon is an instance. The use of field "selector" is best described by way of example. As described above, each of a number of parts of a viewable object can have a color which is independent of other colors of other parts of the viewable object. Accordingly, a color coupon, i.e., a member of class ColorCoupon 1230, can be used to change the color of any of a number of parts of a viewable object. Field "selector" of a color coupon is a part identifier, which is used as described above with respect to methods PartColor and SetPartColor to set a particular part of a viewable object to the color represented by the color coupon. Thus, field "selector" of a coupon is used to define more specifically the characteristic to which the coupon pertains.

Field "amount" of a coupon defines a value represented by the coupon. For example, if a coupon represents a color, the amount of the coupon is a longword such as longword 1308 (FIG. 14) which specifies the particular color represented by the coupon. Since field "color" of a viewable object is a longword and is not a reference to an object, field "amount" of a color coupon represents the particular value represented by the color coupon. If field "couponObject" represents the particular value represented by a coupon, field "amount" of the coupon is not used. Field "amount" of a coupon is set by performance of method SetAmount which consumes as an argument an unsigned integer, i.e., a member of class Unsigned, and sets field "amount" of the responding coupon to the value of the consumed integer.

Performance of method Draw by a coupon causes the coupon to be displayed on display device 306. Performance of method Draw draws a rectangle with a dashed border on display device 306. Method Draw invokes method CouponText to determine if the coupon has any text. Method CouponText determines whether the coupon has text by determining whether field "couponObject" of the coupon refers to a text object. If the coupon has text, the text is drawn on the coupon. Method Draw invokes method CouponImage to retrieve the coupon's image. If the coupon's image is non-nil, i.e., is an image, the image is drawn at the left edge of the rectangle. For example, coupon 1618 (FIG. 16B) contains both an image and text. The object represented by the coupon, i.e., field "couponObject", is returned by performance of method Draw as defined by class Coupon 1220 (FIG. 12).

Many classes of coupons simply supersede the inherited definition of method Draw to draw in display device 306 (FIG. 3) a more suitable representation of a coupon. For example, class ShapeCoupon 1235 (FIG. 12), of which coupon 1016 (FIG. 10D) is a member, defines method Draw to draw a graphical representation of the shape type represented by coupon 1016.

A coupon is applied to a viewable object by performance of method ApplyCoupon. Method ApplyCoupon accepts as arguments an object that is the target of the coupon and a dot and returns no object as a result. The target of the coupon is the object to which the coupon is applied, and the dot is a point in the coordinate space of display device 306 (FIG. 3) at which the responding coupon is dropped. Performance of method ApplyCoupon carries out the action resulting from dropping the coupon.

The following example illustrates the application of a coupon by performance of method ApplyCoupon. When coupon 1016 (FIG. 10F) is dropped onto viewable object 1002, coupon 1016 performs method ApplyCoupon consuming as arguments viewable object 1002 and a dot indicating the location at which coupon 1016 is dropped. In performing method ApplyCoupon, coupon 1016 invokes method CouponObject to retrieve the shape object represented by coupon 1016 and sets the shape of viewable object 1002 is to the shape which was formerly field "couponObject" of coupon 1016.

Thus, the fields and methods defined by class Coupon 1220 (FIG. 12) provide for a class of viewable objects which represent other, generally non-viewable objects and for the application of those viewable objects to other viewable objects.

Structure and Behavior of Viewable Objects During Dragging of Coupons

Several fields and methods defined by class Viewable 1212 (FIG. 12) are used during the dragging of coupons across a window. As discussed more completely above, coupon 608A (FIG. 6D) is dragged across postcard scene 518S by a user until coupon 608A is dragged over text 518T. System software 312 (FIG. 3) determines whether a coupon is "over" a viewable object by comparison of the bounds boxes of each.

A bounds box is the smallest rectangle defined in the coordinate space of display device 306 (FIG. 3) which encloses all of the drawn parts of a viewable object. The parts enclosed by a bounds box include the viewable object's content, shadow, and label if each of those parts is drawn. The bounds box of a viewable object is returned by performance of method GetBoundsBox by the viewable object. Method GetBoundsBox is defined by class Viewable 1212. Since coupons are viewable objects, coupons have bounds boxes. If the center of a coupon is within the bounds box of a viewable object, the coupon is "over" the viewable object.

If the center of a coupon is within the bounds box of more than one viewable object, the coupon is over the topmost of those viewable objects. All viewable objects displayed in display device 306 (FIG. 3) have a position in a third dimension whose axis is perpendicular to the display plane of display device 306. Thus, if first and second viewable objects overlap, the first viewable object is over the second viewable object if the position in this third dimension of the first viewable object is greater, i.e., nearer to a user viewing display device 306, than the position of the second viewable object.

Other methods are provided for determining a bounds box for a particular part of a viewable object. For example, methods GetContentBox, LabelBox, and GetBorderBox return bounds boxes for the content, label and border, respectively, of the responding viewable object.

When a coupon is over a viewable object, the object is highlighted if the object can accept the coupon. In general, a viewable object can accept a coupon if the coupon represents a value of a characteristic that the viewable object includes. For example, text style coupon 608A (FIG. 6D) can be accepted by text 518T but cannot be accepted by viewable object 614 which does not include text.

Whether a viewable object can accept a particular coupon is determined by performance by the viewable object of method CanAcceptCoupon, which is defined by class Viewable 1212. Method CanAcceptCoupon accepts as arguments a coupon and a part identifier and returns as a result a boolean. If the returned boolean is "true", the coupon can be accepted.

As defined by class Viewable 1212, method CanAcceptCoupon returns "true", accepting the coupon, if the coupon is a view, sound, shadow, script, or color coupon and the part is the label, text, title, image, content, shadow or line of the responding viewable object. Method CanAcceptCoupon also returns "true" if the coupon is a text or text style coupon and the part is the label, text or title of the responding viewable object. Method CanAcceptCoupon returns "false" otherwise. The definition of method CanAcceptCoupon can be superseded by definitions provided by subclasses of class Viewable 1212. A viewable object determines over which part of the viewable object a coupon is positioned by performance of method InsidePart, which accepts a dot, i.e., a position within display device 306 (FIG. 3), and produces a part identifier. The part identifier identifies the part within which the accepted dot lies. Each class which defines a new part of an object supersedes any inherited method InsidePart to detect points within the newly developed part.

If a coupon is over a viewable object that can accept the coupon, the viewable object is highlighted. Field "viewFlags" described above also includes a highlighted view flag. The value of the highlighted view flag is queried and set by methods Hilited and SetHilited, respectively, both of which are defined by class Viewable 1212. Method SetHilited does not draw the viewable object as highlighted; method SetHilited merely sets the highlighted view flag. To redraw the viewable object to reflect a change to or from a highlighted state, the viewable object is directed to perform method RedrawNow, which is defined by class Viewable 1212. Performance of method RedrawNow by a viewable object redraws the responding viewable object, by invoking performance of method Draw by the responding viewable object, to reflect the viewable object's current state.

If the user terminates the dragging of a coupon when the coupon is over a viewable object which can accept the coupon, the viewable object accepts the coupon. As described above, a coupon represents a value of a particular attribute. In accepting the coupon, the particular attribute of the viewable object is set to the value represented by the coupon. Additionally, the highlighted view flag of the viewable object is set to "false". For example, if text style coupon 608A (FIG. 6D), which represents a Book font of point size 12 which is underlined, is dropped over text 518T, the text style of text 518T is set to Book font, point size 12, and underlined. Text 518T is redrawn to reflect the newly set text style by performance of method RedrawNow (FIG. 6F).

Alternative Highlighting of Viewable Objects

As shown in FIGS. 6E and 10F, objects can be displayed as highlighted by enclosing the object in a visible box or by thickening the border of the object. For example, text 518T (FIG. 6E) is displayed as highlighted by drawing a box around text 518T, and viewable object 1002 (FIG. 10F) is displayed as highlighted by drawing viewable object 1002 with a thicker border. Some objects are highlighted by displaying a starburst pattern around a highlighted object as shown in FIG. 17.

A mix-in class StarburstHilite is defined. Mix-in class StarburstHilite supersedes method Draw such that members of mix-in class StarburstHilite are drawn as highlighted by drawing a starburst pattern around the graphical representation of the object. For example, notebook 512 (FIG. 17) is a member of a class Icon, which inherits from mix-in class StarburstHilite, and is displayed in display device 306. As a sound coupon 1702 is dragged over notebook 512, sound coupon 1702 is drawn in a faded state and notebook 512 is redrawn with a starburst pattern 1704. Starburst pattern 1704 is stored as a bit-mapped image and is displayed in a position that is centered about the center of notebook 512 using conventional techniques.

In addition to notebook 512 (FIGS. 17 and 5), telephone 506 (FIG. 5), address cards 508, postcard 510, notebook 512, calendar 514, clock 516, in box 518, out box 520, and file cabinet 522 are members of class Icon and therefore of mix-in class StarburstHilite. Class Gadget is another class which inherits from mix-in class StarburstHilite. Buttons 502A–G are gadgets and therefore are members of mix-in class StarburstHilite.

What is claimed is:

1. A method for altering a characteristic of a first object displayed on a display screen of a computer in accordance with commands issued by a user, the method comprising:

operating the computer system in an object-oriented environment;

creating a coupon object which represents a particular value of the characteristic;

displaying, in the display screen, a representation of the coupon object;

dragging, in response to commands issued by the user, the representation of the coupon object across the display screen;

dropping, in response to commands issued by the user, the representation of the coupon object over the first object;

altering the characteristic of the first object to the particular value; and forming a coupon class wherein the coupon object is a member of the coupon class.

2. The method of claim 1 further comprising:

determining that the representation of the coupon object is over the first object; and displaying the first object in a highlighted state.

3. The method of claim 2 wherein the step of displaying the first object in a highlighted state comprises:

drawing a box around the first object.

4. The method of claim 2 wherein the step of displaying the first object in a highlighted state comprises:

drawing a thickened border around the first object.

5. The method of claim 2 wherein the step of displaying the first object in a highlighted state comprises:

drawing a starburst pattern around the first object.

6. The method of claim 1 further comprising:

determining that the representation of the coupon object is over the first object; and displaying the coupon object in a faded state.

7. A method for altering a characteristic of a first object displayed on a display screen of a computer in accordance with commands issued by a user, the method comprising:

operating the computer system in an object-oriented environment;

creating a coupon object which represents a particular value of the characteristic;

displaying, in the display screen, a representation of the coupon object;

dragging, in response to commands issued by the user, the representation of the coupon object across the display screen;

dropping, in response to commands issued by the user, the representation of the coupon object over the first object;

altering the characteristic of the first object to the particular value; and forming a viewable class of objects which can be represented in the display screen wherein the first object is a member of the viewable class.

8. A method for altering a characteristic of a first object displayed on a display screen of a computer in accordance with commands issued by a user, the method comprising:

operating the computer system in an object-oriented environment;

creating a coupon object which represents a particular value of the characteristic;

displaying, in the display screen, a representation of the coupon object;

dragging, in response to commands issued by the user, the representation of the coupon object across the display screen;

dropping, in response to commands issued by the user, the representation of the coupon object over the first object; and altering the characteristic of the first object to the particular value;

wherein the particular value of the characteristic represented by the coupon object is the value of the characteristic of a second object.

9. A method comprising:

forming within a memory of a computer operating in an object-oriented environment a first object and a second object, the first and second objects each having a characteristic, the characteristic of the first object having a particular value;

forming, within the memory, a coupon object representing the particular value of the characteristic;

displaying, in a display screen of the computer, a representation of the coupon object;

dragging, in response to commands issued by the user, the representation of the coupon object across the display screen;

dropping, in response to commands issued by the user, the representation of the coupon object over the second object;

altering the characteristic of the second object to the particular value; and forming a tinker window which includes one or more coupon objects, each of which represents a corresponding value of a respective characteristic of the first object, the tinker window for holding and accessing characteristics that are associated with the first object;

wherein the one or more coupon objects include the coupon object.

10. The method of claim 9 further comprising the step of forming a coupon class wherein each of the one or more coupons is a member of the coupon class.

11. The method of claim 9 further comprising the step of forming a viewable class of objects which can be represented in the display screen wherein the first and second objects are each a member of the viewable class.

12. The method of claim 9 further comprising the step of forming a tinker window class wherein the tinker window is a member of the tinker window class.

13. A method comprising:

forming within a memory of a computer operating in an object-oriented environment a first object and a second object, the first and second objects each having a characteristic, the characteristic of the first object having a particular value;

forming, within the memory, a coupon object representing the particular value of the characteristic;

displaying, in a display screen of the computer, a representation of the coupon object;

dragging, in response to commands issued by the user, the representation of the coupon object across the display screen;

dropping, in response to commands issued by the user, the representation of the coupon object over the second object;

altering the characteristic of the second object to the particular value; and forming a coupon class wherein each of the one or more coupons is a member of the coupon class.

14. A method comprising:

forming within a memory of a computer operating in an object-oriented environment a first object and a second object, the first and second objects each having a characteristic, the characteristic of the first object having a particular value;

forming, within the memory, a coupon object representing the particular value of the characteristic;

displaying, in a display screen of the computer, a representation of the coupon object;

dragging, in response to commands issued by the user, the representation of the coupon object across the display screen;

dropping, in response to commands issued by the user, the representation of the coupon object over the second object;

altering the characteristic of the second object to the particular value; and forming a viewable class of objects which can be represented in the display screen wherein the first and second objects are each a member of the viewable class.

15. A method for altering a characteristic of a first object, a representation of the first object being a display on a display device of a computer system, the method comprising:

operating the computer system in an object-oriented environment;

creating a coupon object, the coupon object including a particular value of the characteristic;

displaying, on the display device, a representation of the coupon object;

selecting the coupon object via the representation of the coupon object;

indicating to the coupon object to alter the characteristic of the first object to the particular value;

altering the characteristic of the first object to the particular value; and indicating that the first object can accept the coupon object to alter the characteristic to the particular value.

16. The method of claim 15 wherein the step of selecting the coupon includes dragging the coupon object.

17. The method of claim 15 wherein the step of indicating to the coupon includes dragging the representation of the coupon over the representation of the first object.

18. The method of claim 15 wherein the step of indicating that the first object can accept includes providing an indication when the representation of the coupon object is dragged over the representation of the first object.

19. The method of claim 18 wherein the step of providing an indication when the representation of the coupon object is dragged over the representation of the first object comprises:

displaying the first object in a highlighted state.

20. The method of claim 19 wherein the step of displaying the first object in a highlighted state comprises:

drawing a box around the first object.

21. The method of claim 19 wherein the step of displaying the first object in a highlighted state comprises:

drawing a thickened border around the first object.

22. The method of claim 19 wherein the step of displaying the first object in a highlighted state comprises:

drawing a starburst pattern around the first object.

23. A system comprising:

a computer having a display screen and operating in an object-oriented environment for altering a characteristic of a first object displayed on the display screen in accordance with commands issued by a user;

a coupon object which is stored within a memory of the computer and which represents a particular value of the characteristic;

a display screen, operatively coupled to the memory, for displaying a representation of the coupon object;

a user interface, operatively coupled to the display screen, for dragging, in response to commands issued by the user, the representation of the coupon object across the display screen and for dropping, in response to commands issued by the user, the representation of the coupon object over the first object; and means, operatively coupled to the memory, for altering the characteristic of the first object to the particular value;

wherein the coupon object is a member of a coupon class.

24. A system comprising:

a computer having a display screen and operating in an object-oriented environment for altering a characteristic of a first object displayed on the display screen in accordance with commands issued by a user;

a coupon object which is stored within a memory of the computer and which represents a particular value of the characteristic;

a display screen, operatively coupled to the memory, for displaying a representation of the coupon object;

a user interface, operatively coupled to the display screen, for dragging, in response to commands issued by the user, the representation of the coupon object across the display screen and for dropping, in response to commands issued by the user, the representation of the coupon object over the first object; and means, operatively coupled to the memory, for altering the characteristic of the first object to the particular value;

wherein the first object is a member of a viewable class of objects which can be displayed in the display screen.

25. A system comprising:

a computer having a display screen and operating in an object-oriented environment for altering a characteristic of a first object displayed on the display screen in accordance with commands issued by a user;

a coupon object which is stored within a memory of the computer and which represents a particular value of the characteristic;

a display screen, operatively coupled to the memory, for displaying a representation of the coupon object;

a user interface, operatively coupled to the display screen, for dragging, in response to commands issued by the user, the representation of the coupon object across the display screen and for dropping, in response to commands issued by the user, the representation of the coupon object over the first object; and means, operatively coupled to the memory, for altering the characteristic of the first object to the particular value;

wherein the particular value of the characteristic represented by the coupon object is the value of the characteristic of a second object.

26. A system comprising:

a computer operating in an object-oriented environment;

a memory coupled to the computer;

a first object and a second object stored within the memory of the computer, the first and second objects each having a characteristic, the characteristic of the first object having a particular value;

a coupon object stored within the memory and which represents the particular value of the characteristic;

a display screen, operatively coupled to the memory, which can display a representation of the coupon object;

a user interface, operatively coupled to the display screen, for dragging, in response to commands issued by the user, the representation of the coupon object across the display screen and for dropping, in response to commands issued by the user, the representation of the coupon object over the second object;

means, operatively coupled to the memory, for altering the characteristic of the second object to the particular value; and a tinker window, displayed in the display screen and stored in the memory, which includes one or more coupon objects stored in the memory and displayed in the display screen, each of which represents a corresponding value of a respective characteristic of the first object, the tinker window for holding and accessing characteristics that are associated with the first object;

wherein the one or more coupon objects include the coupon object.

27. The system of claim 26 wherein each of the one or more coupons is a member of a coupon class stored in the memory.

28. The system of claim 26 wherein the first and second objects are each a member of a viewable class of objects which can be represented in the display screen.

29. The system of claim 26 wherein the tinker window is a member of a tinker window class.

30. A system comprising:

a computer operating in an object-oriented environment;

a memory coupled to the computer;

a first object and a second object stored within the memory of the computer, the first and second objects each having a characteristic, the characteristic of the first object having a particular value;

a coupon object stored within the memory and which represents the particular value of the characteristic;

a display screen, operatively coupled to the memory, which can display a representation of the coupon object;

a user interface, operatively coupled to the display screen, for dragging, in response to commands issued by the user, the representation of the coupon object across the display screen and for dropping, in response to commands issued by the user, the representation of the coupon object over the second object; and means, operatively coupled to the memory, for altering the characteristic of the second object to the particular value;

wherein each of the one or more coupons is a member of a coupon class.

31. A system comprising:

a computer operating in an object-oriented environment;

a memory coupled to the computer;

a first object and a second object stored within the memory of the computer, the first and second objects each having a characteristic, the characteristic of the first object having a particular value;

a coupon object stored within the memory and which represents the particular value of the characteristic;

a display screen, operatively coupled to the memory, which can display a representation of the coupon object;

a user interface, operatively coupled to the display screen, for dragging, in response to commands issued by the user, the representation of the coupon object across the display screen and for dropping, in response to commands issued by the user, the representation of the coupon object over the second object; and means, operatively coupled to the memory, for altering the characteristic of the second object to the particular value;

wherein the first and second objects are each a member of a viewable class of objects which can be represented in the display screen.

32. A system comprising:

a computer operating in an object-oriented environment;

a memory coupled to the computer;

a display device coupled to the computer;

a first object stored within the memory of the computer and having a characteristic, a representation of the first object being a display on the display device;

a coupon object, stored in the memory of the computer and having a representation displayed on the display device, the coupon object including a particular value of the characteristic;

a user interface, operatively coupled to the display device, for selecting the coupon object via the representation of the coupon object and for indicating to the coupon object to alter the characteristic of the first object to the particular value;

means, operatively coupled to the memory, for altering the characteristic of the first object to the particular value; and means, operatively coupled to the display device, for indicating that the first object can accept the coupon object to alter the characteristic to the particular value.

33. The system of claim 32 wherein the user interface includes means, operatively coupled to the display device, for dragging the coupon object.

34. The system of claim 32 wherein the user interface includes means, operatively coupled to the display device, for dragging the representation of the coupon over the representation of the first object.

35. The system of claim 32 wherein the means for indicating that the first object can accept includes means for providing an indication when the representation of the coupon object is dragged over the representation of the first object.

* * * * *